United States Patent [19]

Seto et al.

[11] Patent Number: 5,646,670

[45] Date of Patent: Jul. 8, 1997

[54] COLOR IMAGE FORMING APPARATUS WHICH REDUCES TONER CONSUMPTION DURING IMAGE FORMATION

[75] Inventors: Kaoru Seto, Chigasaki; Takashi Kawana, Yokohama, both of Japan

[73] Assignee: Canon Kabushiki Kaisha, Tokyo, Japan

[21] Appl. No.: 297,834

[22] Filed: Aug. 30, 1994

[30] Foreign Application Priority Data

Aug. 31, 1993 [JP] Japan .................. 5-215372
Aug. 31, 1993 [JP] Japan .................. 5-215373

[51] Int. Cl.⁶ ........................... B41J 2/415
[52] U.S. Cl. ........................... 347/131; 347/254
[58] Field of Search .................. 347/131, 240, 347/252, 254; 358/298

[56] References Cited

U.S. PATENT DOCUMENTS 5,343,312 8/1994 Hibi et al. .................. 355/201
5,457,540 10/1995 Kajita .................. 358/298

*Primary Examiner*—Mark J. Reinhart
*Attorney, Agent, or Firm*—Fitzpatrick, Cella, Harper & Scinto

[57] ABSTRACT

A full-color printer which reduces toner consumption by lowering the overall image density without changing the overall image tonality. An invalid data masking unit 31 masks non-printing area of a image signal 39 outputted from a FIFO buffer 30, and outputs the masked image data into a toner-saving image converter 32. The toner-saving image converter 32 zigzag masks the image signal every other pixel in main-scanning and subscanning directions based on a toner-saving mode designation signal A from a CPU 38. The masked image signal density is "00[H]". Thereafter, a γ corrector 35 γ corrects the masked image signal, and a PWM 36 performs pulse-width modulation on the γ-corrected image signal. Image output is made by driving a semiconductor laser 120 with the pulse-width modulated signal.

15 Claims, 43 Drawing Sheets

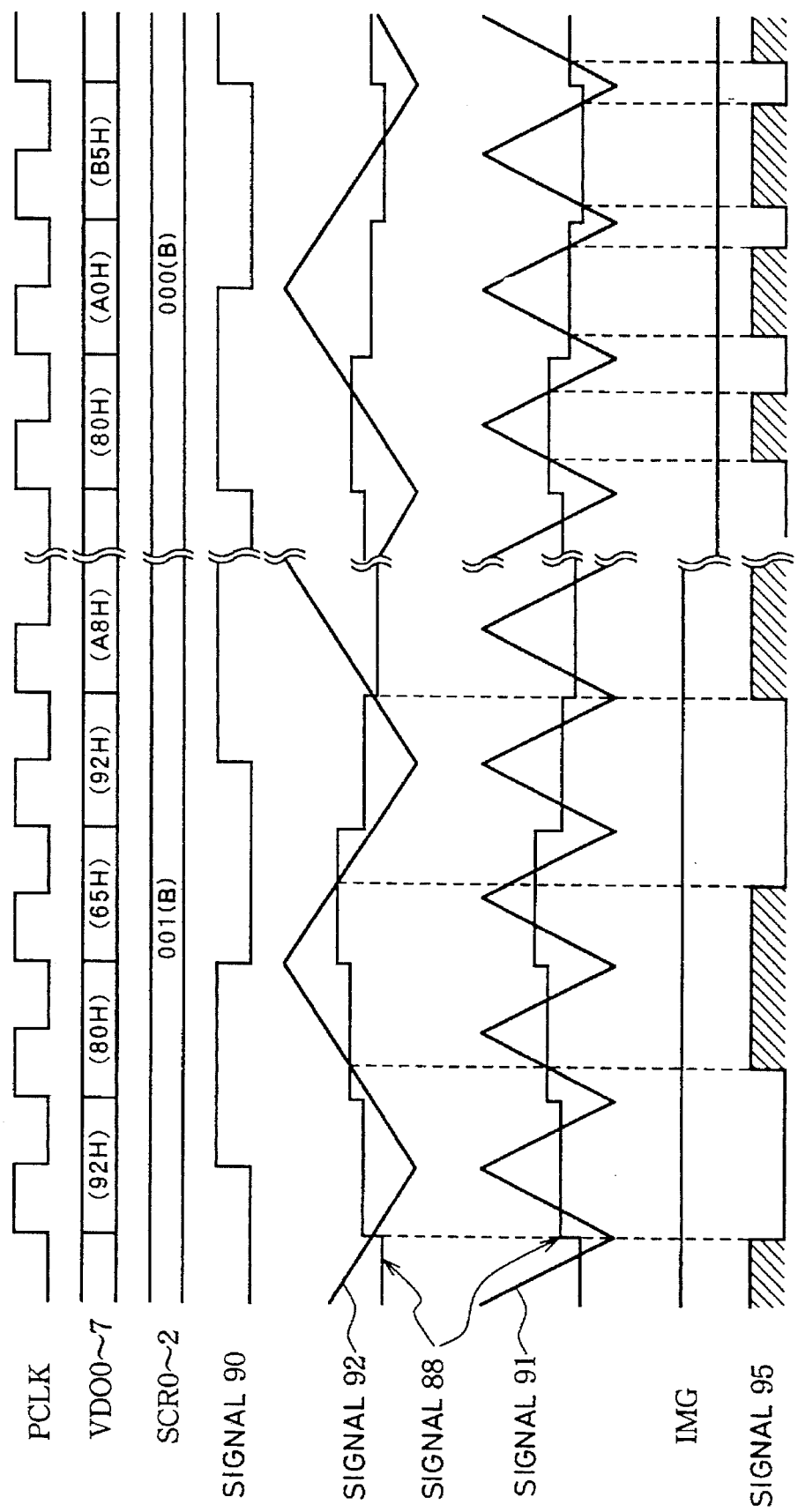

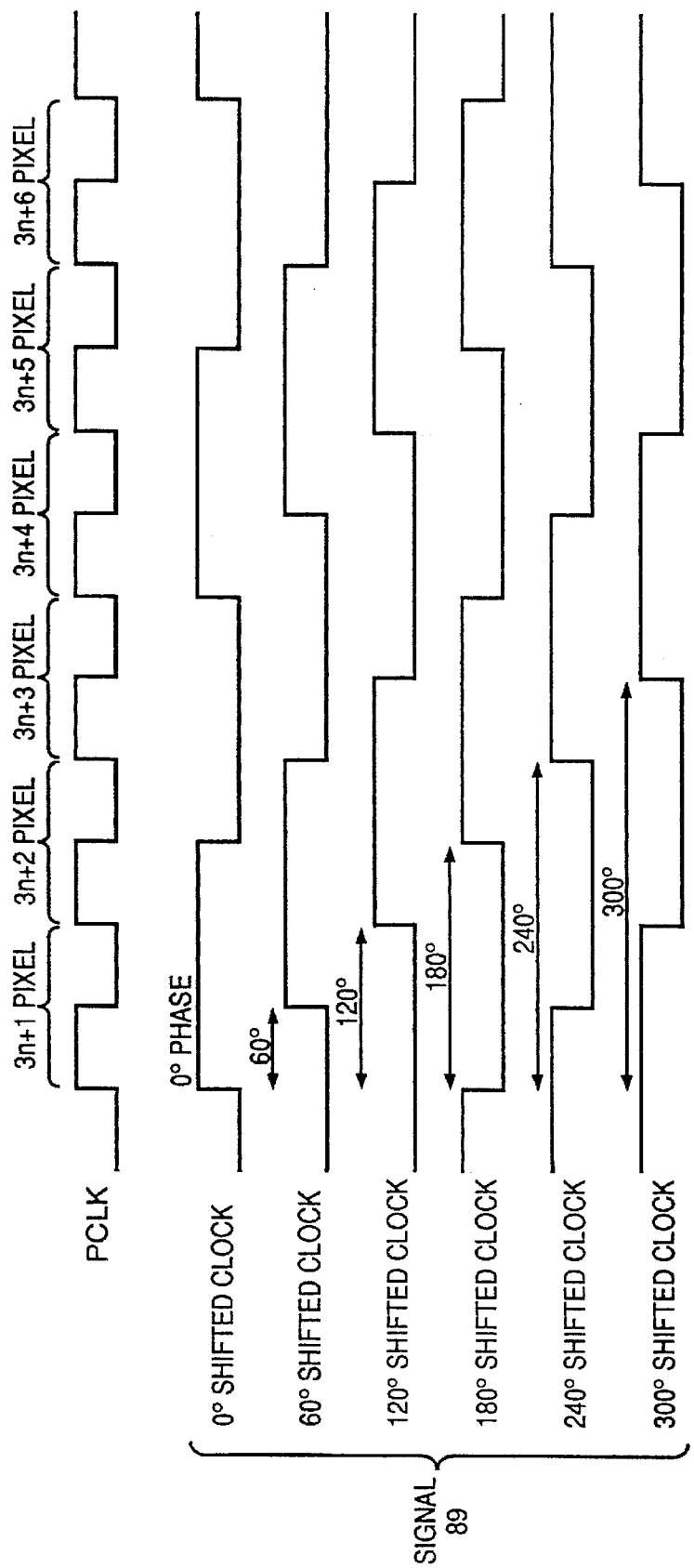

FIG. 17A

MAIN-SCANNING DIRECTION →

| | m+1 DOT | m+2 DOT | m+3 DOT | m+4 DOT | m+5 DOT | m+6 DOT | m+7 DOT | m+8 DOT | m+9 DOT | m+10 DOT | m+11 DOT | m+12 DOT | m+13 DOT | m+14 DOT |
|---|---|---|---|---|---|---|---|---|---|---|---|---|---|---|
| n+1 LINE | 08 | 08 | 08 | 08 | 08 | B2 | 00 | 00 | 00 | F0 | F0 | F0 | 00 | 00 |
| n+2 LINE | 08 | 08 | 08 | 08 | 08 | B2 | 00 | 00 | 00 | F0 | F0 | F0 | 00 | 00 |
| n+3 LINE | 08 | 08 | 08 | 08 | 08 | 00 | F0 | F0 | F0 | 00 | 00 | 00 | F0 | F0 |
| n+4 LINE | 08 | 08 | 08 | 08 | 00 | 00 | F0 | F0 | F0 | 00 | 00 | 00 | F0 | F0 |
| n+5 LINE | 08 | 08 | 08 | 08 | B2 | F0 | 00 | 00 | 00 | F0 | F0 | F0 | 00 | 00 |
| n+6 LINE | 08 | 08 | 08 | 08 | B2 | F0 | 00 | 00 | 00 | F0 | F0 | F0 | 00 | 00 |
| n+7 LINE | 08 | 08 | 08 | 00 | 00 | 00 | F0 | F0 | 0F | 00 | 00 | 00 | F0 | F0 |
| n+8 LINE | 08 | 08 | 08 | 00 | 00 | 00 | F0 | F0 | F0 | 00 | 00 | 00 | F0 | F0 |
| n+9 LINE | 08 | 08 | 00 | F0 | F0 | F0 | 00 | 00 | 00 | F0 | F0 | F0 | 00 | 00 |
| n+10 LINE | 08 | 08 | 00 | F0 | F0 | F0 | 00 | 00 | 00 | F0 | F0 | F0 | 00 | 00 |
| n+11 LINE | 08 | B2 | F0 | 00 | 00 | 00 | F0 | F0 | F0 | 00 | 00 | 00 | F0 | F0 |
| n+12 LINE | 08 | B2 | F0 | 00 | 00 | 00 | F0 | F0 | F0 | 00 | 00 | 00 | F0 | F0 |

PIXEL VALUE

↓ SUBSCANNING DIRECTION

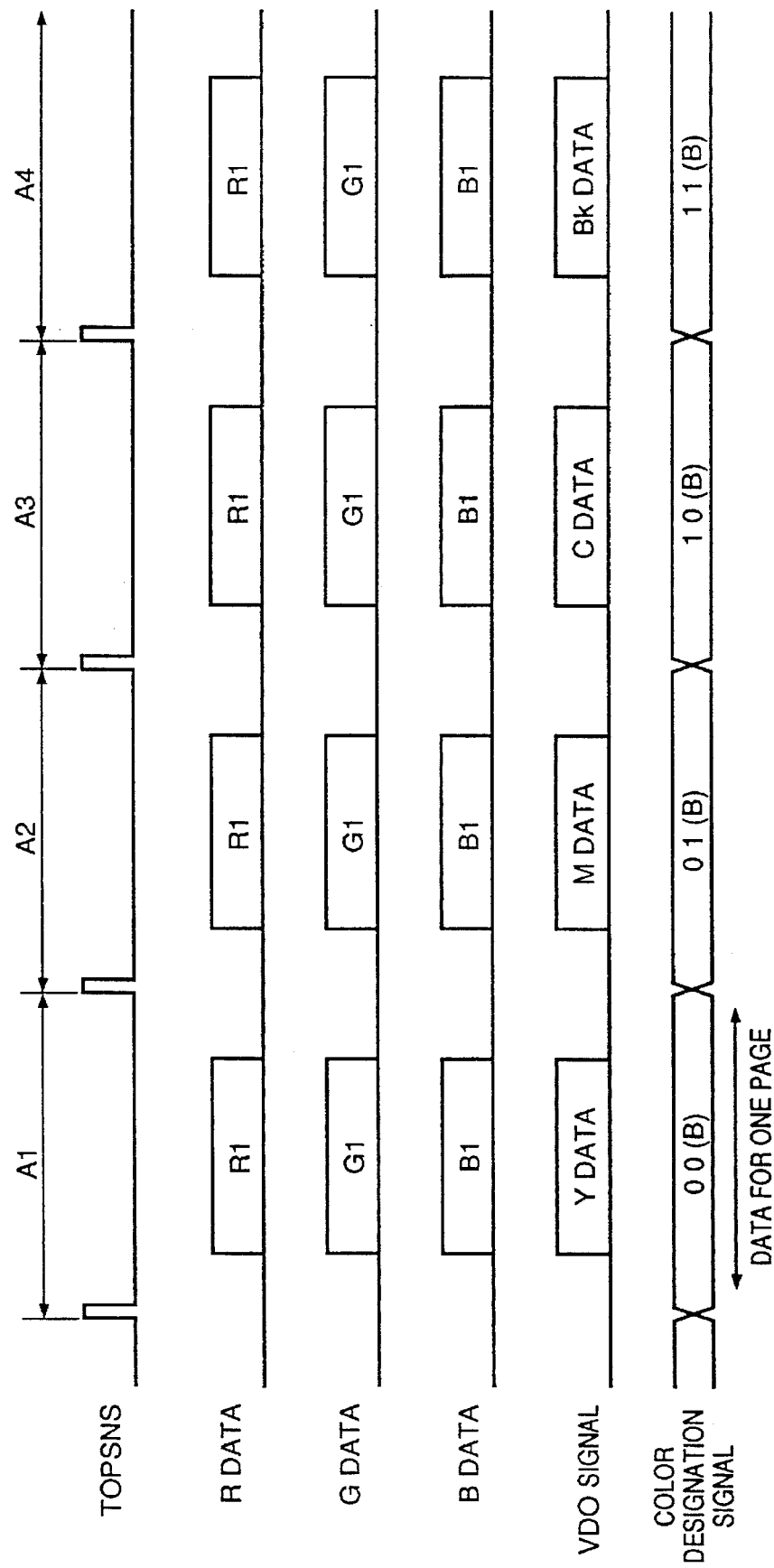

COLOR IMAGE FORMING APPARATUS WHICH REDUCES TONER CONSUMPTION DURING IMAGE FORMATION

BACKGROUND OF THE INVENTION

Present invention relates to a color image forming method and apparatus and, more particularly, to a color image forming method and apparatus for forming a full-color image based on image data having a mixture of different types of data, such as character data, drawing data and picture data, by sequentially overlaying a plurality of color images formed on an electrostatic drum onto a transfer member.

Recently, color printers have been put to practical use as various expression means for users. Especially, a color page printer of electrophotographic printing method has attracted public attention because of its silent operation, high image quality and high-speed printing.

One of those color page printers, a full-color laser-beam printer performs development using a first toner, by scanning a laser beam on an electrostatic member in a main-scanning direction, and transfers the developed image onto a recording medium such as a recording sheet. The printer performs the above operation as a first step, then performs second to fourth steps using second to fourth toners, thus performs full-color image formation and printing.

More specifically, the color laser-beam printer of electrophotographic printing method forms toner images in the above-described four steps using four toners, Y (yellow), M (magenta), C (cyan) and K (black), and overlay-transfers the images on a recording medium to obtain a color image. Usually, this type of printer prints character images at 400 dpi (dot per inch) printing density, and as to picture images, prints each pixel of picture image (200 dpi) with two pixels of 400 dpi image in the main-scanning direction.

Especially, a printer recently introduced for practical use is a printer that receives a half-tone image data comprising an 8-bit/pixel multi-level image signal, which has not been binarized by a binarization method such as the dither method, from a host computer (hereinafter referred to as "host"), performs pulse-width modulation on the respective pixels, and outputs a multi-level image.

Next, the conventional recording method by this full-color printer will be described with reference to FIGS. 36 and 37. FIG. 36 is a cross-sectional view showing the construction of the conventional full-color printer. FIG. 37 is a block diagram showing the flows of various signals used by the printer in FIG. 36.

In FIG. 36, an electrostatic drum 201, which rotates at a fixed speed in a direction represented by the arrow, is charged by an electrostatic charger 204 to a predetermined voltage and a predetermined polarity. Next, a recording sheet P is supplied from a paper cassette 215 by a paper feeding roller 214, at predetermined timing, one sheet at a time. When a detector 202 detects the front end of the recording sheet P, a semiconductor laser 205 emits laser light L, modulated by an image signal VDO (8-bit/pixel/color), to a polygon mirror 207. The laser light L, reflected by the polygon mirror 207, and guided onto the electrostatic drum 201 via a lens 208 and a mirror 209, sweeps on the electrostatic drum 201. On the other hand, a signal from the detector 202 (hereinafter referred to as "TOPSNS") is outputted as a vertical synchronizing signal to an image forming unit 250 as shown in FIG. 37. When a detector 217 detects the laser light L, it outputs a beam-detect signal (hereinafter abbreviated to as "BD signal"), which is a horizontal synchronizing signal, to the image forming unit 250. The image signal VDO is sequentially transmitted to the semiconductor laser 205 in synchronization with the BD signal.

The scanner motor 206 rotates at a fixed speed in accordance with a signal S2 from a frequency divider 221, which changes the period of a signal S1 from a reference oscillator 220 under the control of a motor controller 225.

The electrostatic drum 201 is scan-exposed in synchronization with the BD signal, then a first electrostatic latent image is developed by a developer 203Y having yellow toner, and a yellow toner image is formed on the electrostatic drum 201.

On the other hand, immediately before the front end of the recording sheet P reaches a transfer start position, a predetermined transfer bias voltage of an opposite polarity to that of the toner is applied to the transfer drum 216. The yellow toner image is transferred onto the recording sheet P, and at the same time, the recording sheet P is electrostatically attached to the transfer drum 216.

Next, a second electrostatic latent image is formed on the electrostatic drum 201 by the scanning of the laser light L, then the second latent image is developed by a developer 203M having magenta toner. The position of the magenta toner image on the electrostatic drum 201 is aligned, by the TOPSNS signal, with the position of the first (yellow) toner image, and the second toner image is transferred onto the recording sheet P.

In a similar manner, a third electrostatic latent image is developed by a developer 203C having cyan toner, then the position of the cyan toner image is aligned with that of the previous magenta image, and the third toner image is transferred onto the recording sheet P. Finally, a fourth electrostatic latent image is developed by a developer 203 K having black toner, the position of the black toner image is aligned with that of the previous cyan image, and the fourth toner image is transferred onto the recording sheet P.

In each step, a VDO signal for one page is sequentially outputted to the semiconductor laser 205. After each transfer, untransferred toner on the electrostatic drum 201 is scraped off by a cleaner 210.

Thereafter, as the front end of the recording sheet P, on which the four toner images have been transferred, approaches a separation claw 212, the separation claw 212 moves to contact the surface of the transfer drum 216 so as to separate the recording sheet P from the transfer drum 216. The separation claw 212 is in contact with the transfer drum 216 till the rear end of the recording sheet P is separated from the transfer drum 216, thereafter, returns to the initial position. An electrostatic discharger 211 removes the accumulated charge on the recording sheet P, thus assists separation of the recording sheet P by the separation claw 212, and reduces discharge in the air upon separation of recording sheet.

The finally developed image on the recording sheet P is fixed by a fixing roller 213 and the recording sheet P is discharged to a tray 229.

It should be noted that the image forming unit 250 in FIG. 37 is a generic term of all the elements in FIG. 36 excluding the semiconductor laser 205, the scanner motor 206, the polygon mirror 207, and the detectors 202 and 217.

FIG. 38 is a timing chart showing the relation between the TOPSNS signal and the VD signal. In FIG. 38, term A1 corresponds to the first toner color printing; A2, printing of the second toner color printing; A3, the third toner color printing; and A4, the fourth toner color printing. The color printing for one page is from the term A1 to the term A4.

Next, image signal processing will be described.

FIG. 39 is a block diagram showing the functional construction of a conventional full-color printer 302. In FIG. 39, a host interface 303 receives print information 307 from an external device, e.g., a host computer 301, transmits a control signal 308 included in the received print information 307 to a printer controller 304, and also transmits an image signal 309 included in the print information 307 to an image processor 305. The image processor 305 outputs a signal to drive a semiconductor laser 306. The printer controller 304 controls the image processor 305 by a control signal 310.

FIG. 40 is a block diagram showing the detailed construction of the image processor 305 shown in FIG. 39. In FIG. 40, a color processor 351 receives a 24-bit RGB image signal from the host interface 303 shown in FIG. 39, and sequentially converts the input RGB signal into a corresponding YMCK signal at predetermined timing. That is, the color processor 351 converts an input RGB signal, to an 8-bit VDO signal indicative of a Y signal on one occasion; to an 8-bit VDO signal indicative of a M signal on another occasion; to an 8-bit VDO signal indicative of a C signal on till another occasion; and an 8-bit VDO signal indicative of a K signal on till another occasion.

FIG. 41 is a timing chart showing the color signal conversion by the color processor 351. In FIG. 41, terms A1 to A4 represent the respective toner color printing operations, as described in FIG. 38. As indicated by numerals R1, G1 and B1, the same color signal is used in the corresponding toner color printing operation. The 2-bit color designation signal indicates the color of each printing operation. In the color designation signal, numeral "B" added to the respective values indicates that the values are in binary representation.

The YMCK VDO signal from the color processor 351 is γ-corrected by a γ corrector 352, and outputted as an 8-bit signal to a pulse-width modulator (hereinafter abbreviated to "PWM") 353. The PWM 353 latches the input 8-bit image signal by the latch 354 in synchronization with the rising edge of an image clock (VCLK), then converts the latched digital data into analog data by a D/A converter 355 and outputs the data into an analog comparator 356.

On the other hand, the image clock (iVCLK) also enters to a triangular wave generator 358, which converts the image clock into a triangular wave and outputs it to the analog comparator 356.

The analog comparator 356 compares the triangular wave from the triangular wave generator 358 and the analog signal from the D/A converter 355, and outputs a pulse-width modulated signal. This signal is inverted by an inverter 357, thus a PWM signal is obtained.

When the value of an 8-bit image data inputted into the PWM 353 is the maximum "FF(H)", a PWM having the widest pulse width is outputted, while when the value of the 8-bit image data is the minimum "00(H)", a PWM having the narrowest pulse width is outputted.

However, in the conventional signal processing, compared with toner of a conventional monochromatic laser beam printer, color toner (Y, M, C, K colors) is expensive, further, one image is printed by four color toners. Thus, high toner costs and high printing cost per one image are not negligible.

In addition, the conventional color printing has not produced a printer which actually has high resolution (e.g., 600 dot per inch (dpi)) for outputting character images and picture images with satisfactorily high quality yet, since a printer having such high-resolution, which has been desired for many years, possesses the following problems:

(1) For example, when a high-resolution color printer having 600 dpi printing density is manufactured, if 8-bit/pixel multi-level bit data (picture image) is used, such 600 dpi output cannot obtain sufficient tonality due to diameter of toner particle or some processing factor.

Accordingly, 600 dpi printing density output is suitable to outputting of image (resolution-oriented image) where resolution is more important than tonality such as characters and drawings, whereas not suitable to outputting of image (tonality-oriented image) where tonality is more important than resolution such as a natural picture.

In order to solve this problem, as to outputting picture images, printing each pixel of picture image (300 dpi) with two pixels of 600 dpi image in the main-scanning direction has been conventionally used. In this method, the picture image is represented in 300 dpi. Compared with the 600 dpi printing, tonality is improved, however, to attain fully improved tonality in representation of 8-bit/pixel input data is still difficult in the conventional process.

(2) Upon outputting a one-page image having a mixture of character image and picture image, a signal indicative of output attribute, i.e. resolution-oriented output for character image or tonality-oriented output for picture image, is necessary. The data structure in this case consists of nine bits, i.e., 8-bit multi-level data and one control bit.

However, as the bus width of a data bus normally used in a host or a printer controller is an integral multiple of eight (8 bits, 16 bits, 32 bits etc.). The 9-bit/pixel data:

(a) wastes memory;

(b) lowers data processing efficiency;

(c) hardly accepts standardized coding techniques such as data compressing;

(d) causes complexity of process to define one-bit attribution designation signal.

(3) The conventional laser color printer operates to always output images at the maximum density. For example, even upon test printing to see an image layout, the toner is used as in a normal output, and such toner consumption raises running cost.

To solve this problem, the look-up table (hereinafter abbreviated to "LUT") for γ correction of the printer may be changed to lower output density, however, this disturbs the balance among γ characteristics with respect to Y, M, C and K toners, which changes overall tonality in an output image.

The image data may be converted to data for outputting at a lower density by an application soft in the host. However, the density changing must be performed over the whole image data while maintaining the overall tonality of the output image. The problem is that data process time is prolonged for this purpose.

SUMMARY OF THE INVENTION

Accordingly, it is an object of the present invention to provide a color image forming apparatus which enables color image output with reduced toner consumption and lower running cost.

According to the present invention, the foregoing object is attained by providing a color image forming apparatus comprising: conversion means for performing conversion to lower the density of input color image signal; mode selection means for selecting whether or not to perform the conversion by the conversion means; image formation means for, in accordance with selection by the mode selection means, forming a color image based on the density-converted color image signal by the conversion means or based on the input color image signal; and output means for outputting the color image formed by the image formation means.

It is another object of the present invention to provide a color image forming method which enables color image output with reduced toner consumption and lower running costs.

According to the present invention, the foregoing object is attained by providing a color image formation method comprising: an input step of inputting a color image signal; a conversion step of performing conversion to lower the density of the input color image signal; a mode selection step of selecting whether or not to perform the conversion in the conversion step; an image formation step of, in accordance with selection in the mode selection step, forming a color image based on the density-converted color image signal from the conversion step or based on the input color image signal; and an output step of outputting the color image formed in the image formation step.

In accordance with the present invention as described above, the density of input color image signal is lowered, whereas the overall tonality of output image is not substantially changed, thus toner consumption is reduced.

It is another object of the present invention to provide a color image forming apparatus which obtains a high-quality image based on both tonality-oriented image data and resolution-oriented image data and reduces apparatus running cost.

According to the present invention, the foregoing object is attained by providing a color image forming apparatus comprising: input means for inputting a color image data; attribute signal generation means for examining attribute of each pixel of the color image data and outputting the attribute as an attribute signal; control means for, based on the attribute signal outputted by the attribute signal generation means, controlling image formation so that an image based on resolution-oriented image data is formed at a first resolution, while an image based on tonality-oriented image data is formed at a second resolution; first image formation means for forming an image using recording material at the first resolution; and second image formation means for forming an image using the recording material at the second resolution.

It is another object of the present invention to provide a color image forming method which obtains a high-quality image based on both tonality-oriented image data and resolution-oriented image data and reduces apparatus running cost.

According to the present invention, the foregoing object is attained by providing a color image formation method comprising: an input step of inputting a color image data; an attribute signal generation step of examining attribute of each pixel of the color image data and outputting the attribute as an attribute signal; a control step of, based on the attribute signal outputted in the attribute signal generation step, controlling image formation so that an image based on resolution-oriented image data is formed at a first resolution, while an image based on tonality-oriented image data is formed at a second resolution; a first image formation step of forming an image using recording material at the first resolution; and a second image formation step of forming an image using the recording material at the second resolution.

In accordance with the present invention as described above, the attribute of each pixel of input data is examined, and in accordance with the attribute, image formation based on resolution-oriented image data is made at a predetermined resolution, while image formation based on tonality-oriented image data is made at a resolution ⅓ of the predetermined resolution.

The invention is particularly advantageous since the printing density is lowered while the overall tonality of a color image is not substantially changed. This reduces toner consumption and realizes economical printing.

Further, the attribute of each pixel of input image data is examined, and in accordance with the attribute, image formation is made at a predetermined resolution. That is, when output is based on resolution-oriented image data, an image is formed at a predetermined resolution, whereas when output is based on tonality-oriented image data, an image is formed at a resolution ⅓ of the predetermined resolution. For example, upon image formation with respect to resolution-oriented image data representing e.g. characters or drawings, printing is made at a predetermined resolution. On the other hand, upon image formation with respect to tonality-oriented image data representing e.g. natural pictures, printing is made at a resolution ⅓ of the predetermined resolution. This obtains a high-quality image.

In addition to the above-described construction, the present invention comprises instruction means for instructing to reduce printing material consumption and printing material consumption control means for controlling material consumption based on the instruction by the instruction means, so that it can reduce consumption of printing material depending upon printing situation, e.g., in test printing, thus saves apparatus running cost.

Further, the bus width of data bus for transferring image data from the input means to the first image formation means and the second image formation means is an integral multiple of data width of the image data, simple processing of image data is attained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a timing chart showing operation timings of the PWM 36;

FIG. 13 is a timing chart showing timings of signals outputted from a multiple phase-shift frequency divider 80;

FIG. 17A illustrates γ-corrected pixel values of image data obtained from image conversion in toner-saving mode by the toner-saving image converter 32 according to the second embodiment;

FIG. 41 is a timing chart showing color signal conversion performed by a color processor 351.

DETAILED DESCRIPTION OF THE PREFERRED EMBODIMENT(S)

Preferred embodiments of the present invention will be described in detail in accordance with the accompanying drawings.

[General Embodiment (FIG. 1)]

Figure 1:
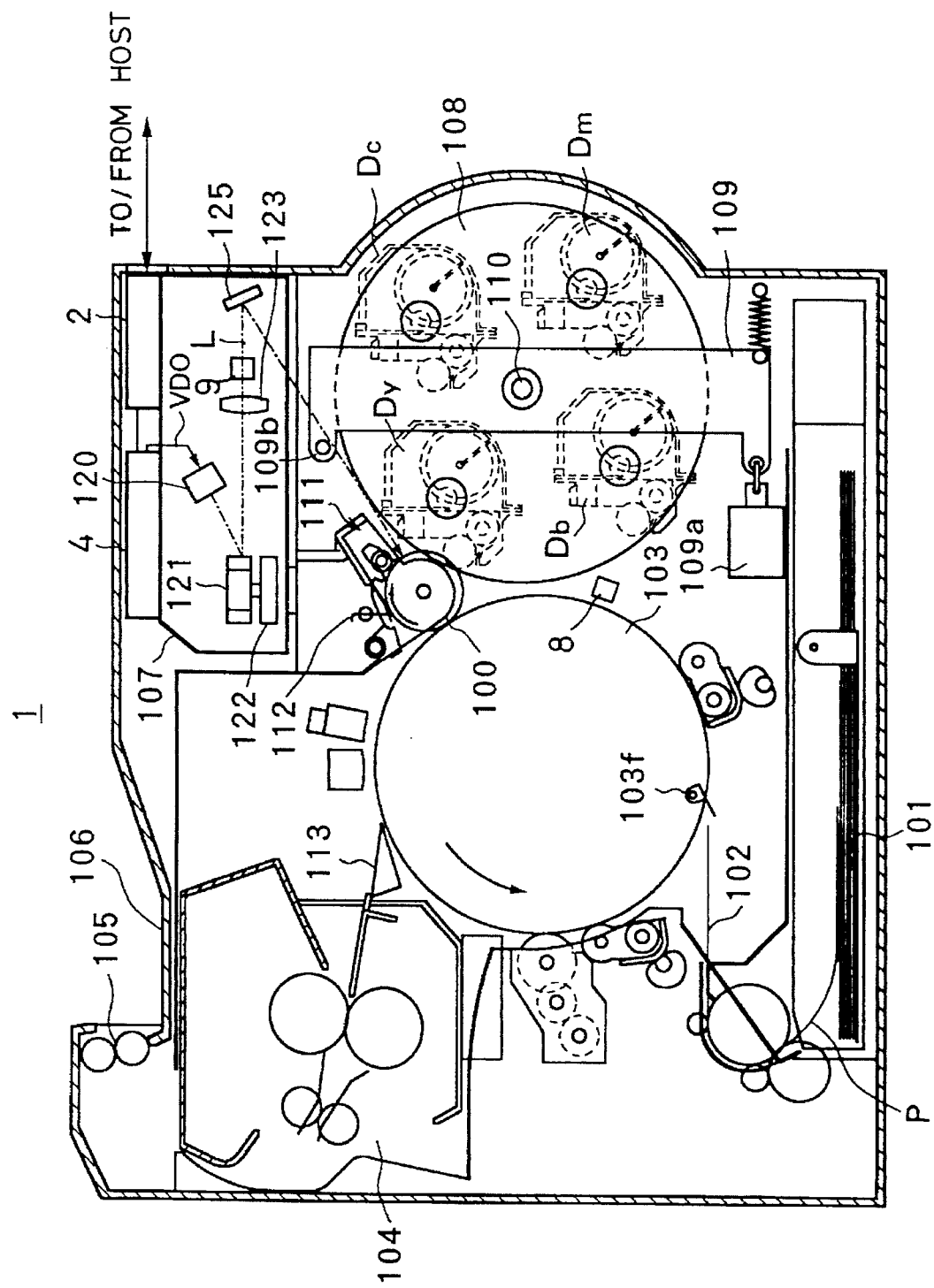
FIG. 1 is a cross-sectional view showing the construction of a color laser-beam printer as a typical embodiment of the present invention.

FIG. 1 is a cross-sectional view showing the construction of a color laser-beam printer (hereinafter referred to as "printer") as a typical embodiment of the present invention. The printer has 600 dot/inch (dpi) resolution, and performs image printing based on multi-level data where each pixel of each color component is represented by eight bits. The following embodiments will be described with reference to this printer in FIG. 1, as a general embodiment.

In FIG. 1, a recording sheet 102 supplied from a paper feeder 101 is caught by a gripper 103 at its end held around a transfer drum 103. At this time, a detector 8 detects the end portion of the recording sheet 102, and a vertical synchronizing signal (to be described later) is generated based on a detection signal from the sensor 8. Latent images of respective colors formed by an optical unit 107 on an image holder (hereinafter referred to as "electrostatic drum") 100 are developed by respective developers Dy, Dc, Db and Dn, and transferred onto the recording sheet on the transfer drum 103, to be a multiple-color image. Thereafter, the recording sheet 102 is removed from the transfer drum 103, then fixed by a fixing unit 104, and discharged from a paper discharging unit 105 to a paper discharging tray 106.

The developers Dy, Dc, Db and Dm respectively have a rotation support at both ends, so that they are rotatably held by a developer selection mechanism 108 with the rotation support as the rotational axis. By virtue of this arrangement, the developers Dy, Dc, Db and Dm can maintain a constant status even though the developer selection mechanism 108 rotates around the shaft 110. After a selected developer reaches a developing position, a solenoid 109a moves the developer selection mechanism 108 with the developer toward the electrostatic drum 100, by pulling a selection mechanism holding frame 109 with respect to a support 109b.

Next, color image formation by the color laser-beam printer having the above construction will be described.

First, an electrostatic charger 111 charges the electrostatic drum 100, and exposure by a laser beam L forms a latent image of, e.g., M (magenta) color, on the electrostatic drum 100. The latent image is developed using M color developer Dm as a first toner image of M color. On the other hand, a transfer sheet P is supplied at predetermined timing, and a transfer bias voltage (+1.8 kV) having an opposite polarity to that of the toner (e.g., positive) is applied to the transfer drum 103, then the first toner image on the electrostatic drum 100 is transferred onto the transfer sheet P, at the same time, the transfer sheet P is electrostatically-attached around the transfer drum 103. Thereafter, a cleaner 112 removes residual M toner from the electrostatic drum 100, as preparation for the next development.

Next, the laser beam L forms a second latent image of C (cyan) color on the electrostatic drum 100, then the development of the second latent image is performed using the C color developer Dc. The second C color toner image is transferred onto the transfer sheet P in a manner such that the position of the second toner image corresponds to that of the first M color toner image previously transferred on the transfer sheet P. Upon transfer of the second toner image, immediately before the transfer sheet P reaches a transfer position, +2.1 kV bias voltage is applied to the transfer drum 103.

Similarly, a third Y (yellow) color latent image and a fourth K (black) color latent image are sequentially formed on the electrostatic drum 100, and sequentially developed using the developers Dy and Db, thus, the developed third and fourth toner images are sequentially transferred onto the transfer sheet P such that the respective positions of the third and fourth toner images correspond to the position of the previously transferred image. In this manner, the four color toner images are overlaid on the transfer sheet P. Upon transfer of the third and fourth toner images, immediately before the transfer sheet P reaches the transfer position, +2.5 kV bias voltage and +3.0 kV bias voltage are respectively applied to the transfer drum 103.

As described above, the transfer bias voltage at one transfer is raised at the next transfer, so as to avoid degradation of transfer efficiency. When the transfer sheet is separated from the electrostatic drum 100, the surface of the transfer sheet is charged, and have opposite polarity to the transfer bias voltage (the surface of the transfer drum holding the transfer sheet is charged to some extent due to the discharge in the air). This electric charge accumulates by transfer operation, and degrades the electric field in transfer process if the transfer bias voltage is constant.

Upon transfer of the fourth toner image, when the end portion of the transfer sheet reaches the transfer start position (including immediately before/after this point in time), direct bias voltage +3.0 kV having the same polarity and the same potential as those of the transfer bias voltage applied upon the fourth toner image transfer is added to effective alternating voltage 5.5 kV (frequency: 500 Hz) and applied to the electrostatic charger 111. In this manner, upon the fourth toner image transfer, when the end portion of the transfer sheet reaches the transfer start position, the charger 111 is operated so as to prevent transfer unevenness. Especially in full-color image transfer, even minute transfer unevenness becomes obvious color difference. For this reason, it is necessary to apply the predetermined bias voltage to the charger 111 to perform discharging operation.

Thereafter, as the end portion of the transfer sheet P, on which the four toner images are overlaid, approaches the separation position, the separation claw 113 moves to contact the surface of the transfer drum 103, thus separates the transfer sheet P from the transfer drum 103. The end portion of the separation claw 113 is kept in contact with the transfer drum surface, then moves away from the transfer drum 103 to the initial position. The charger 111 operates to discharge the accumulated electric charge on the transfer sheet (having opposite polarity to that of the toner) from the point where the upper end portion of the transfer sheet P reached the transfer start position of the final color (fourth color) to the point where the bottom end of the transfer sheet moves away from the transfer drum 103, thus assists the separation of the transfer sheet and reduces discharge in the air upon separation. It should be noted that when the rear end of the transfer sheet reaches a transfer end position (exit of the grip) formed by the electrostatic drum 100 and the transfer drum 103), the transfer bias voltage applied to the transfer drum 103 is turned off (to ground potential). At the same time, the bias voltage applied to the charger 111 is turned off. Next, the separated transfer sheet P is conveyed to a fixing unit 104, where the toner images are fixed to the transfer sheet, and the transfer sheet P is discharged to the paper discharging tray 106.

Next, image formation by laser-beam scanning will be described below.

In FIG. 1, the optical unit 107 comprises a detector 9, a semiconductor laser 120, a polygon mirror 121, a scanner motor 122, a lens 123 and a mirror 125. As the recording sheet P is supplied and its end portion is conveyed to the transfer drum, an image signal VDO for one page is outputted to the semiconductor laser 120 in synchronization with the conveyance of the recording sheet P. The semiconductor laser 120 emits a laser beam L, modulated by the image signal VDO, toward the polygon mirror 121 rotated by the scanner motor 122. The emitted laser beam L is guided via the lens 123 and the mirror 125 to the electrostatic drum 100. As the laser beam L is emitted, the detector 9 provided on a main-scanning axis detects the laser beam L and outputs a beam detect (hereinafter abbreviated to "BD") signal as a horizontal synchronizing signal. The electrostatic drum 100 is scan-exposed by the laser beam L in synchronization with the BD signal, to form an electrostatic latent image.

The color laser-beam printer of the present embodiment performs image output at 600 dot/inch (dpi) resolution through the above-described image forming process.

Input data to this apparatus may be color image data (e.g., data in RGB representation) generated by a host or image data generated by another image data generating device (e.g., still image recorder) and stored in some storage medium. For this reason, as shown in FIG. 1, the present apparatus has a printer controller 2 for receiving image information from the host and generating image data, and a signal processor 4 for processing the generated image data.

In the following embodiments, color image data from the host is considered as input data.

[First Embodiment]

Figure 2:
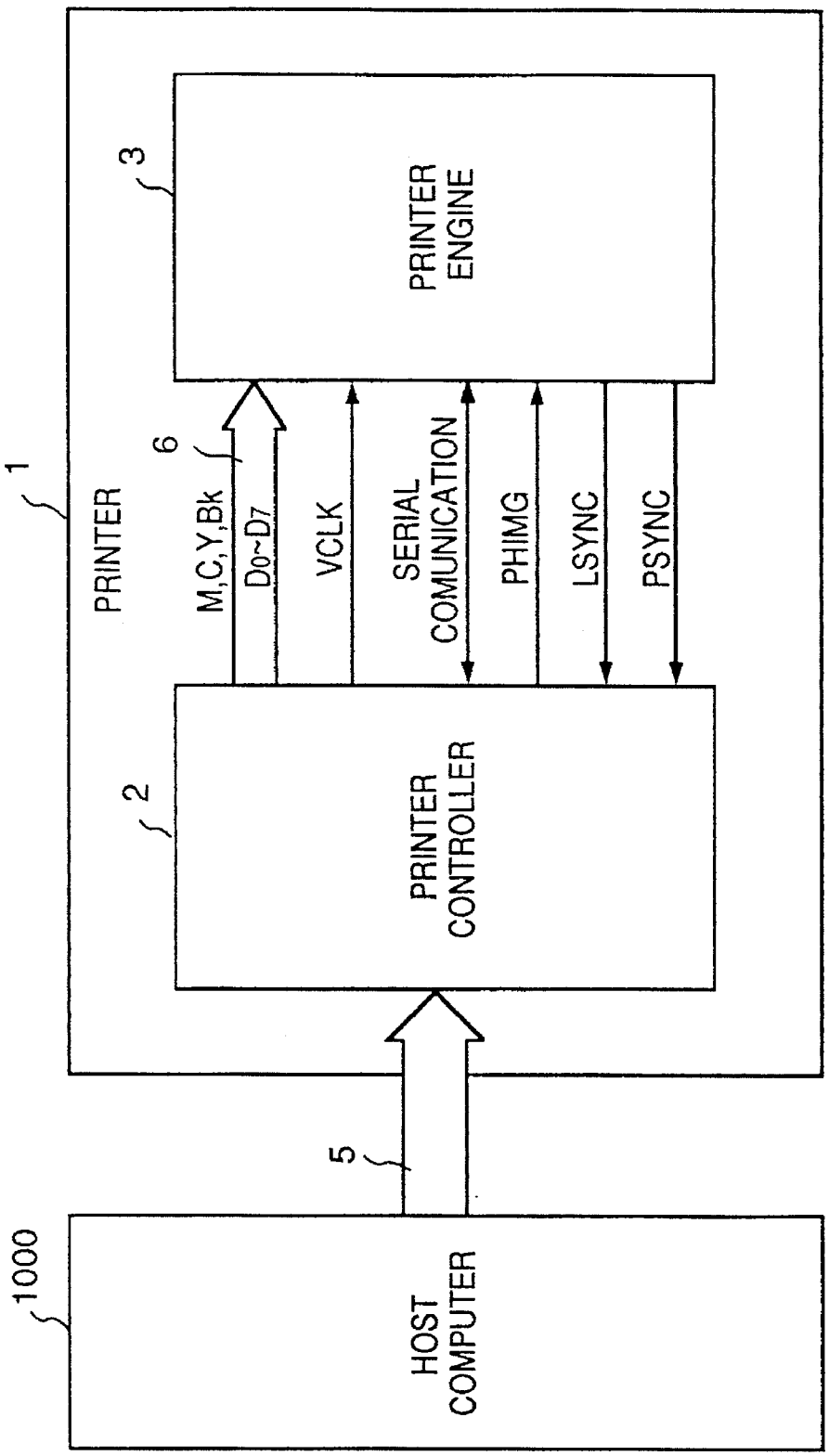
FIG. 2 is a block diagram showing the functional construction of a printer 1 according to a first embodiment of the present invention.

FIG. 2 is a block diagram showing the functional construction of a printer 1 according to the present embodiment. In FIG. 2, the printer 1 comprises a printer controller 2 and a printer engine 3. The printer controller 2 receives image information 5 in predetermined description language from a host computer (hereinafter referred to as "host") 1000 and interprets the information 5, then outputs a YMCBk image signal 6 where each color component is represented by 8 bits (D0–DS). Alternatively, the host 1 outputs bit data such as RGB data read by an image reader as the image information 5. In this case, the printer controller 2 processes the data without interpretation.

The printer controller 2 and the printer engine 3 transfer various image signals as well as the image signal 6 in the form of serial communication. The image signals include a page (subscanning direction) synchronizing signal (PSYNC) and a main-scanning direction synchronizing signal (LSYNC) from the printer engine 3 to the printer controller 2, one-bit attribute designation signal (PHIMG) and data transfer clock (VCLK) from the printer controller 2 to the printer engine 3. The attribute designation signal (PHIMG) is a signal designating dot density of an image outputted from the printer. When PHIMG="H", the designated dot density is 200 dpi, while when PHIMG="L", the designated dot density is 600 dpi.

The printer controller 2 outputs the 8-bit/color component image signal 6 with the one-bit attribute designation signal (PHIMG) in synchronization with the data transfer clock (VCLK).

Figure 3:
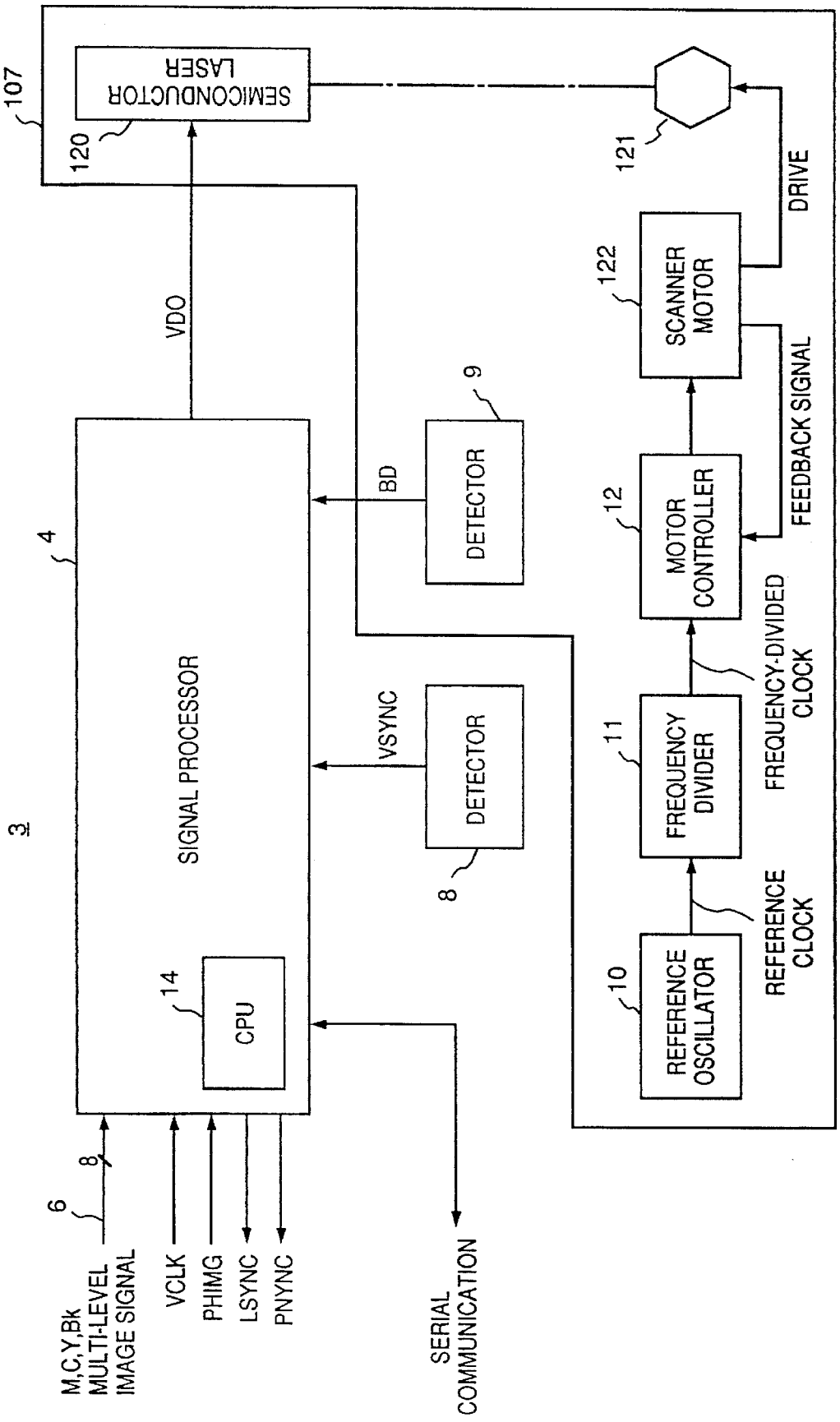
FIG. 3 is a block diagram showing the functional construction of a printer engine 3 according to the first embodiment.

FIG. 3 is a block diagram showing the functional construction of the printer engine 3 according to the present embodiment.

In FIG. 3, a reference clock from a reference oscillator 10 included in the optical unit 107 is divided by a frequency divider 11, and the scanner motor 122 is rotated by a motor controller 12 (incorporates a publicly-known phase controller (not shown)) at a fixed speed so that the phase difference between the divided clock and a feedback signal from the scanner motor 122 becomes a predetermined phase difference. The rotation of the scanner motor 122 is transmitted to the polygon mirror 121 so that the polygon mirror 121 rotates at the fixed speed.

On the other hand, the transfer drum 103 is rotated by a driving motor (not shown) at a fixed speed. The detector 8 detects the end portion of the recording sheet P on the transfer drum 103, and outputs the vertical synchronizing signal (VSYNC) to the signal processor 4 to define the end portions of the respective color images. After the vertical synchronizing signal has been outputted, the detector 9 generates a beam detect (BD) signal as the horizontal synchronizing signal (HSYNC). The image signal (VDO) is sequentially transmitted to the semiconductor laser 120 in synchronization with the BD signal.

A CPU 14, integrated in the signal processor 4, performs serial communication with the printer controller 2 and exchanges control signals to bring the operation of the printer controller 2 and that of the printer engine 3 into synchronization.

Figure 4:
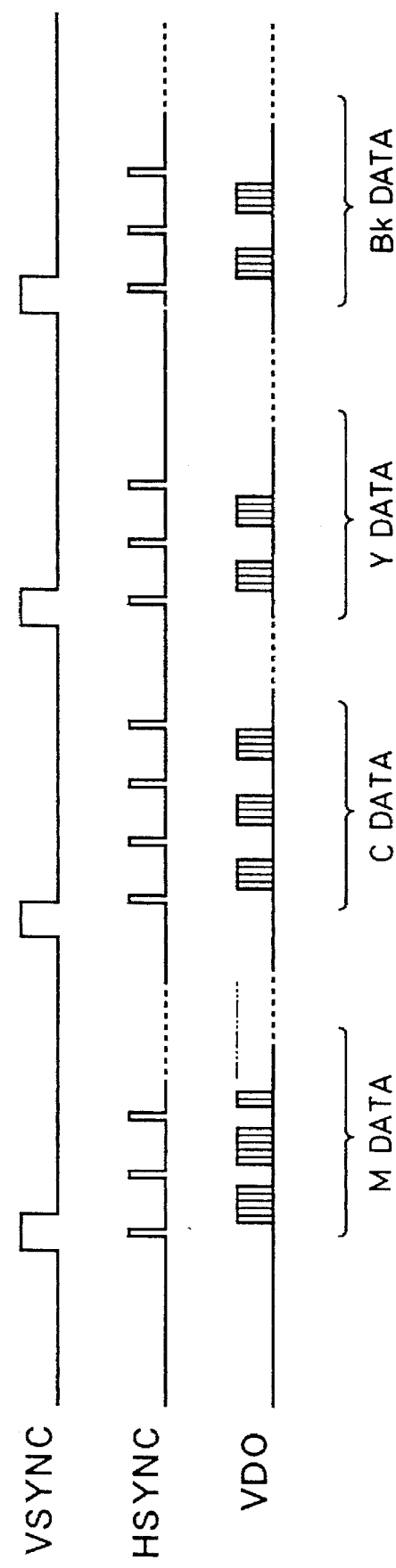
FIG. 4 is a timing chart showing timings of a vertical synchronizing signal (VSYNC), a horizontal synchronizing signal (BD) and an image signal (VDO) in image formation process according to the first embodiment.

The timings of the vertical synchronizing signal (VSYNC), the horizontal synchronizing signal (BD) and the image signal (VDO) are as shown in FIG. 4.

Figure 5:
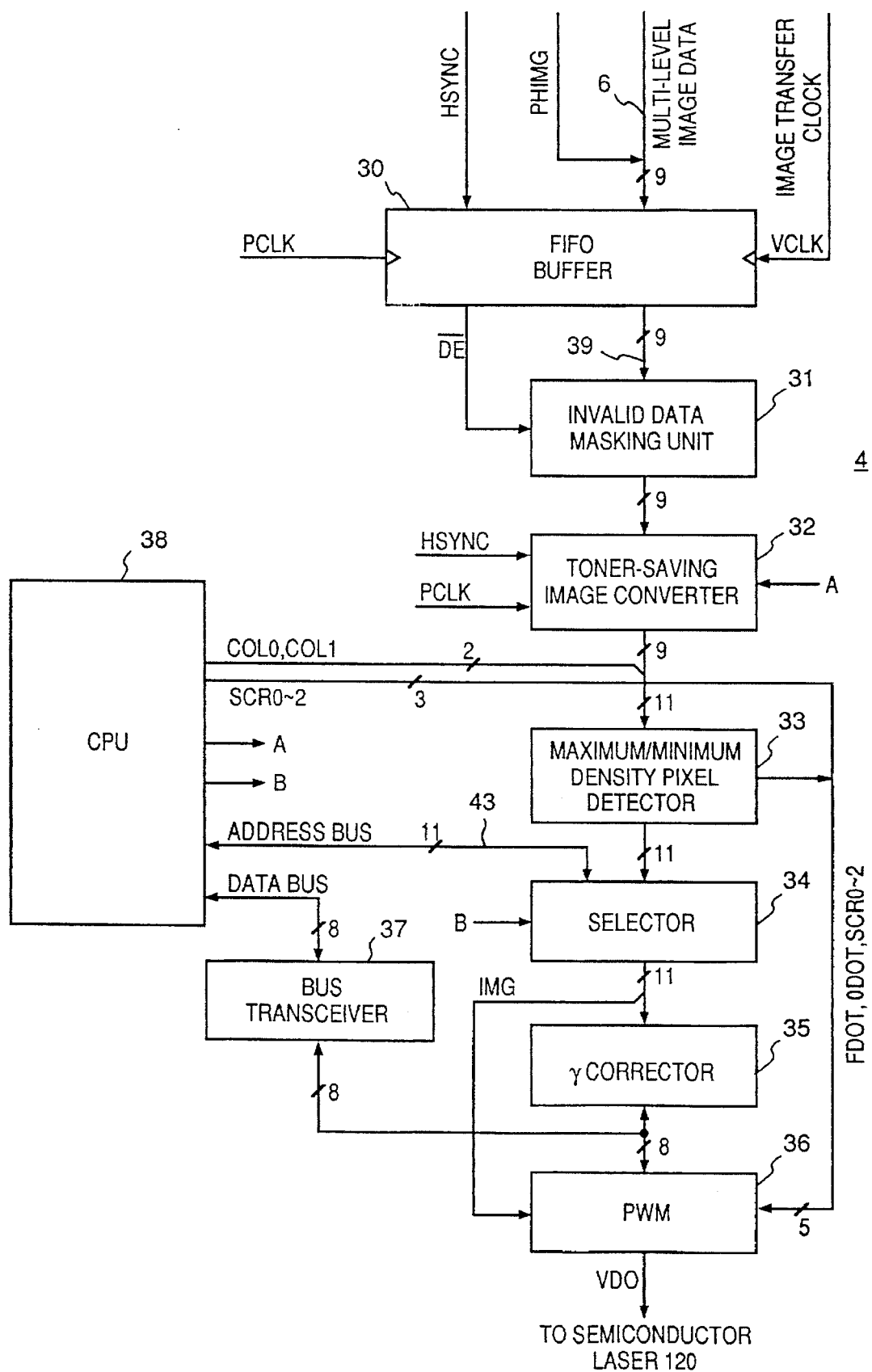
FIG. 5 is a block diagram showing the construction of a signal processor 4.

FIG. 5 is a block diagram showing the construction of the signal processor 4. In FIG. 5, reference numeral 30 denotes a FIFO buffer; 31, an invalid data masking unit; 32, a toner saving image converter; 33, a maximum/minimum density pixel detector; 34, a selector; 35, a γ corrector; 36, a pulse-width modulator (PWM); 37, a bus transceiver; and 38, a CPU.

The operation of the signal processor 4 will be described below.

As the image signal 6, which is an 8-bit/color component density signal with one-bit attribute designation signal (PHIMG), is outputted from the printer controller 2 in synchronization with the transfer clock (VCLK) into the signal processor 4, the FIFO buffer 30 writes the 9-bit signal with the transfer clock (VCLK) and reads the signal with a printer clock (PCLK). In this embodiment, one clock of the printer clock (PCLK) corresponds to data for one pixel of 600 dpi as the maximum printing density of the printer.

The FIFO buffer 30 reads and writes data for one line, and stores data for 5120 pixels by data width of 9 bits per pixel. Note that the frequency of the writing clock (VCLK) is 16 MHz, and that of the reading clock (PCLK) is 22 KHz. Further, the horizontal synchronizing signal (HSYNC) is applied to the FIFO buffer 30, and the contents of the FIFO buffer 30 is cleared with the HSYNC signal. An image signal 39 outputted from the FIFO buffer 30 enters the invalid data masking unit 31, where image signal indicative of outside of a printing area is masked. The FIFO buffer 30 outputs a printing area designation signal ($\overline{DE}$) for discriminating a printing area from non-printing area within one line in a main-scanning direction. The printing area designation signal ($\overline{DE}$) indicates the printing area by "L", and the non-printing area, by "H".

Figure 6:
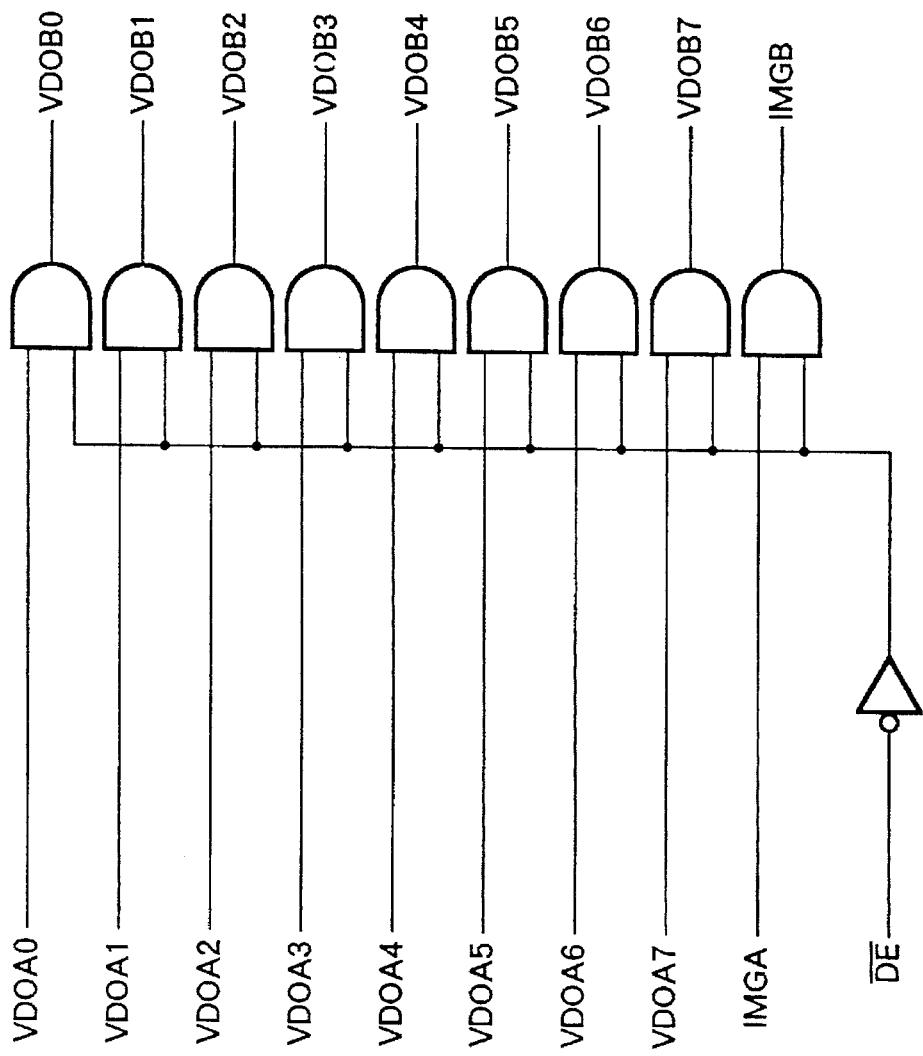
FIG. 6 illustrates a logical circuitry constructing an invalid data masking unit 31.

FIG. 6 shows a logical circuitry constructing the invalid data masking unit 31. In FIG. 6, numerals VDOA0–VDOA7 represent respective bits of input image signal, and VDOB0–VDOB7 represent respective bits of image signal to be outputted. Term IMGB represents an output signal corresponding to an input attribute designation signal (PHIMG). As it is apparent from the construction in FIG. 6, when the printing range designation signal ($\overline{DE}$) is "H", all the bits of the output signal from the invalid data masking unit 31 have value "zero", while when the printing range designation signal ($\overline{DE}$) is "L", the bits of the output signal have the values of the input image signal and input attribute designation signal.

The output signal from the invalid data masking unit 31 enters the toner-saving image converter 32 which converts the image signal in accordance with a toner-saving mode designation signal A from the CPU 38. Note that the toner-saving mode in this embodiment is a mode for reducing toner consumption by masking image data every other dot and printing the masked data, to attain toner-saving, in comparison with toner consumption in a normal mode (a mode for printing without performing toner-saving processing). Thus, the toner-saving mode still maintains overall tonality, although overall density in a printed image is reduced.

Figure 7:
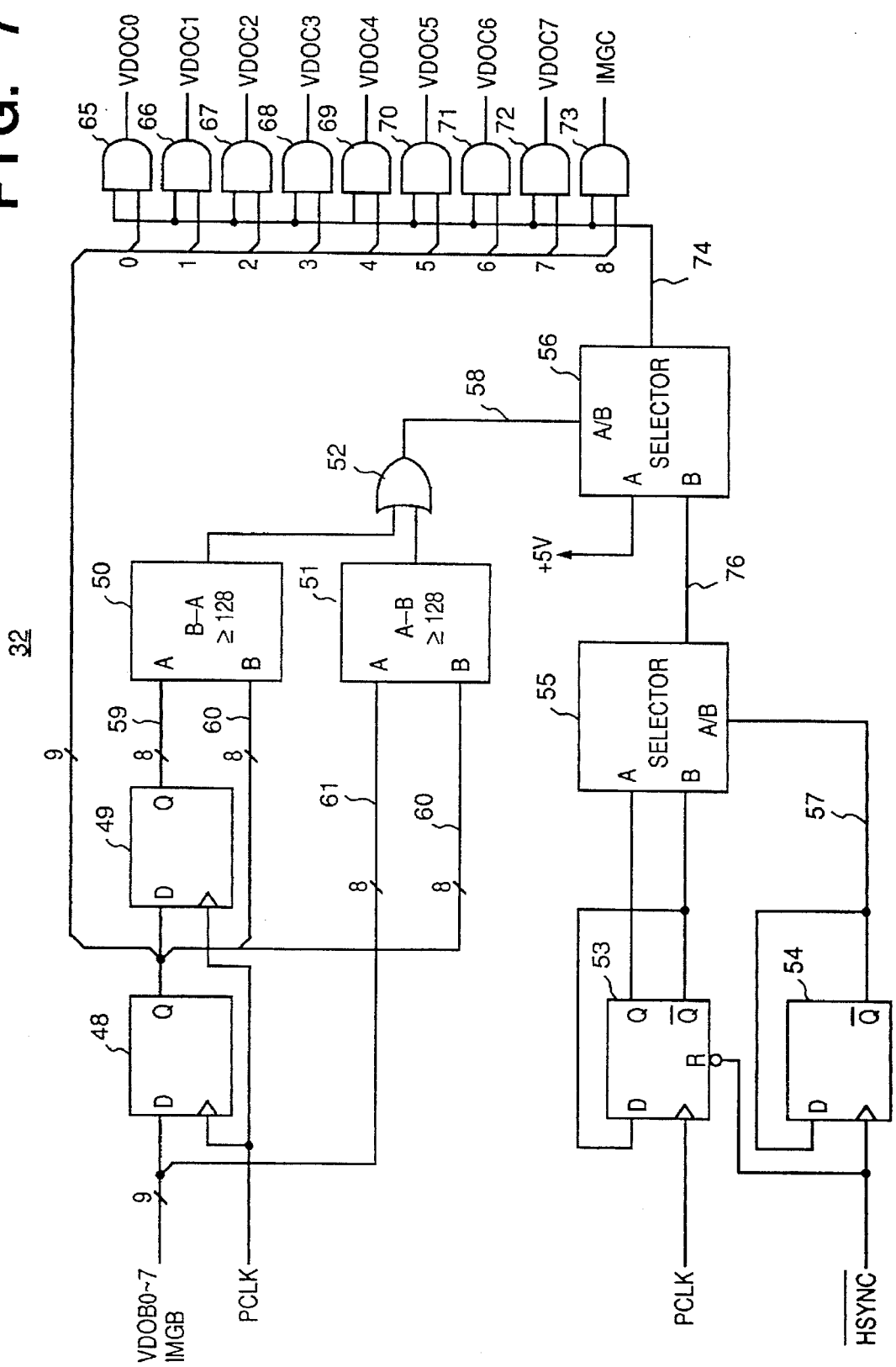
FIG. 7 illustrates a circuitry constructing a toner-saving image converter 32.

FIG. 7 shows a circuitry constructing the toner-saving image converter 32. The toner-saving image converter 32 performs zigzag masking in the main-scanning and subscanning directions using every other dot, but does not perform masking on the outline portion of the image data.

In FIG. 7, a flip-flop 53 generates a toggle of "H" and "L" every other pulse of the PCLK, and inputs a normal output and an inverted output respectively into a selector 55. The selector 55 switches over A-input and B-input every other line in accordance with an output signal 57 from a flip-flop 54, and outputs a signal 76.

A selector 56 performs signal selection for control to avoid sampling on the outline portion of image data. That is, regarding an image signal recognized as a signal of image outline portion, the selector 56 selects the A-input "H" in accordance with an image-edge detection signal 58 so that sampling is not performed. The image-edge detection signal 58 is generated using comparators 50 and 51. The comparators 50 and 51 compare outputs from flip-flops 48 and 49, which simultaneously input 9-bit signals, with 8-bit signals. The 9-bit signal comprises an 8-bit image signal VDOB0–VDOB7 and one-bit attribute designation signal (IMGB), and the 8-bit signal is an 8-bit image signal VDOB0–VDOB7.

As it is understood from FIG. 7, the comparator 50 inputs image signals 59 and 60 supplied in accordance with the first and second clocks of an arbitrary continuous three-clock image signal reading clock (PCLK), while the comparator 51 inputs image signals 60 and 61 supplied in accordance with the second and third clocks of the PCLK. That is, among three continuous pixels, the values of the central pixel and its adjacent pixels are compared. If the density difference between the central pixel and the adjacent pixels is 128 or greater, it is judged that the input image signal corresponds to an image edge portion, then the image-edge detection signal 58 is turned to "H".

The selector 56 outputs a data masking signal 74 to one input terminal of AND circuits 65 to 73. The AND 65 to 73 obtains logical products from the input signal 74 and the aforementioned 9-bit signals inputted into another input terminal, and output masked image signals VDOC0–VDOC7 and IMGC.

Figure 8:
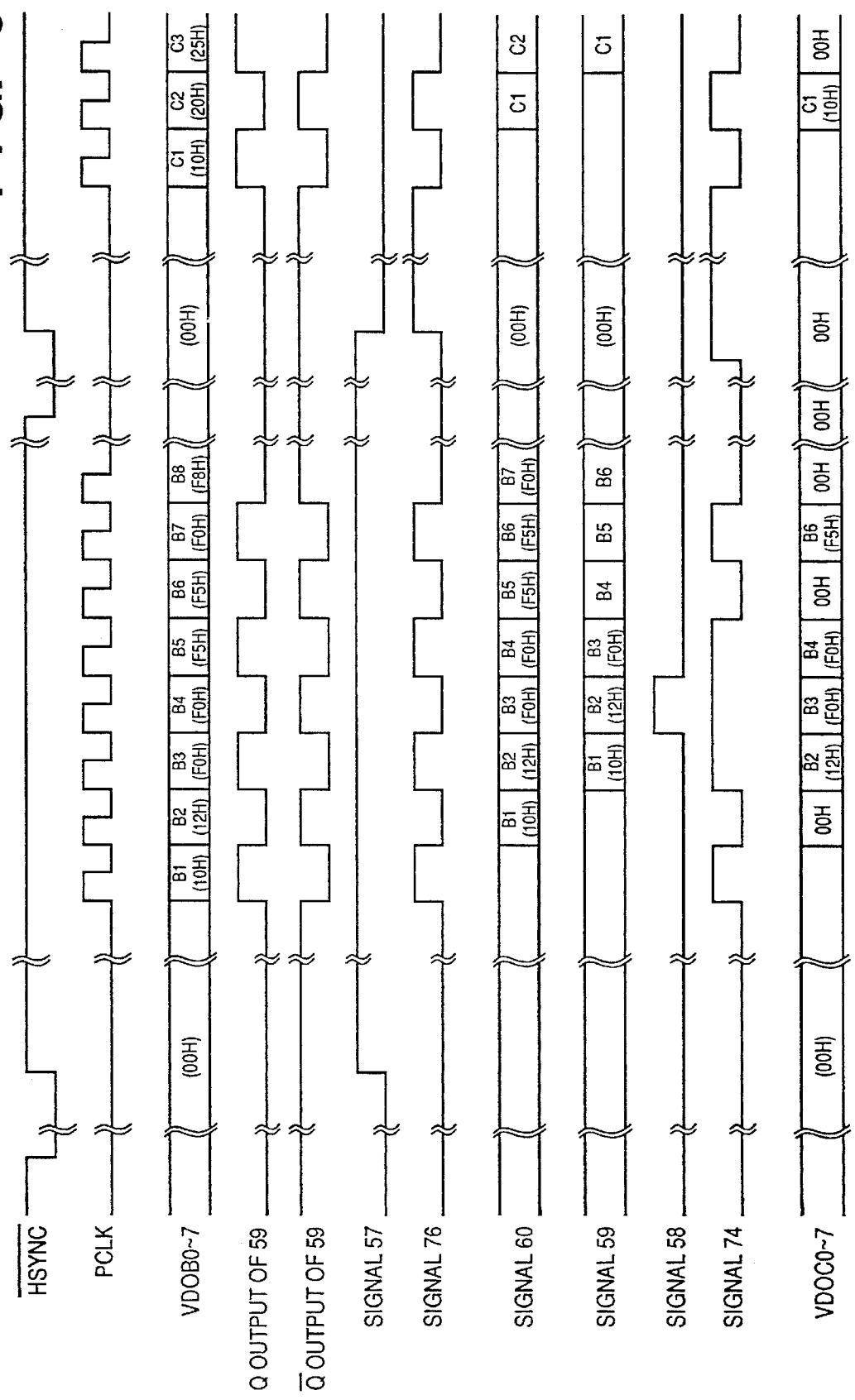
FIG. 8 is a timing chart showing timings of various signals in the toner-saving image converter 32.

FIG. 8 shows the respective signal timings in the toner-saving image converter 32. In this embodiment, the data masking is performed on all the four Y, M, C, K color component data.

Thereafter, a 2-bit color designation signal (COL0, COL1) from the CPU 38 is added to the output image signal from the toner-saving image converter 32, then the signal, as a 11-bit signal, enters the maximum/minimum density pixel detector 33.

In FIG. 5, SCR0–SCR2 represent screen angle control signals to be inputted into the PWM 36.

Figure 9:
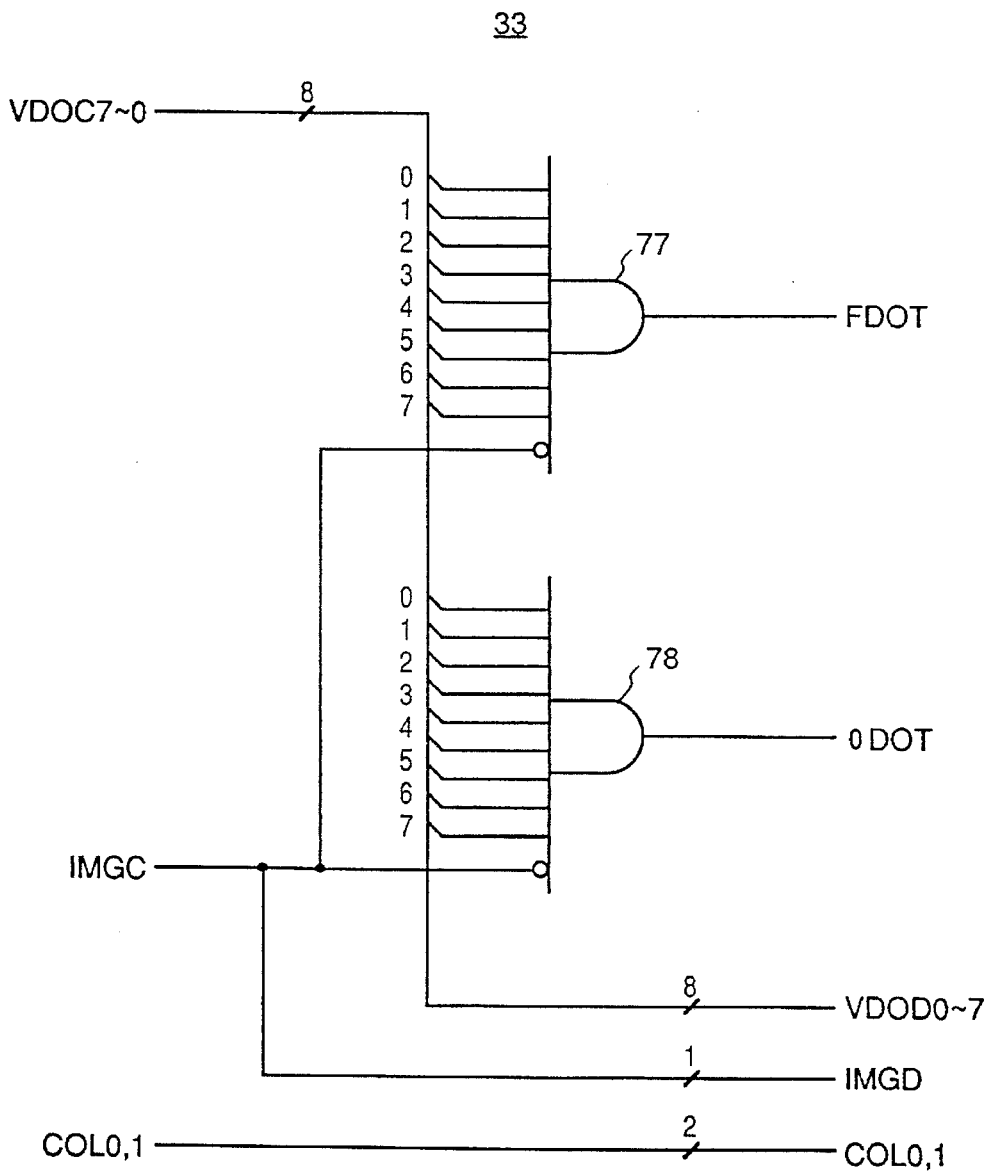
FIG. 9 illustrates a circuitry showing the detailed construction of a maximum/minimum density pixel detector 33.

FIG. 9 shows a logical construction of the maximum/minimum density pixel detector 33. In the maximum/minimum density pixel detector 33, the dot density of an output image is designated as 600 dpi density, in accordance with the value of one-bit attribute designation signal (IMGC). Further, if the value of image signal (VDOC0–VDOC7) is "FF[H: hexadecimal representation]", a signal FDOT is turned to "H", and the output image dot density is designated as 600 dpi. If the image signal (VDOC0–VDOC7) value is "00[H]", a signal 0DOT is turned to "H" and it is outputted.

Figure 10:
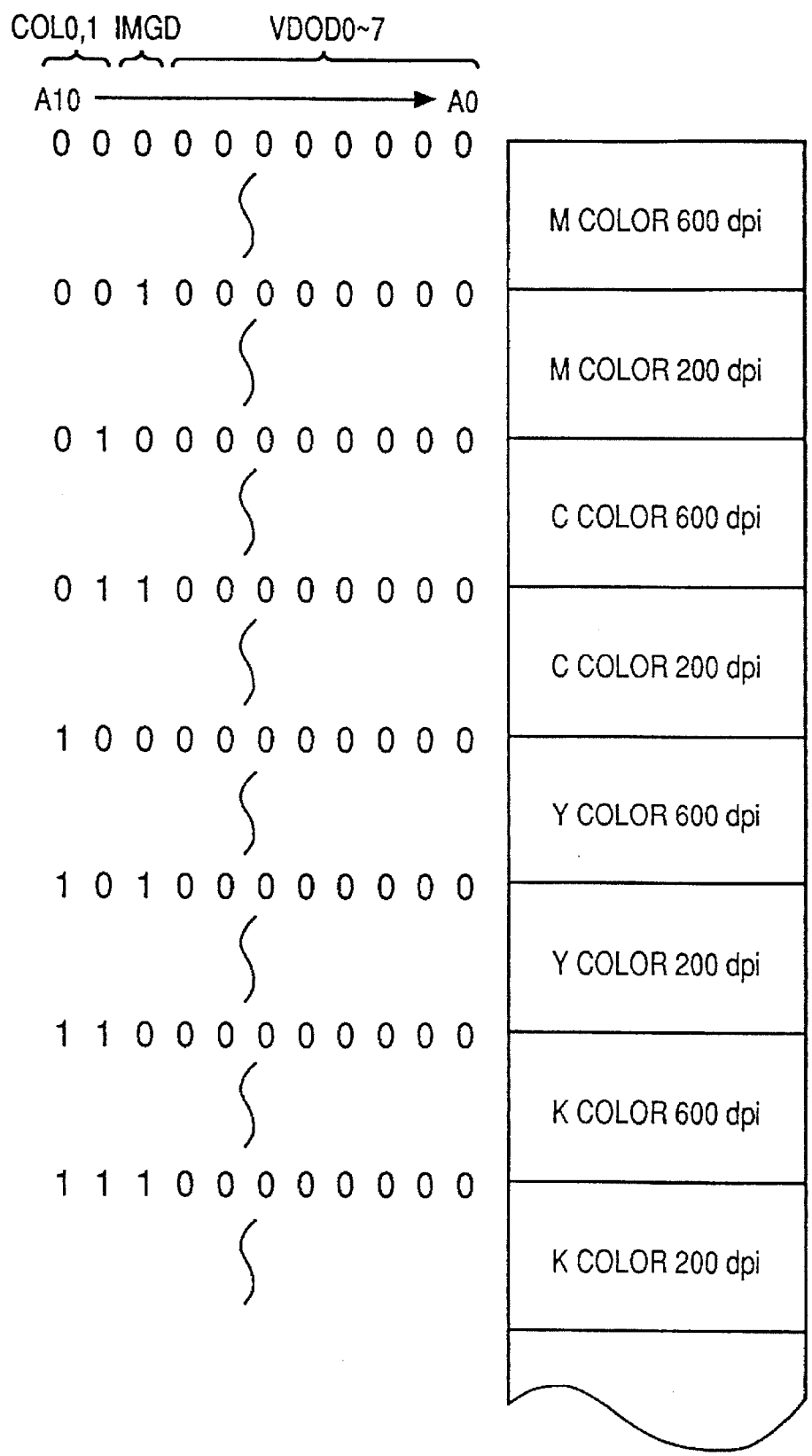
FIG. 10 illustrates the contents of a look-up table of a γ corrector 35.

The γ corrector 35 is a look-up table comprising a RAM. FIG. 10 shows the contents of the look-up table. As shown in FIG. 10, the table has two γ conversion tables for, respectively 200 dpi and 600 dpi dot densities, with respect to M, C, Y and K color components. The contents of the γ conversion table is written by, e.g., the CPU 38, when the power in the printer is turned on.

Next, the writing by the CPU 38 will be described.

The CPU 38 calculates the most appropriate γ correction data in accordance with printer installation environment, and controls the selector 34 to select an address bus 43. Then the CPU outputs a write position address in the RAM of the γ corrector 35 to the address bus 43, and outputs the calculated γ correction data to a data bus 44, then writes the γ correction data on the data bus 44 into a predetermined area of the RAM via the bus transceiver 37.

The data corrected by the γ corrector 35 enters the PWM 36 which generates an analog signal having a pulse width corresponding to the image data and outputs the signal to the semiconductor laser 120.

Figure 11:
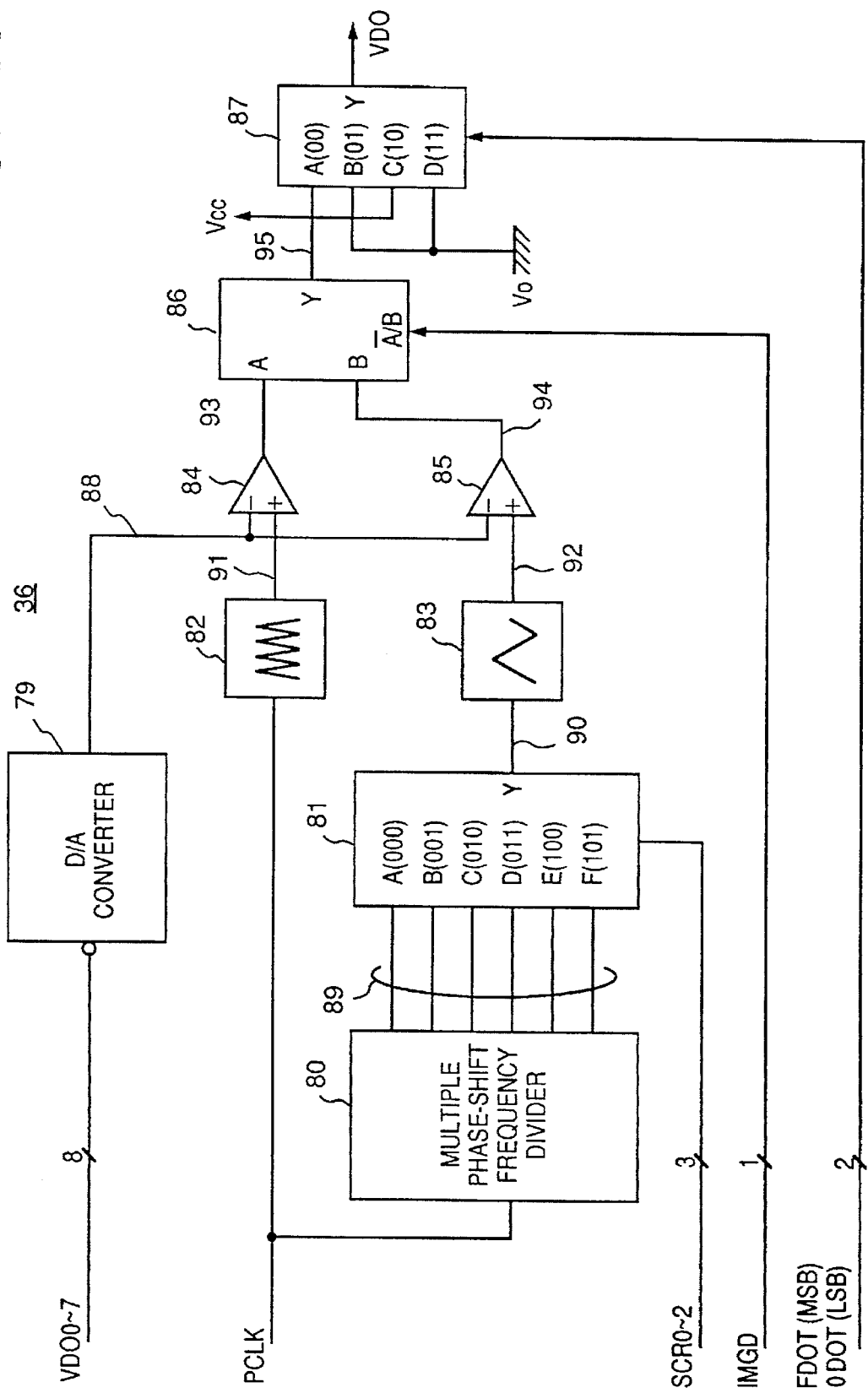
FIG. 11 a block diagram showing the detailed construction of a PWM 36.

FIG. 11 shows the detailed construction of the PWM 36. FIG. 12 shows the operation timing of the PWM 36.

In FIG. 11, numeral 79 denotes a D/A converter which inputs the γ-corrected 8-bit image signal (VDO0–VDO7), performs D/A conversion, and outputs an analog image signal 88 having a voltage corresponding to the input image signal value; 82 and 83, triangular wave generators; 84 and 85, comparators; 86 and 87, selectors; 80, a multiple phase-shift frequency divider which triples the period of the PCLK, and at the same time, generates a clock having eight phase differences; and 81, a selector.

The operation of the PWM 36 having the above construction will be described with reference to the timing chart in FIG. 12.

The triangular wave generator 82 generates a triangular wave 91, based on the image signal reading clock (PCLK), for pulse-width modulation at 600 dpi dot density. The triangular wave generator 83 generates a triangular wave 92, based on a clock signal 89 having a period triple of the PCLK frequency, for pulse-width modulation at 200 dpi dot density. Upon 200 dpi PWM, the present embodiment selects one of the six phases of the clock signal 89 outputted from the multiple phase-shift frequency divider 80 by the selector 81, and performs screen angle control using the phase-shifted clock signal.

FIG. 13 shows the output signal from the multiple phase-shift frequency divider 80. As shown in FIG. 13, the multiple phase-shift frequency divider 80 generates six clocks having different frequency phases, using triple reference clock PCLK. These six clocks 89 (0° shifted clock, 60° shifted clock, 120° shifted clock, 180° shifted clock, 240° shifted clock and 300° shifted clock) respectively enter input terminals A to F of the selector 81. The selector 81 selects one of the six clocks 89 in accordance with the value of an input 3-bit selection signal (SCR2, SCR1 and SCR0 outputted from the CPU 38, as shown in FIG. 5), and outputs the selected clock as a signal 90. For example, to represent 45° screen angle, the selector 81 may select the 0° shifted clock and the 180° shifted clock every other line in the main-scanning direction. That is, (SCR2, SCR1, SCR0)=(0, 0, 0) and (0, 1, 1) are outputted to the selector 81 every other line, thus, clock signals inputted into the input terminals A and D are selected.

The comparator 84 and 85 respectively input the D/A converted image signal 88 into the negative (−) input terminals, while respectively input triangular waves 91 and 92 into the positive (+) input terminals. The selector 86 inputs a pulse-modulated signal 93 from the comparator 84 into A-input terminal, while inputs a pulse-modulated signal 94 from the comparator 85 into B-input terminal.

The selector 86 makes selection in accordance with the input one-bit attribute designation signal (IMGD), i.e., if the dot density of printing output is 200 dpi (IMGD="H") , the selector 86 selects the B-input terminal side while if the dot density is 600 dpi (IMGD="L") , selects the A-input terminal side, and inputs a signal 95 into A-input terminal of the selector 87.

The selector 87 selects an output image signal VDO to be outputted to the semiconductor laser 120 in accordance with the value of the signal FDOT and 0DOT. The selector 87 inputs the signal 95 from the selector 86 into A-input terminal, a ground voltage (V0), into B and D-input terminals, and a reference voltage (Vcc), into C-input terminal. If the signal level of the signal FDOT and that of the signal 0DOT are both "L", the selector 87 selects the signal 95, while if the signal level of the signal FDOT is "L", selects the reference voltage (Vcc), further, if the signal level of the signal 0DOT is "H", the selector 87 selects the ground voltage (V0).

That is, in a case where the output image dot density is designated as 600 dpi and the image signal (VDOC0–VDOC7) value is "00[H]", the ground voltage (V0) is selected, while in a case where the output image dot density is designated to 200 dpi and the image signal value is "FF[H]", the reference voltage (Vcc) is selected.

In this manner, pulse-width signal output is controlled so that an image signal of the maximum/minimum density value has a predetermined image density when the dot density is 600 dpi.

Figure 14A:
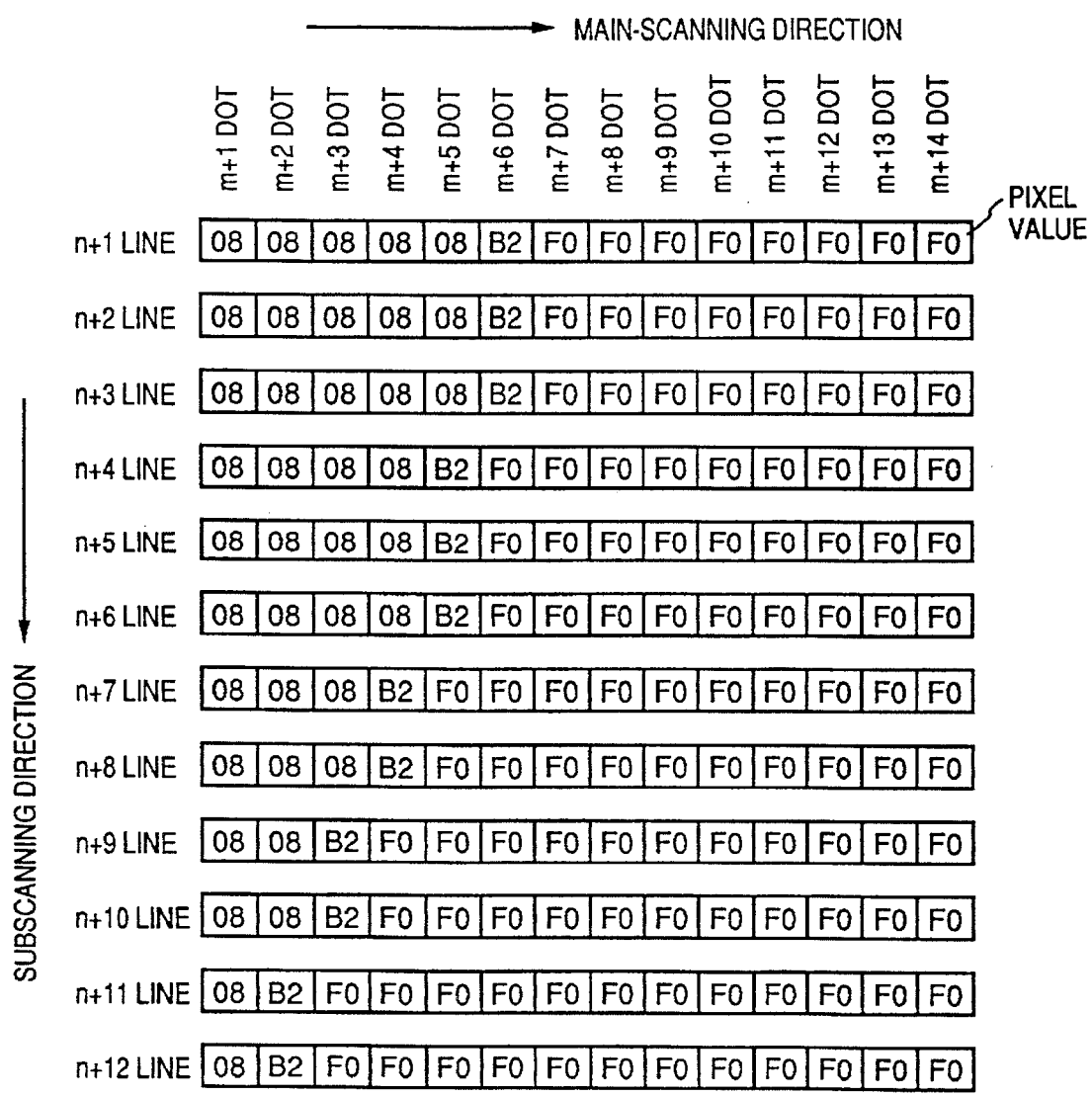
FIG. 14A illustrates γ-corrected pixel values upon normal-mode outputting.
Figure 14B:
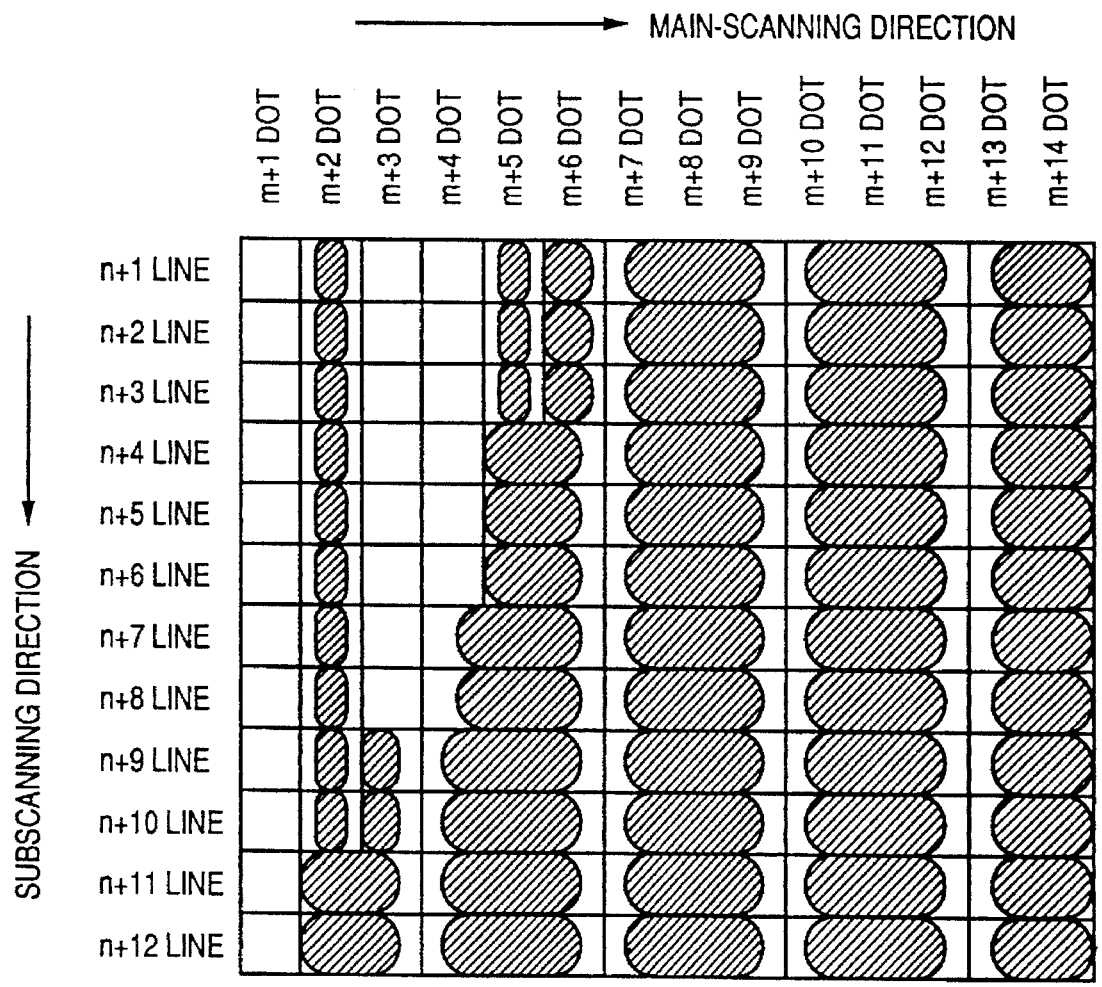
FIG. 14B illustrates respective printed pixels upon normal mode outputting.
Figure 15A:
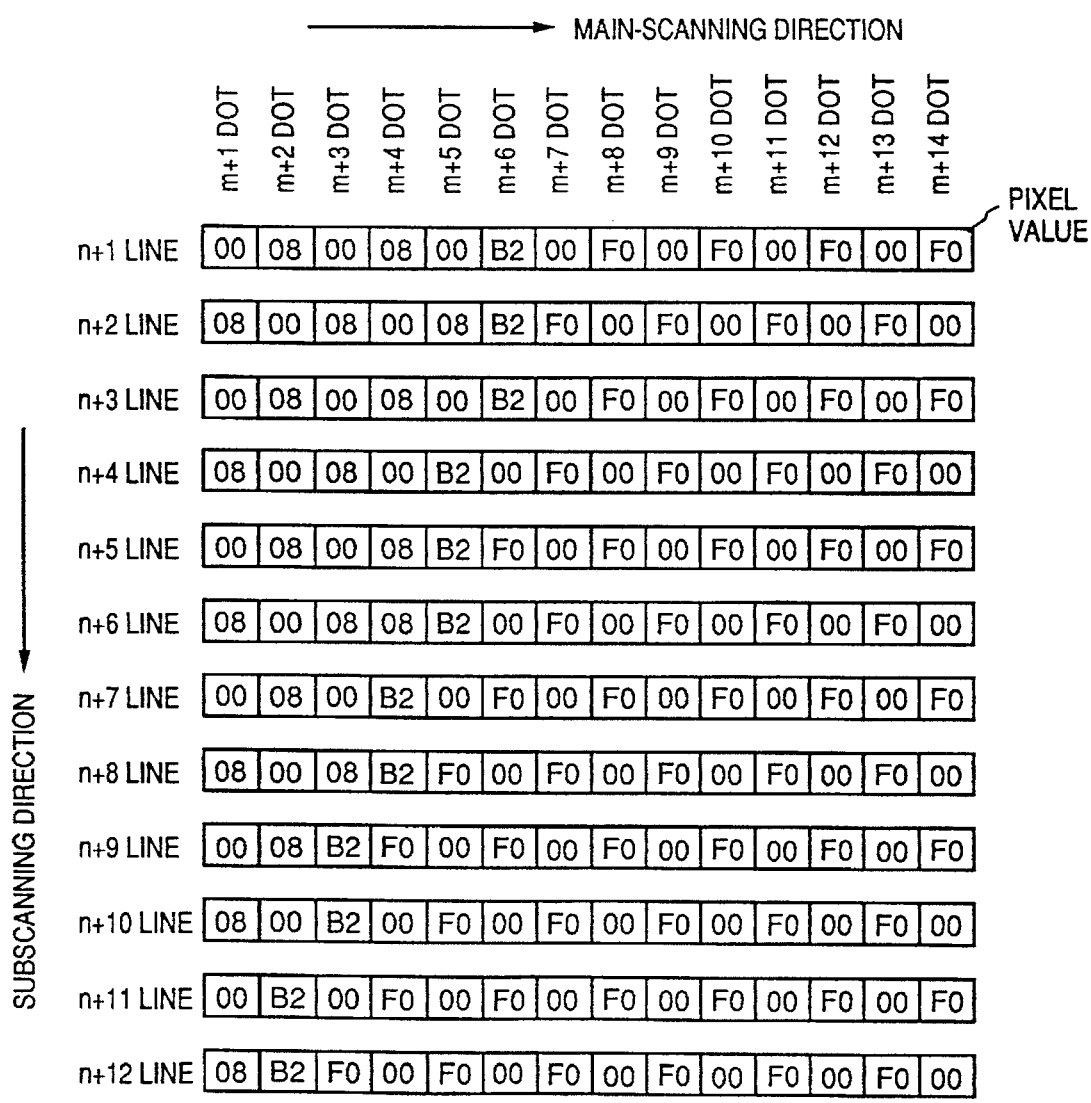
FIG. 15A illustrates γ-corrected pixel values upon toner-saving mode outputting.
Figure 15B:
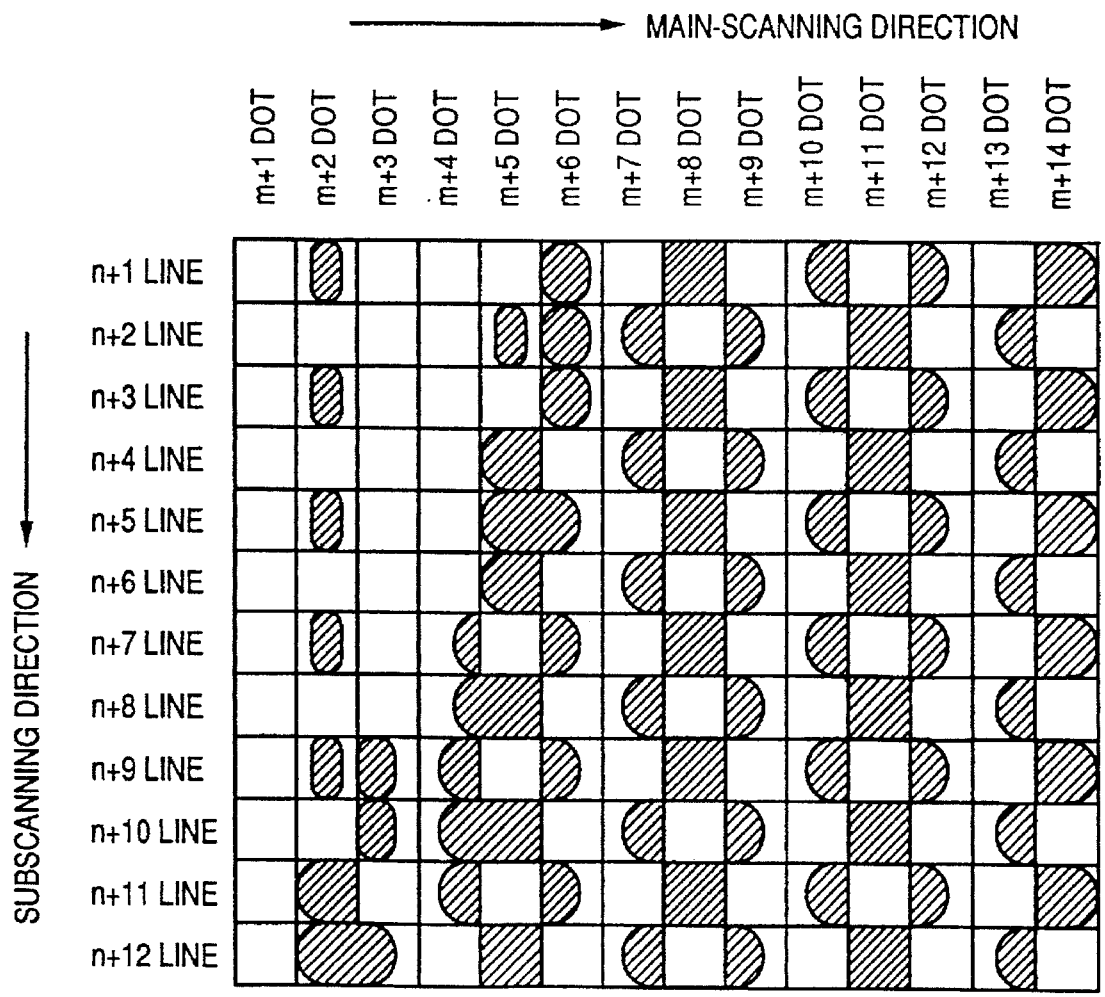
FIG. 15B illustrates respective printed pixels upon toner-saving mode outputting.

FIGS. 14A and 14B and FIGS. 15A and 15B show image pixels outputted by the above processing. FIG. 14A shows γ-corrected pixel values upon normal-mode printing, and FIG. 14B shows the printed pixels. FIG. 15A shows γ-corrected pixel values upon toner-saving mode printing, and FIG. 15B shows the printed pixels.

In FIGS. 14A and 15A, the respective pixel values are in hexadecimal representation. In FIGS. 15A and 15B, hatched areas in respective pixels indicate toner fixed to the recording sheet in accordance with respective pixel values.

As it is understood from the comparison of FIG. 14A with FIG. 15A, in the toner-saving mode, "zero" values are set zigzag every other pixel among the respective γ-corrected pixel values in the main-scanning and subscanning directions. As it is understood from comparison of FIG. 14B with FIG. 15B, in the toner-saving mode, upon printing, toner-output is made zigzag every other pixel in the main-scanning and subscanning directions.

Note that the toner-saving mode may be selected by designation from a keyboard/input unit/control panel (not shown) provided at the printer, or may be selected from the host by a command.

As described above, according to the present embodiment, predetermined pixels of M, C, Y, K color image data are masked in accordance with necessity, and the overall image density is lowered without substantially changing the overall tonality, thus reduces toner consumption. In this case, the image outline portion is not masked, so that the image-edge portion is maintained clear.

Note that in case of a printer which inputs one-bit binary image signal, binary data is zigzag-masked.

In this embodiment, the value of a masked pixel is "00[H]", this does not pose any limitation upon the present invention. For example, a predetermined density value may be provided in place of the minimum density value, otherwise, the initial value of the masked pixel value may be reduced to ¼.

[Second Embodiment]

This embodiment performs pixel sampling (masking) different from that in the first embodiment for reducing toner consumption.

Figure 16:
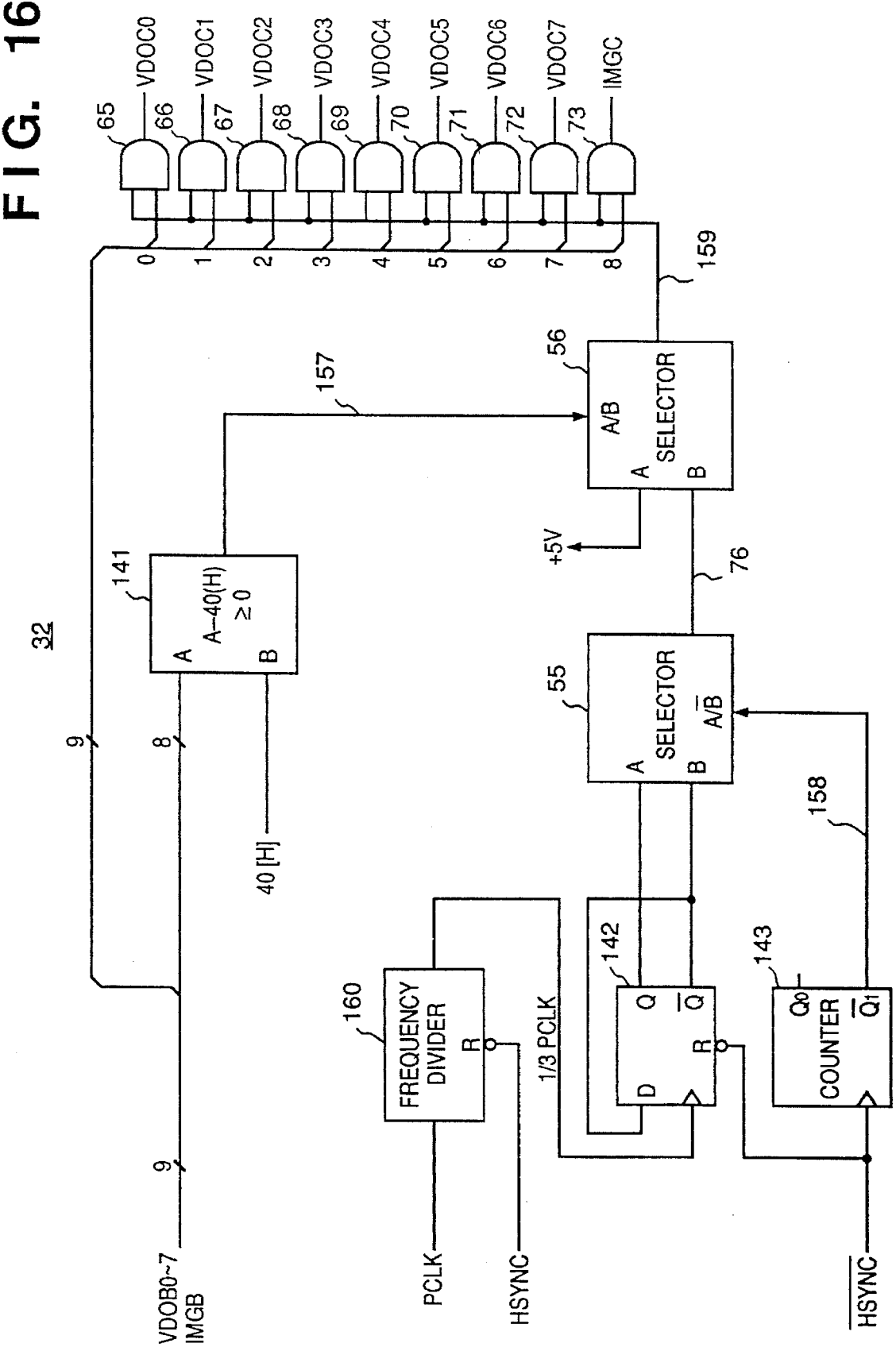
FIG. 16 is a block diagram showing the construction of the toner-saving image converter 32 according to a second embodiment of the present invention.

FIG. 16 shows the detailed construction of the toner-saving image converter 32 according to the present embodiment. The basic construction of the printer used in this embodiment is similar to that used in the first embodiment except for the toner-saving image converter, the explanations of corresponding elements will be omitted. In FIG. 16, elements corresponding to those in FIG. 7 have the same reference numerals and the explanations of the elements will be omitted.

The construction and operation characteristic to the present embodiment will be described below.

As shown in FIG. 16, in the toner-saving image converter 32 according to this embodiment, a flip-flop 142 inputs a ⅓ PCLK obtained from a frequency divider 160 which triples the period of the PCLK signal. A counter 143 controls switching operation of the selector 55. A counter signal 158 outputted from the counter 143 enters the selector 55 which, in accordance with the counter signal value, selects A-input terminal or B-input terminal and outputs the signal inputted into the selected terminal as an output signal 76 to the selector 56.

Thus obtained signal 76 is a control signal for zigzag replacing image data values, i.e., every other pixel value, with value "zero", in the main-scanning and subscanning directions, with three dots in the main-scanning direction and two dots in the subscanning direction as a six-dot unit. A comparator 141 inputs the 8-bit input image data VDOB0–VDOB7 into A-input terminal and compares the data with a predetermined threshold value ("40[H]") inputted into B-input terminal. If the comparator 141 determines that the value of the input image data is less than the threshold value, i.e., the input data corresponds to a lower-density portion, the comparator 141 outputs a control signal 157 to the selector 56, so that the selector 56 selects the A-input terminal. Other wise, the comparator 141 outputs the control signal 157 to the selector 56, so that the selector 56 selects the B-input terminal. In this example, the A-input terminal is for the input image data having a value equal to/greater than the threshold value, while the B-input terminal is for the input image data having a value less than the threshold value. Therefore, the selector 56 selects either the A-input terminal or the B-input terminal in accordance with the control signal 157 from the comparator 141. The selector 56 outputs a signal 159 as a control signal for performing zigzag sampling upon image data having density value equal to/greater than "40[H]", i.e., middle-to-high density image data values, by replacing every other pixel value with value "zero", in the main-scanning and subscanning directions, with three dots in the main-scanning direction and two dots in the subscanning direction as a six-dot unit.

Figure 17B:
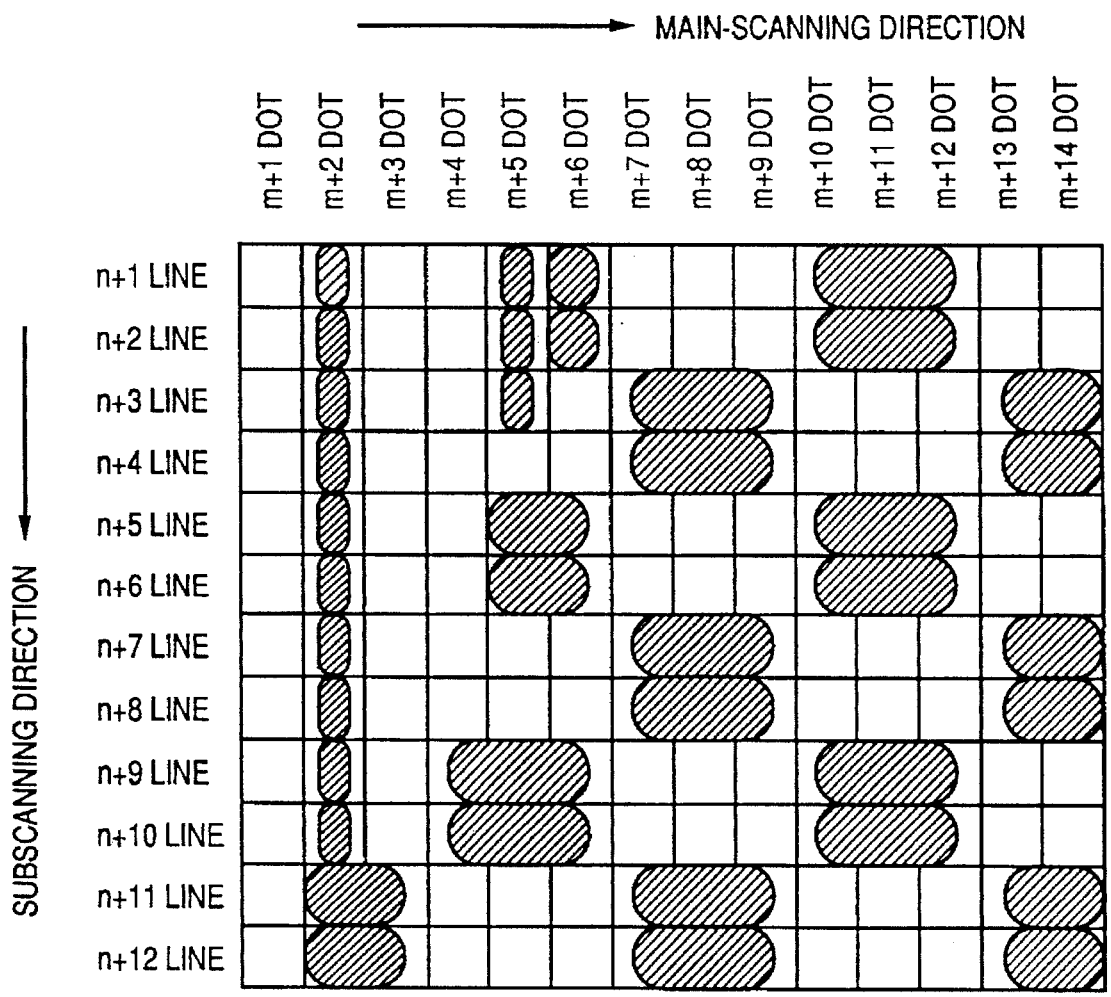
FIG. 17B illustrates respective printed pixels upon printing using the image data in FIG. 17A.

FIG. 17A shows γ-corrected pixel values of the image data obtained from toner-saving image conversion. Note that the original image data of data shown in FIG. 17A is data shown in FIG. 14A. FIGS. 17B shows printed pixels of the data in FIG. 17A.

It should be noted that the pixel values in FIG. 17A are in hexadecimal representation. In FIG. 17B, the hatched areas in the respective pixels represent toner fixed to the recording sheet in accordance with the respective pixel values.

Accordingly, the present embodiment performs masking M, C, Y and K image data having a density value equal to/greater than a predetermined threshold value, to lower the overall density of the image data without substantially changing the overall tonality of the output image, thus attains toner saving. Further, the present embodiment prohibits masking on a lower-density image portion to prevent degradation of image quality at the lower-density portion.

[Third Embodiment]

The third embodiment employs the γ corrector to perform function similar to the toner-saving image conversion by the converter 32 as described in the first and second embodiments.

Figure 18:
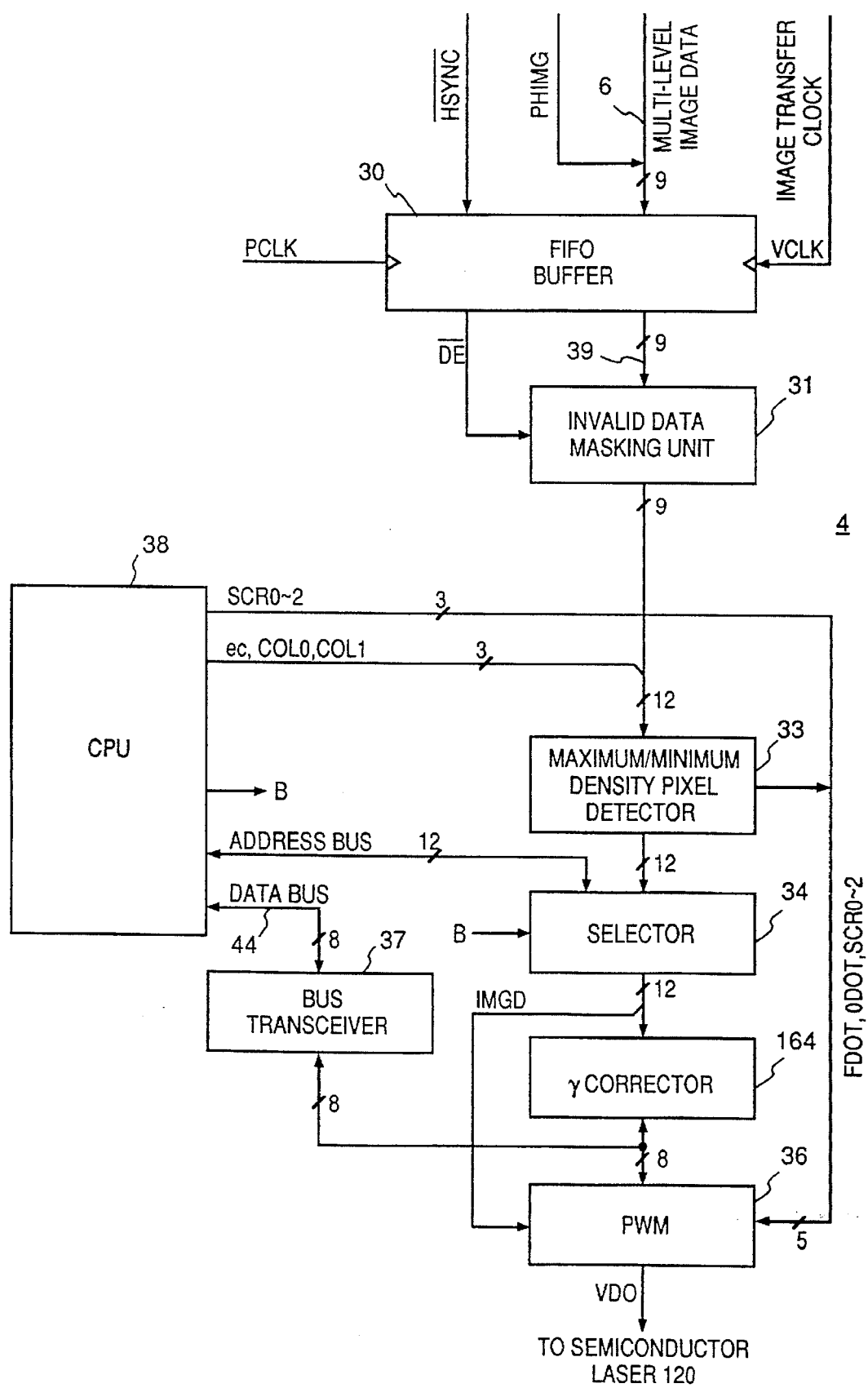
FIG. 18 is a block diagram showing the detailed construction of the signal processor 4 according to a third embodiment of the present invention.

FIG. 18 shows the detailed construction of the signal processor 4 according to the present embodiment. The basic construction of the printer used in this embodiment is similar to that used in the first embodiment, therefore, the explanations of corresponding elements will be omitted. In FIG. 18, elements corresponding to those in those of the signal processor 4 show in FIG. 5 have the same reference numerals and the explanations of those elements will be omitted.

The construction and operation characteristic to the present embodiment will be described below.

In this embodiment, image conversion in the toner-saving mode is performed by a γ corrector 164. That is, the γ corrector 164 converts the overall image density to a lower density.

In FIG. 18, when execution of the toner-saving mode is instructed from the CPU 38, a toner-saving designation signal ec of level "H" (high level) is outputted. The CPU 38 writes γ correction data into the γ corrector 164 at the same timing and with the same data path as those in the first embodiment. In this embodiment, the CPU 38 writes γ correction data for normal mode printing and γ correction data for toner-saving mode printing at this time.

Figure 19:
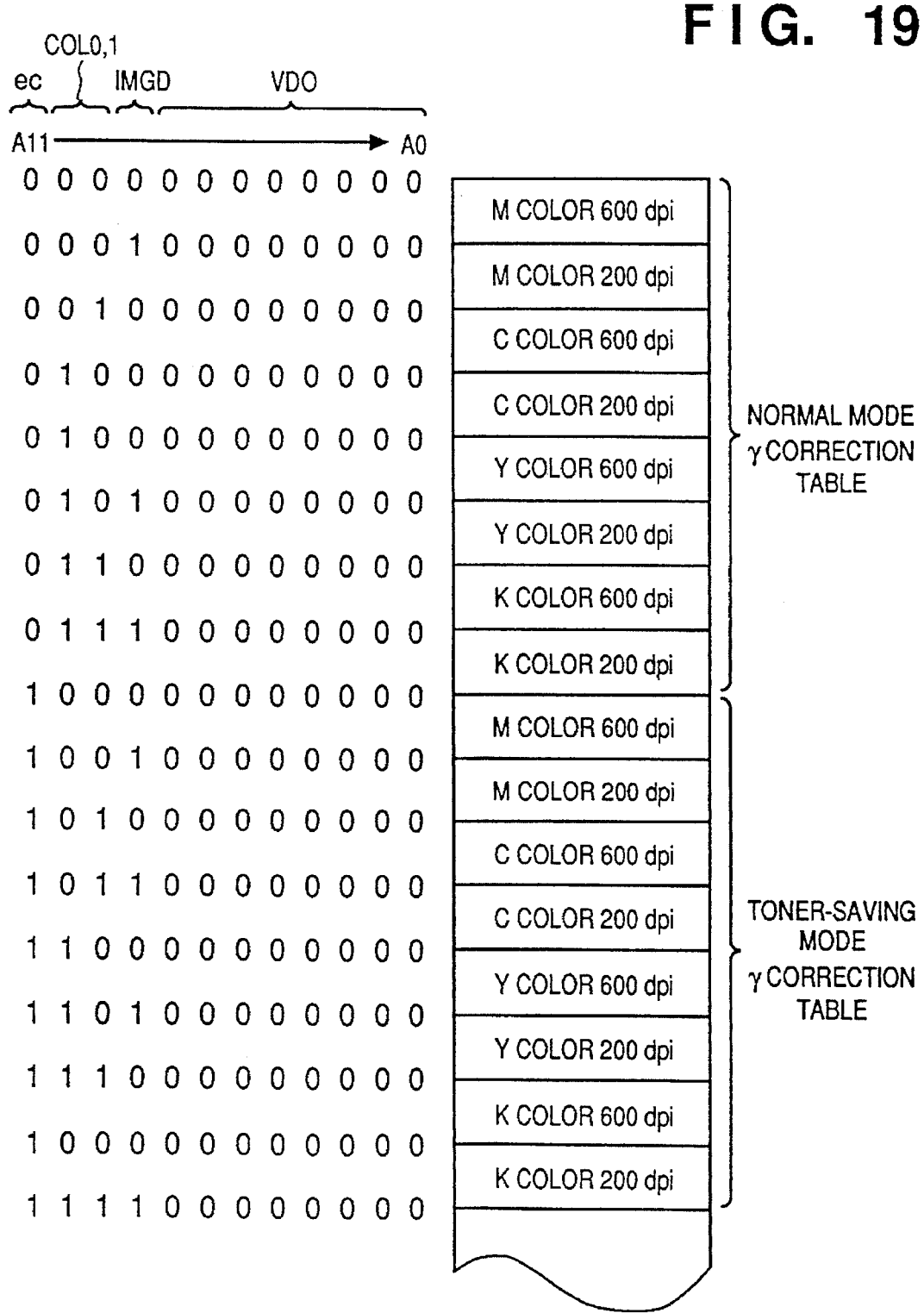
FIG. 19 illustrates the contents of a γ-correction table of a γ corrector 164 according to the third embodiment.

FIG. 19 shows the construction of the γ correction table of the γ corrector 164. Compared with the γ correction table of the first embodiment shown in FIG. 10, the γ correction table of this embodiment has two look-up tables for the normal mode and the toner-saving mode.

Upon image signal processing, the γ corrector 164 performs γ correction in accordance with the toner-saving designation signal ec outputted from the CPU 38. That is, if the toner-saving designation signal ec value is "H" (high level), the γ corrector 164 selects a look-up table having γ correction data for the toner-saving mode to lower the image density. On the other hand, if the toner-saving designation signal ec value is "L" (low level), the γ corrector 164 selects the other look-up table having γ correction data for the normal mode and performs γ correction without changing image density.

Figure 20:
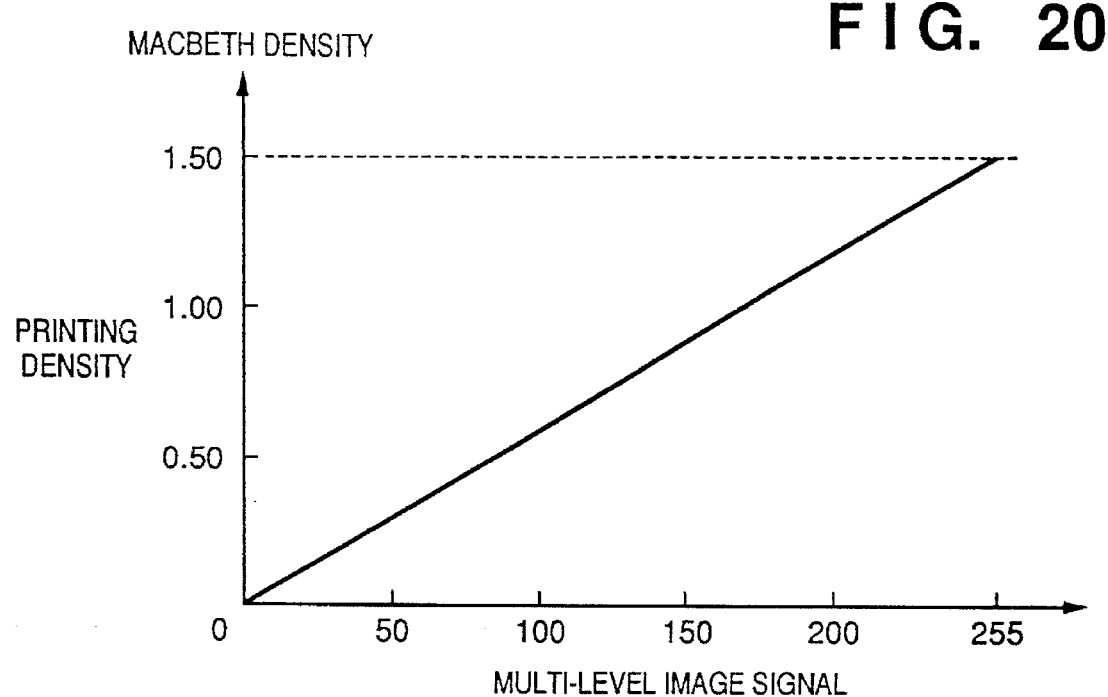
FIG. 20 is a line chart showing the relation between an image signal density and a printing density in the normal mode.
Figure 21:
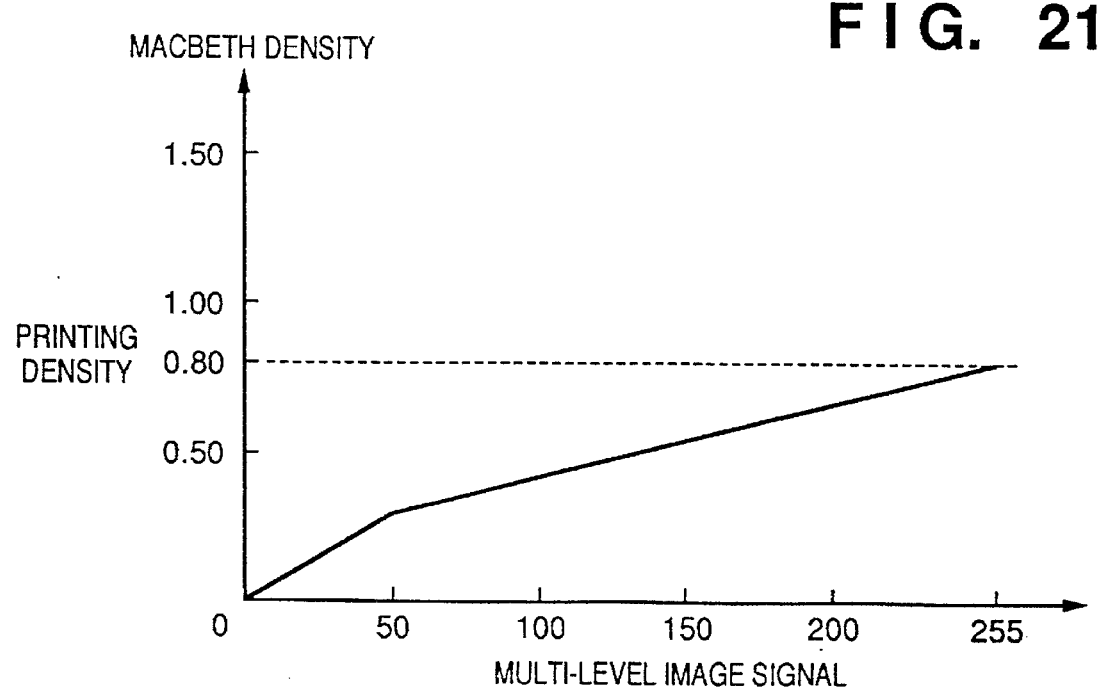
FIG. 21 is a line chart showing the relation between an image signal density and a printing density in the toner-saving mode.

FIGS. 20 and 21 show the relation between density value of γ-corrected image signal and printing density. Specifically, FIG. 20 shows the relation in the normal mode, and FIG. 21 shows the relation in the toner-saving mode.

As it is understood from comparison of FIG. 20 with FIG. 21, in the toner-saving mode, when the signal value is less than "50", i.e., the signal corresponds to a highlighted portion, the relation between the image signal density value and the printing density is the same as that in the normal mode. From the point where the signal value is over "50", i.e., the signal corresponds to a middle-to-high density portion, γ correction is performed to suppress the increase of printing density with respect to the increase of image signal value so that the printing density does not increase as in the normal mode. Generally in electrophotographic printing, density of at a highlighted portion is unstable. In consideration of this density instability at a highlighted portion, the present embodiment performs γ correction so as to prevent degradation of density at a highlighted portion, but to lower the density of a middle-high portion, thus reduces toner consumption.

As described above, according to the present embodiment, the simple construction of only switching a γ correction table lowers the overall image density without substantially changing the overall tonality, attains toner saving without using any specific circuit for reducing toner consumption.

[Fourth Embodiment]

Figure 22:
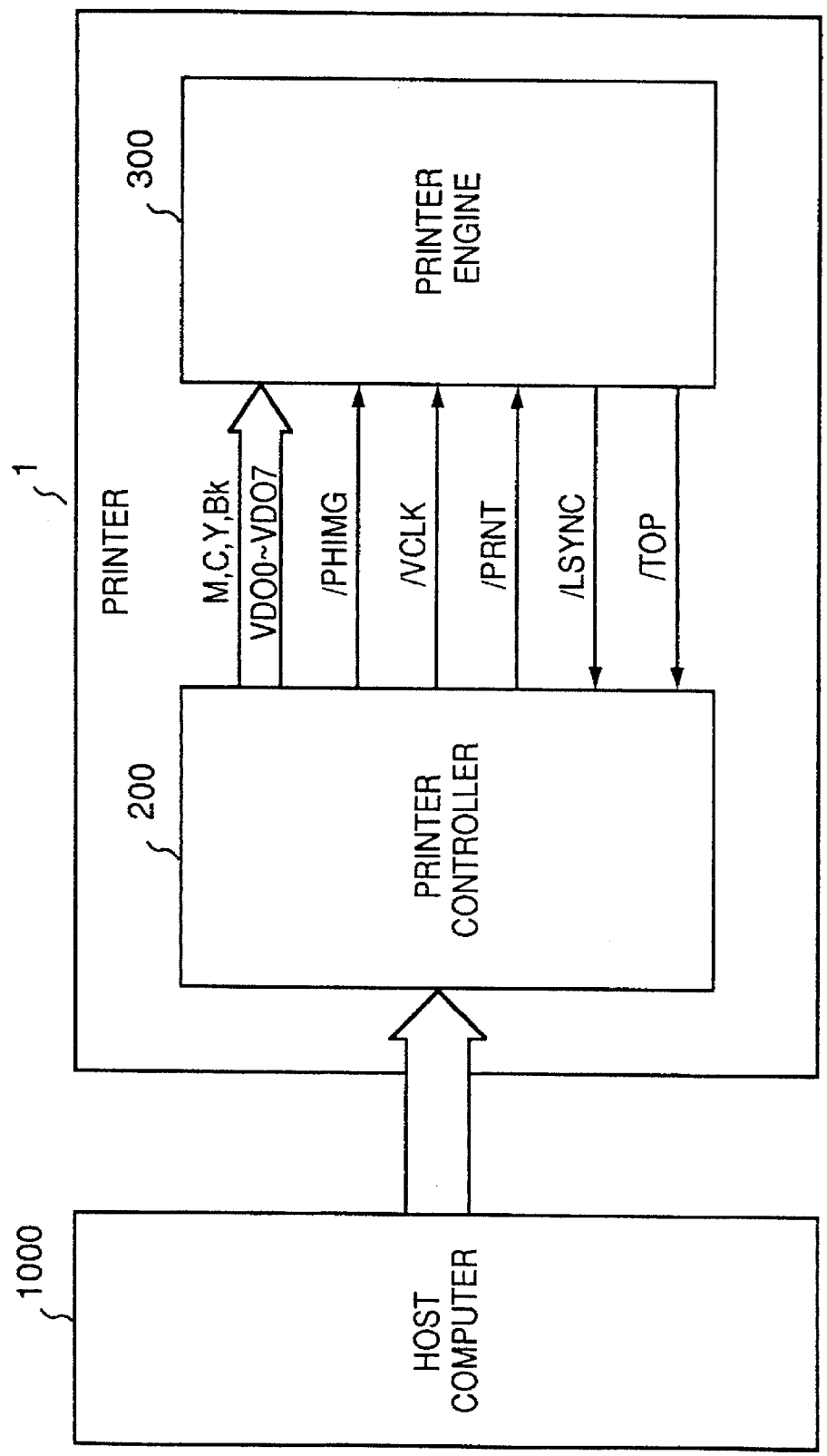
FIG. 22 is a block diagram showing the connection between a host computer and the color laser-beam printer in FIG. 1.

FIG. 22 shows the connection between the host and the printer of the fourth embodiment.

In FIG. 22, numeral 1000 denotes a host; 200, a printer controller; 300, a printer engine; and 1, the printer of the general embodiment. As shown in FIG. 22, the printer 1, comprising the printer controller 200 and the printer engine 300, receives image information generated by a predetermined application soft from the host 1000, interprets the information into actual output image data by the printer controller 200, and transfers the image data (VDO0–VD07) to the printer engine 300. The printer engine 300 performs image formation based on the image data (VDO0–VD07) and outputs a full-color image. Considering the connection between the printer and the host as shown in FIG. 22 and the printer construction as shown in FIG. 1, it is understood that the printer engine 300 is a unit of the printer 1 shown in FIG. 1 excluding the printer controller 200.

It should be noted that in the following description, image data (VDO0–VD07) is frame-sequentially outputted in the order of magenta (M), cyan (C), yellow (Y) and black (B) color components. The printer engine 300 outputs an image on a recording medium such as a recording sheet at 600 dpi resolution (dot density).

First, the printer controller 200 completes preparation for outputting image data for one page, then outputs a printing start signal (/PRINT) to the printer engine 300 to instruct the printer engine to start printing operation. In response to the signal, the printer engine 300 starts preparation for printing. When the printer becomes in printing-enable status, it outputs a page (subscanning direction) synchronizing signal (/TOP) with respect to M color to the printer controller 200, at the same time, outputs a main-scanning direction synchronizing signal (/LSYNC). In response to the received signals, the printer controller 200 outputs M color image data (VDO0–VD07) with a one-bit attribute designation signal (/PHIMG) designating resolution-oriented output or tonality-oriented output, in synchronization with data transfer clock (/VCLK), to the printer engine 300. As the M color data transfer is completed, subsequent C color, Y color and K color data are sequentially transferred.

Figure 23:
FIG. 23 is a timing chart showing timings of various control signals associated with image forming sequence for one page.

The timings of various control signals regarding this one-page image data formation sequence are as shown in the timing chart of FIG. 23. In FIGS. 23, the /TOP signal is 4-pulse outputted with respect to one-page color-printing, in accordance with process timings of the respective M (magenta), C (cyan), Y (yellow) and K (black) toners, The main-scanning direction synchronizing signal (/LSYNC) is generated by the printer engine 300 as a signal corresponding to the BD signal. The /VDO signal is representative of 8-bit/color component image signals having 600 dpi recording density to be outputted in synchronization with the /LSYNC signal. The printer controller 200 outputs M (magenta) VDO signal in response to the initial pulse TOP signal; C (cyan) VDO signal, in response to the second pulse /TOP signal; Y (yellow) VDO signal, in response to the third pulse /TOP signal; and K (black) VDO signal, in response to the fourth pulse /TOP signal.

Figure 24:
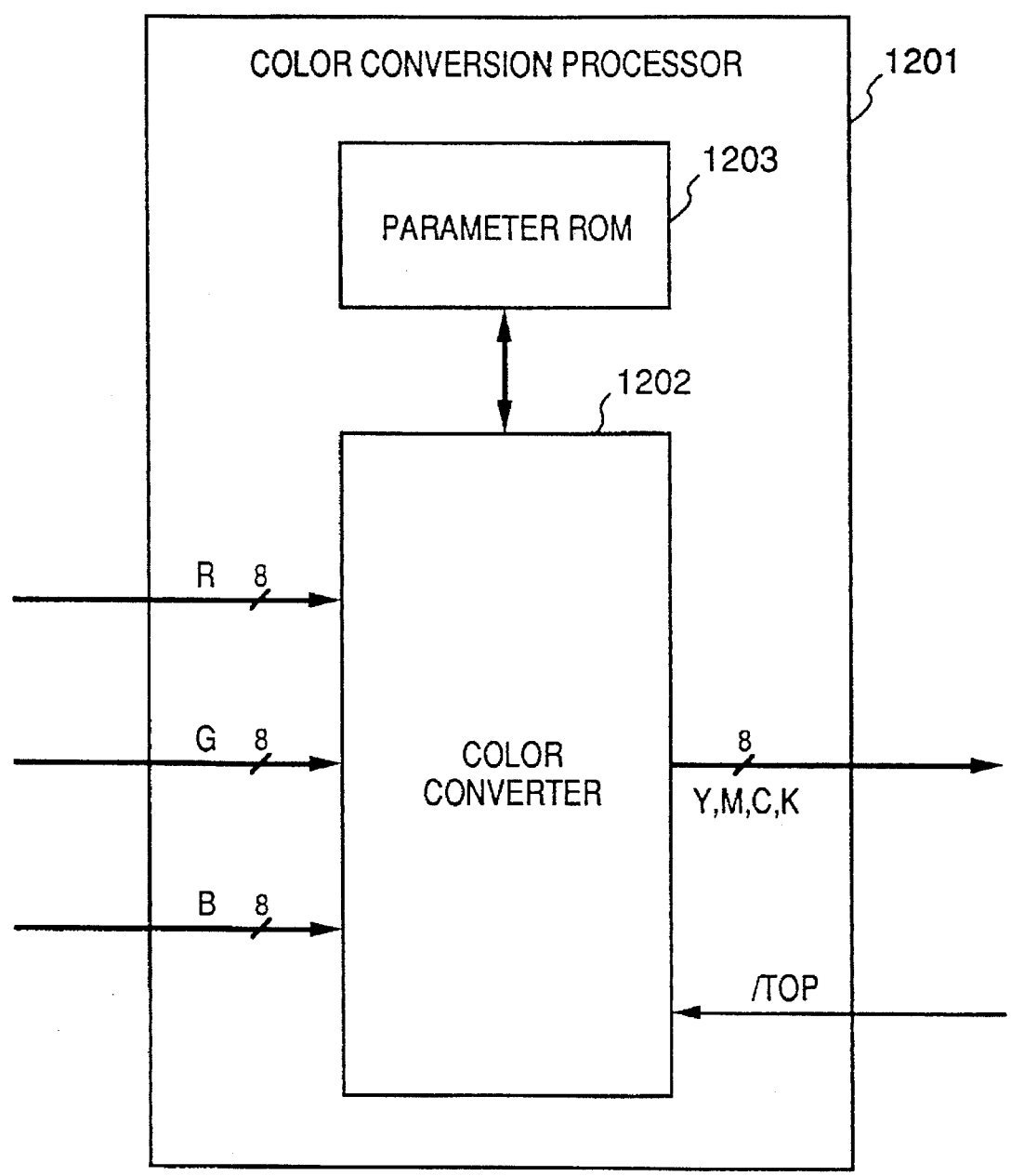
FIG. 24 is a block diagram showing the construction of a color conversion processor 201 as one element of a printer controller 2.

FIG. 24 shows the construction of a color conversion processor 1201 as one element of the printer controller 200. The printer controller 200 inputs the 8-bit/pixel/color component image data from the host 1000. The color conversion processor 1201 serves as a signal processor which converts image data represented by RGB color space into image data represented by YMCK color space. In FIG. 24, the 600 dpi RGB image data (8-bit/each RGB color data) enters the color converter 1202.

The color converter 1202 inputs parameter from a parameter ROM 1203, and generates an 8-bit M signal in response to the first pulse /TOP signal, by arithmetic operation or LUT conversion. Next, the color converter 1202 generates an 8-bit C signal in response to the second pulse /TOP signal, then, generates an 8-bit Y signal in response to the third pulse /TOP signal, and finally, generates an 8-bit K signal in response to the fourth pulse /TOP signal. During this process, masking and under-color removal (UCR) are performed in accordance with color-representability of the printer engine 300, and image data obtained from the color conversion is outputted to the printer engine 300.

Figure 25:
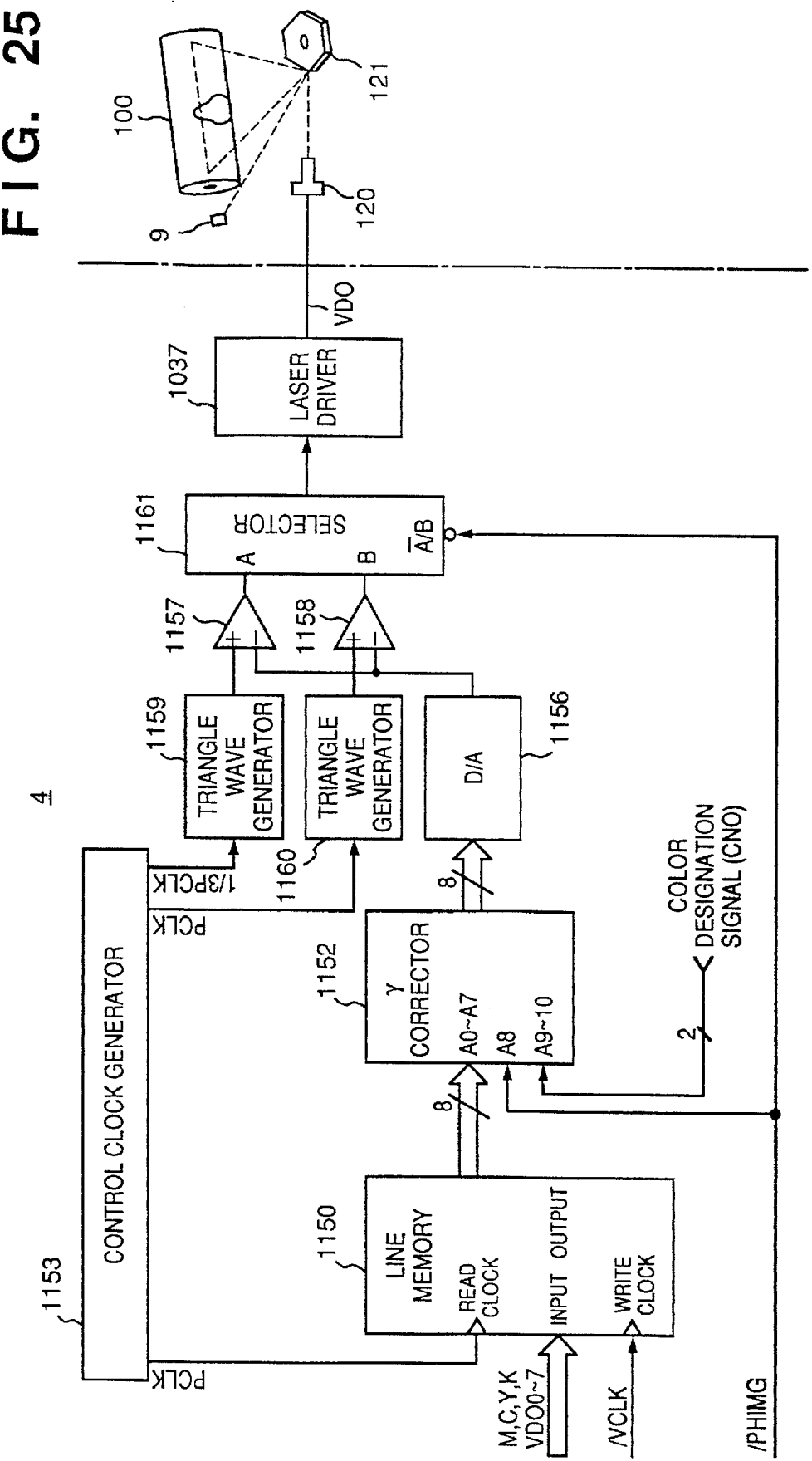
FIG. 25 is a block diagram showing the construction of the signal processor 4 according to a fourth embodiment of the present invention.

FIG. 25 shows the schematic construction of the signal processor 4 of the printer engine 300. The image data (VDO0–VD07) outputted from the printer controller 200 is written into a line memory 1150. The stored data is read out in synchronization with the rising edge of a clock (PCLK) generated by a control clock generator 1153, and inputted into a γ corrector 1152. The γ corrector 1152 is an LUT comprising e.g. a RAM or a ROM (hereinafter the γ corrector is referred to as "LUT"). The image data is inputted into addresses A0–A7, the /PHIMG signal is inputted into an address AS, and a 2-bit color designation signal (CN0) is inputted into addresses A9–A10 of the LUT 1152.

Figure 26:
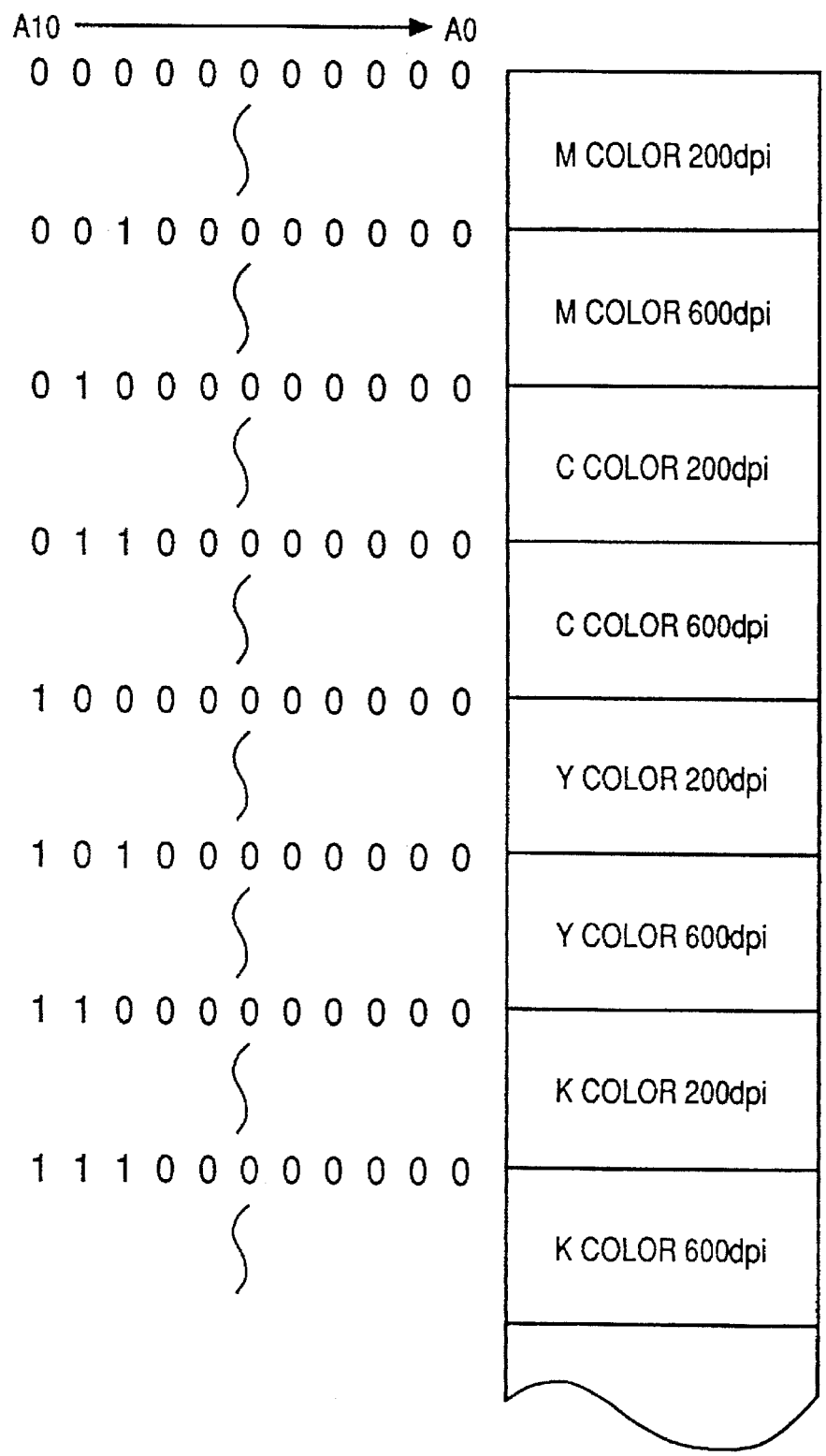
FIG. 26 illustrates a data map of a look-up table (LUT) 152.

FIG. 26 shows the data map of the LUT 1152. As shown in FIG. 26, MCYK γ conversion data for printing at 600 dpi density in the main-scanning direction and MCYK γ conversion data for printing at 200 dpi density in the main-scanning direction are stored in the LUT 1152. One of the 600 dpi γ conversion data or the 200 dpi γ conversion data is selected by the /PHIMG signal inputted into the address AS, and one of color component data is selected from the YMCK component data by the 2-bit color designation data (CN0) inputted into the addresses A9–A10. As described above, the color designation data (CN0) is arranged in the order of MCYK at each pulse-input of the /TOP signal.

The LUT 1152 outputs 8-bit data to a D/A converter 1156 which converts the data into an analog voltage signal and outputs the signal into the negative (−) terminals of comparators 1157 and 1158. On the other hand, triangular wave generators 1159 and 1160 output triangular waves into the positive (+) terminals of the comparators 1157 and 1158. The triangular wave generator 1160 converts the clock (PCLK) into the triangular wave using an integrator, and the triangular wave generator 1159 converts a clock (⅓ PCLK) having a tripled frequency of the clock PCLK period into the triangular wave using an integrator. The comparators 1157 and 1158 output a signal of value "1" within an interval where the respective triangular wave level exceed the level of the D/A converter 1156 output signal.

Figure 27:
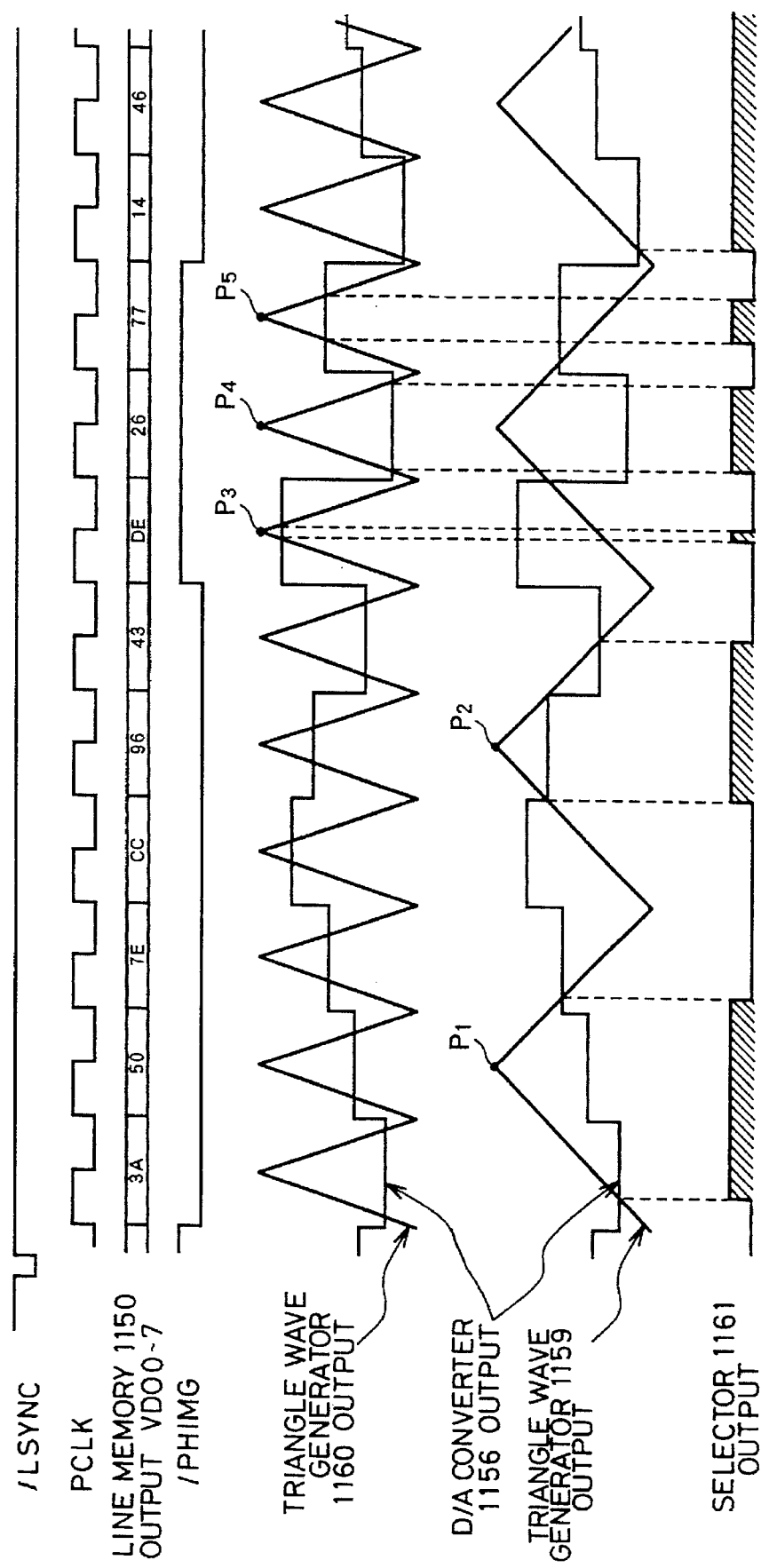
FIG. 27 is a timing chart shoring timings of various signals upon image formation at 200 dpi and 600 dpi printing densities.

As shown in the timing chart of FIG. 27, upon image formation at 200 dpi density, as to each pulse applied to the laser driver 1037, the comparator 157 outputs a pulse-width modulation signal, where the pulse width grows with triangular wave peaks (FIG. 27, P1 and P2) as the central points, into the A-input terminal of the selector 1161. On the other hand, upon image formation at 600 dpi density, as to each pulse applied to the laser driver 1037, the comparator 1158 outputs a pulse-width modulation signal, where the pulse width grows with triangular wave peaks (FIG. 27, P3, P4 and P5) as the central points, into the B-input terminal of the selector 1161. The selector 1161 inputs one-bit attribute designation signal (/PHIMG) to select the comparator 1158 output (/PHIMG="H") or the comparator 1157 output (/PHIMG="L") as an output signal to the laser driver 1037. The laser driver 1037 outputs the image signal VDO in accordance with the signal from the selector 1161 to drive the semiconductor laser 120.

Accordingly, when the image data shown in FIG. 27 is inputted, the timing of switching 200 dpi image formation and 600 dpi image formation is as follows.

That is, one color component signal of the respective color component image signal (/VDO) is inputted, in the order of "3A (hexadecimal representation)", "50", "7E", "CC", "96", "43", "DE", "26", "77", "14" and "46" in the main-scanning direction, the /PHIMG value is "L" with respect to "3A", "50", "7E", "CC", "96","43", "14" and "46", i.e., 200 dpi density image formation is designated. With respect to "DE", "26" and "77", the /PHIMG value is "H", i.e., 600 dpi density image formation is designated. In this manner, when /PHIMG="L", the selector 1161 selects the comparator 1157 output, while when /PHIMG="H", selects the comparator 1158 output.

Figure 28:
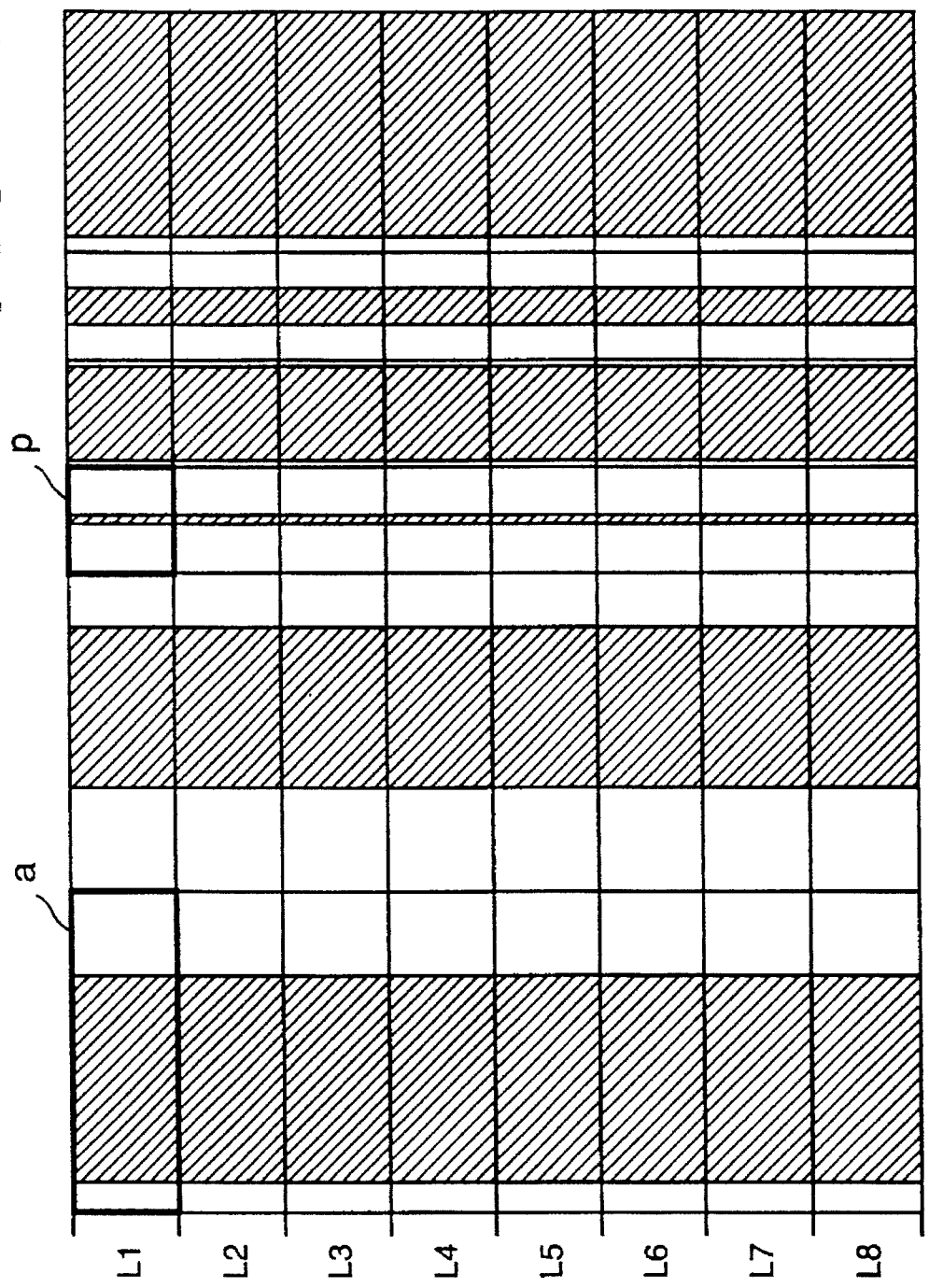
FIG. 28 illustrates an image output example.

As a result, the output image is as shown in FIG. 28. In FIG. 28, for the purpose of simplicity, the same image data is inputted for the first line (L1), the second line (L2), the third line (L3), ... Numeral a represents an image portion outputted at 200 dpi density, and p, an image portion outputted at 600 dpi density. The portion a can attain sufficient tonality, but the portion p cannot attain sufficient tonality with respect to the resolution. For this reason, normally, binary-like data signal such as "00" or "FF" may be inputted, otherwise, data signal of some representable level may be inputted.

As described above, according to the present embodiment, the color laser-beam printer of 600 dpi density outputs resolution-oriented images such as character images at 600 dpi density, while outputs tonality-oriented images such as picture images at 200 dpi density, thus attains high image quality upon printing an image as a mixture of character and picture images.

[Fifth Embodiment]

The present embodiment is a printer where the signal processor 4 in FIG. 25 further includes a toner-saving processor to reduce toner consumption. Note that the overall apparatus construction is similar to that of the fourth embodiment and the explanation of the construction will be omitted.

Figure 29:
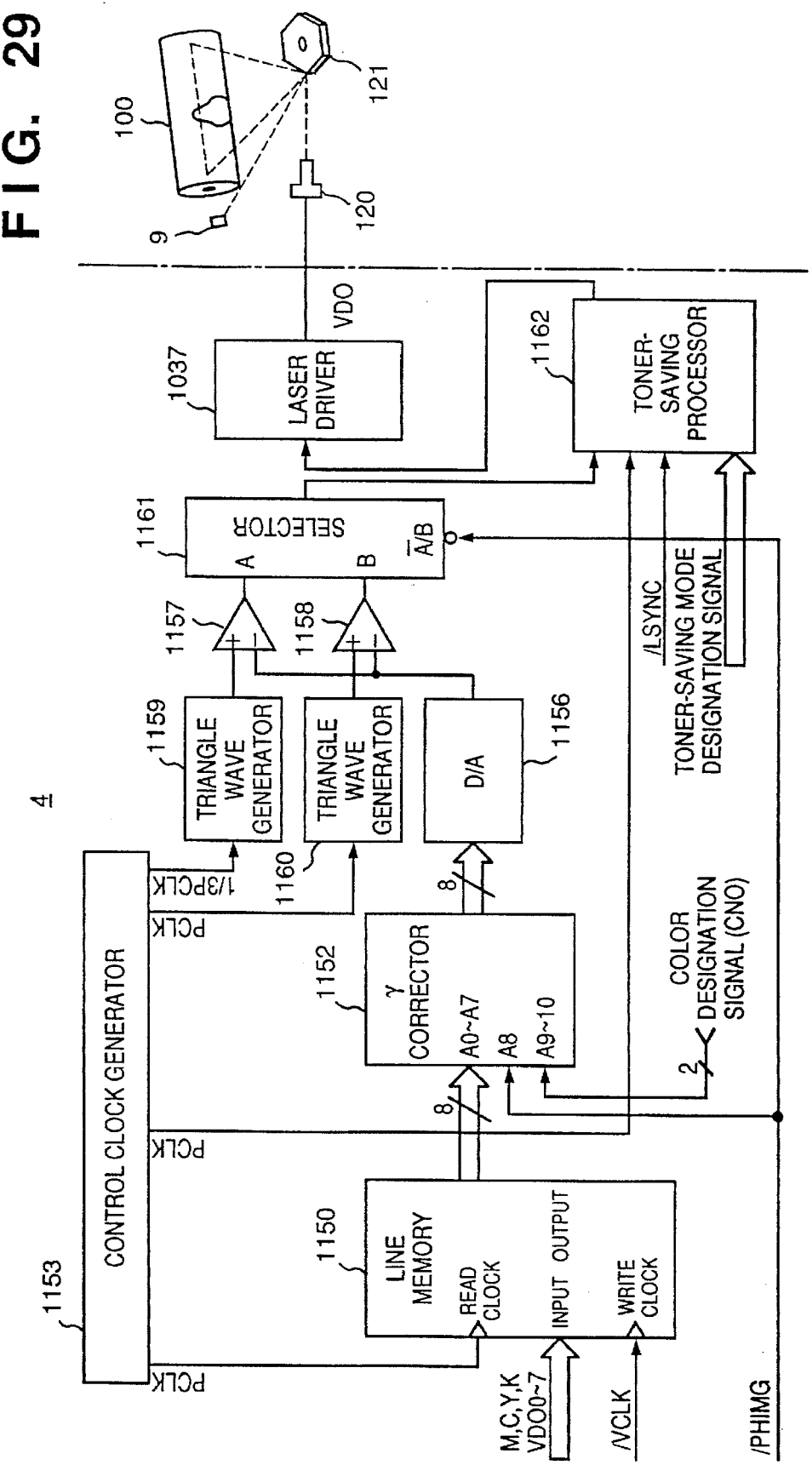
FIG. 29 is a block diagram showing the construction of the signal processor according to a fifth embodiment of the present invention.

FIG. 29 shows the construction of the signal processor 4 where a toner-saving processor 1162 is added, according to the present embodiment. In FIG. 29, elements corresponding to those in FIG. 25 have the same reference numerals. The toner-saving processor 1162, as an element characteristic of this embodiment, inputs the pulse-width modulation signal outputted from the selector 1161, and after signal processing to be described below, outputs the signal to the laser driver 1037.

Figure 30:
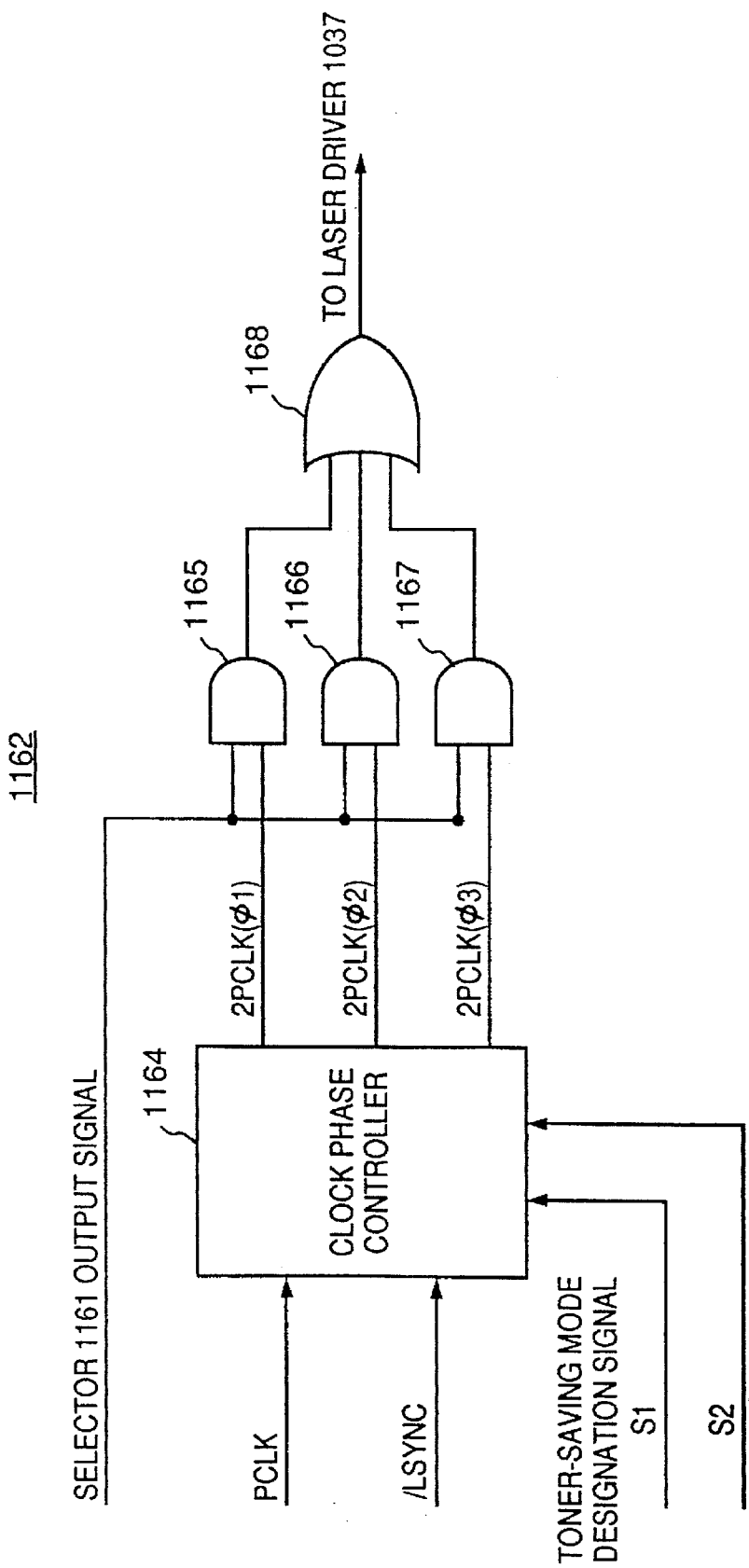
FIG. 30 is a block diagram showing the construction of a toner-saving processor 162.

FIG. 30 shows the logical construction of the toner-saving processor 1162. In FIG. 30, numeral 1164 denotes a clock phase controller which inputs the clock (PCLK), the /LSYNC signal, the 2-bit (S1, S2) toner-saving mode designation signal. The clock phase controller 1164 outputs 2 PCLK ($\phi$1), 2PCLK ($\phi$2) and 2PCLK ($\phi$3) signals, respectively into AND circuits 1165 to 1167. The AND circuits 1165 to 1167 inputs the selector 1161 output signal into their other input terminal, obtain the logical products from the selector 1161 output and the respective 2PCLK ($\phi$1), 2PCLK ($\phi$2) and 2PCLK ($\phi$3) signals. The AND circuits 1165 to 1167 output the logical products into an OR circuit 1168 which outputs the ORed signal into the laser driver 1037.

In the above construction, if the toner-saving mode designation signal (S1, S2) is S1=S2 =0 (normal mode or non-toner-saving mode), the clock phase controller 1164 outputs 2PCLK ($\phi$1), 2PCLK ($\phi$2) and 2PCLK ($\phi$3) signals of level "H". In this case, the selector 1161 output signal is outputted via the OR circuit 1168 without any processing to the laser driver 1037, so that the operation is the same as that made by the construction in FIG. 25, and the output result is similar to that shown in FIG. 28.

Next, the operation in a case where S1=1, S2=0 (toner-saving mode 1) will be described with reference to FIGS. 31 and 32.

The clock phase controller 1164 outputs 2PCLK ($\phi$3) signal at low level "L". As 2PCLK ($\phi$1) and 2PCLK ($\phi$2) signals, the clock phase controller 1164 generates a clock (2PCLK) having a halved clock PCLK frequency and its logical inverse signal (/2PCLK). The controller 1164 counts the /LSYNC signal, and as to odd-numbered scanning lines (L1, L3, L5, L7, ... ), it outputs the 2PCLK ($\phi$1)=2PCLK, 2PCLK ($\phi$2)="L", while as to even-numbered scanning lines, outputs 2PCLK ($\phi$1)="L", 2PCLK ($\phi$2)=/2PCLK.

Figure 31:
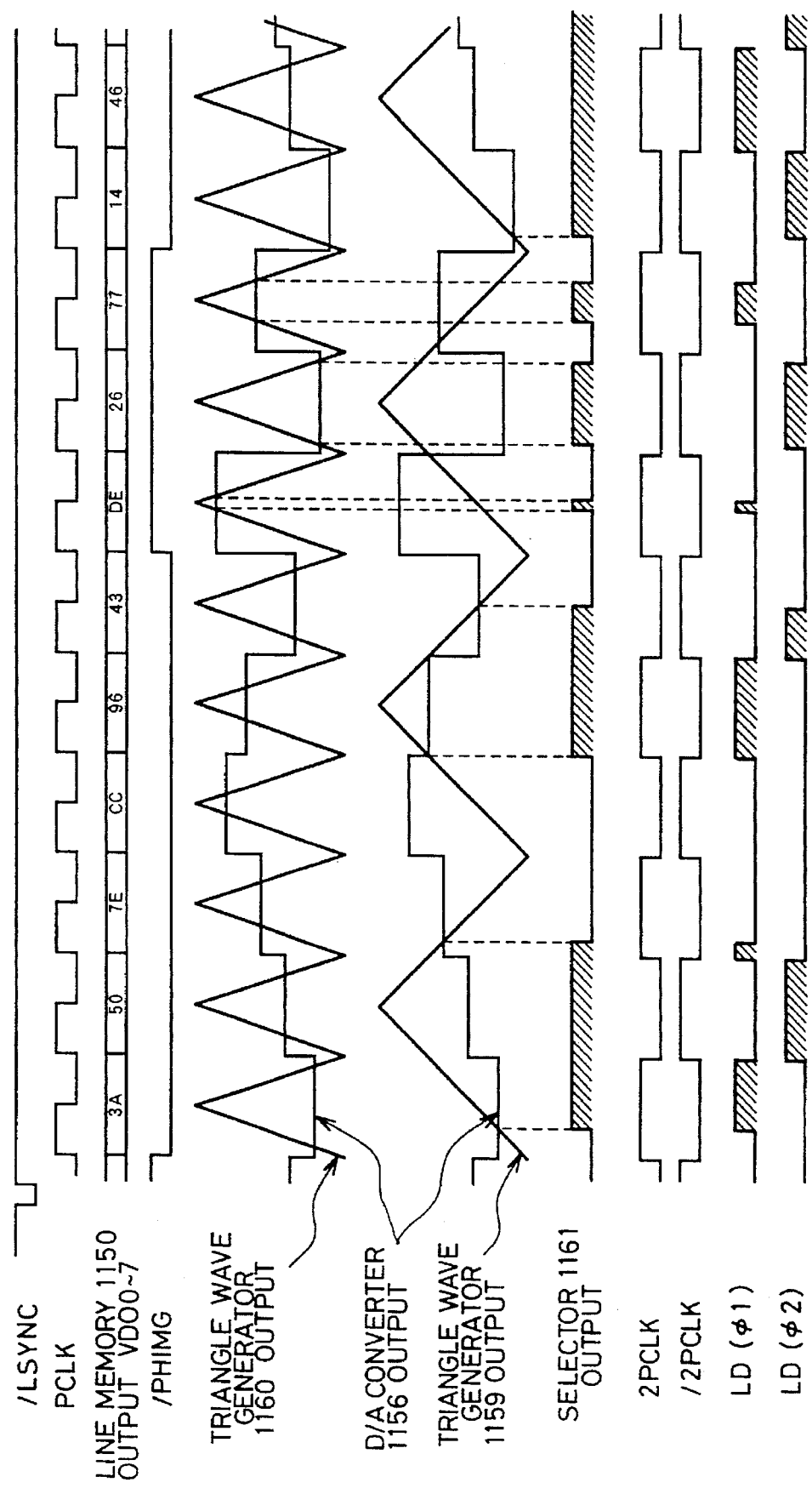
FIG. 31 is a timing chart showing timings of various signals upon image formation at 200 dpi and 600 dpi printing densities in accordance with instruction by a toner-saving mode designation signal according to the fifth embodiment.
Figure 32:
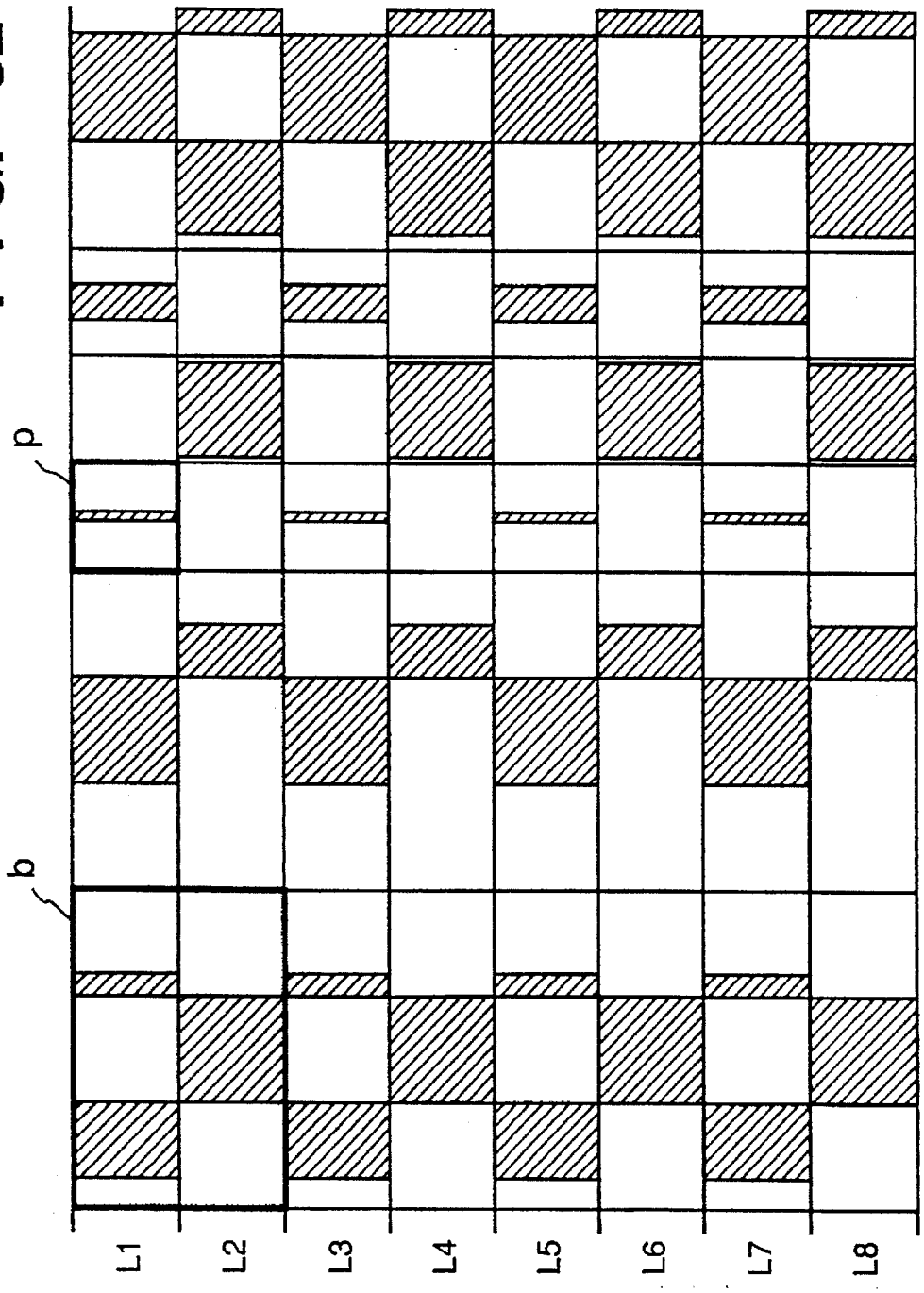
FIG. 32 illustrates an image outputted in accordance with the signal shown in FIG. 31.

As a result, the selector 1161 output is divided into odd-numbered scanning lines (FIG. 31, LD (φ1)) and even-numbered scanning lines (FIGS. 31, LD (φ2)), and image output as shown in FIG. 32 is obtained. That is, the pixel represented by numeral a in FIG. 28 obtains the same density by two scanning lines, as represented by numeral b in FIG. 32. The toner-output portion per unit area becomes the half of that in FIG. 28, thus toner consumption can be reduced to the half of that in FIG. 28. In this case, as apparent from FIG. 32, adding the output for the scanning lines L1 and L2 corresponds to the toner-output area of FIG. 28 (L1). That is, the result of this arrangement is corresponding to masking one scanning line. This lowers the density while maintaining tonality.

Further, the operation in a case where S1=0, S2=1 (toner-saving mode 2) will be described with reference to FIGS. 33 and 34.

Figure 33:
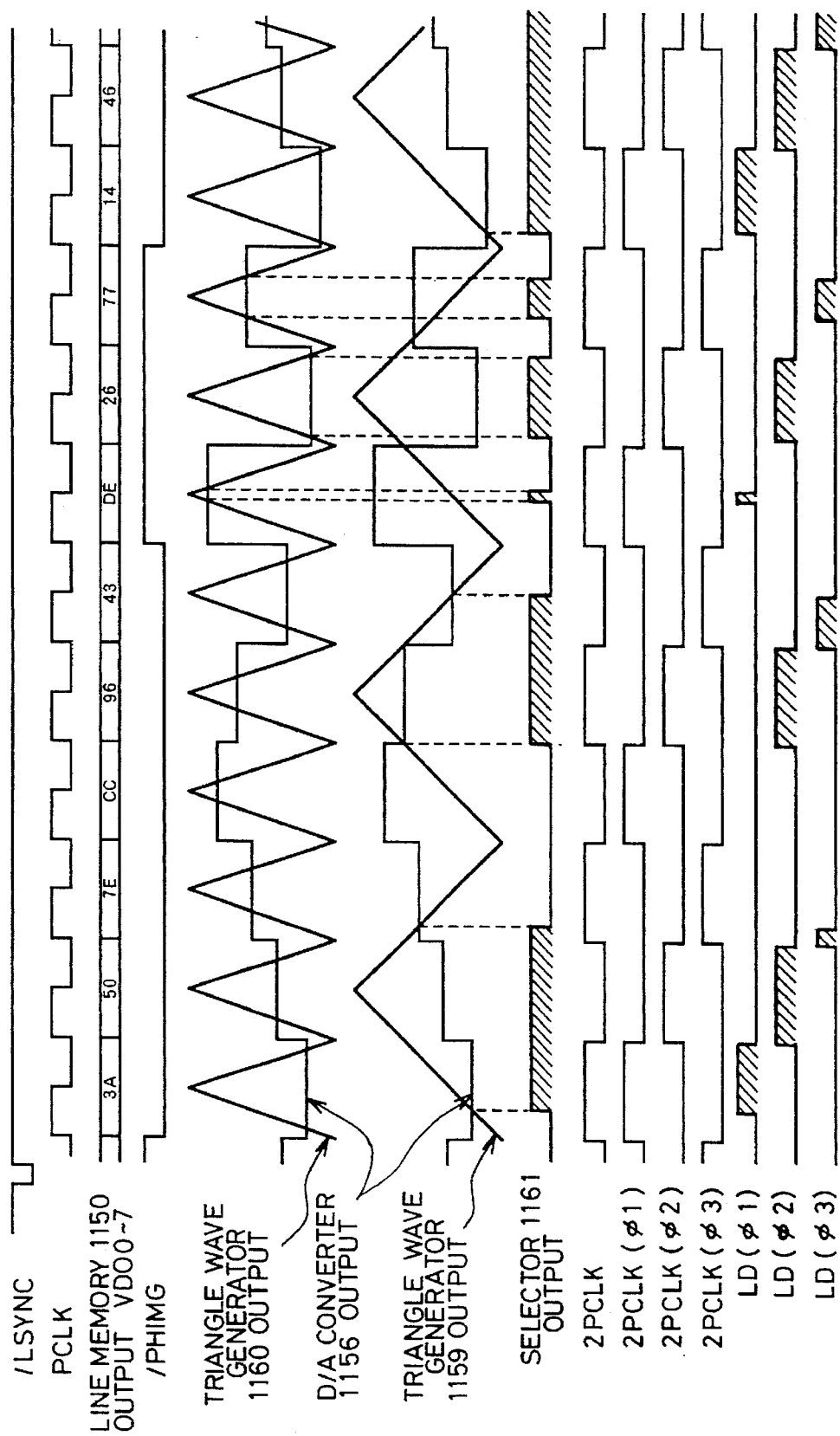
FIG. 33 is a timing chart showing timings of various signals upon image formation at 200 dpi and 600 dpi printing densities in accordance with another instruction by the toner-saving mode designation signal according to the fifth embodiment.

The clock phase controller 1164 generates signals (2PCLK (φ1), 2PCLK (φ2) and 2PCLK (φ3)) each having 120° shifted phase as shown in FIG. 33, counts the /LSYNC signal, and as to the scanning lines L1, L4, L7, . . . , outputs only the 2PCLK (φ1), as to the scanning lines L2, L5, L8, . . . , outputs only the 2PCLK (φ2), and as to the scanning lines L3, L6, L9, . . . , outputs only the 2PCLK (φ3).

Figure 34:
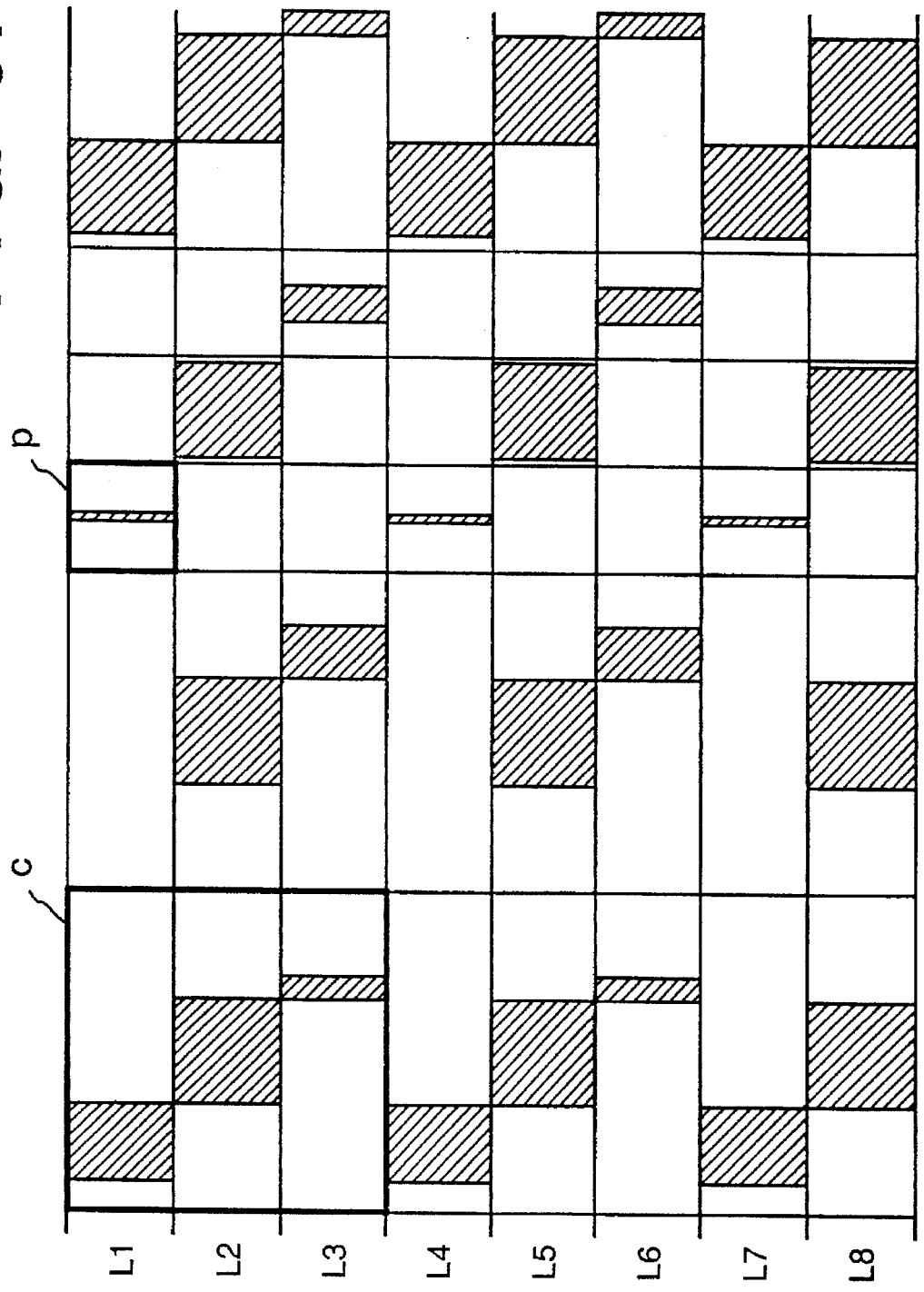
FIG. 34 illustrates an image outputted in accordance with the signal shown FIG. 33.

As a result, the selector 1161 output is divided into L1 scanning line (FIG. 33, LD (φ1)), L2 scanning line (FIG. 33, LD (φ2)) and L3 scanning line (FIG. 33, LD (φ3)), and image output as shown in FIG. 34 is obtained. That is, the pixel in FIG. 28 represented by numeral a obtains the same density by adding three scanning lines, as represented by numeral p in FIG. 34. The toner-output portion per unit area becomes the ⅓ of that in FIG. 28, thus toner consumption can be reduced to ⅓ of that in FIG. 28. In this case, as apparent from FIG. 34, adding the output for the scanning lines L1, L2 and L3 corresponds to the toner-output area of FIG. 28 (L1). This lowers the density while maintaining tonality.

Further, as it is understood from FIGS. 32 and 34, masking position (phase) with respect to one scanning line is always changed, even one vertical line of 600 dpi density can be, at least, printed. According to this embodiment, this line is outputted as a dotted line.

Accordingly, the present embodiment reduces toner consumption in accordance with the instruction of the toner-saving mode designation signal by setting the instruction with a command from the host or an operation panel of the printer controller.

Figure 35:
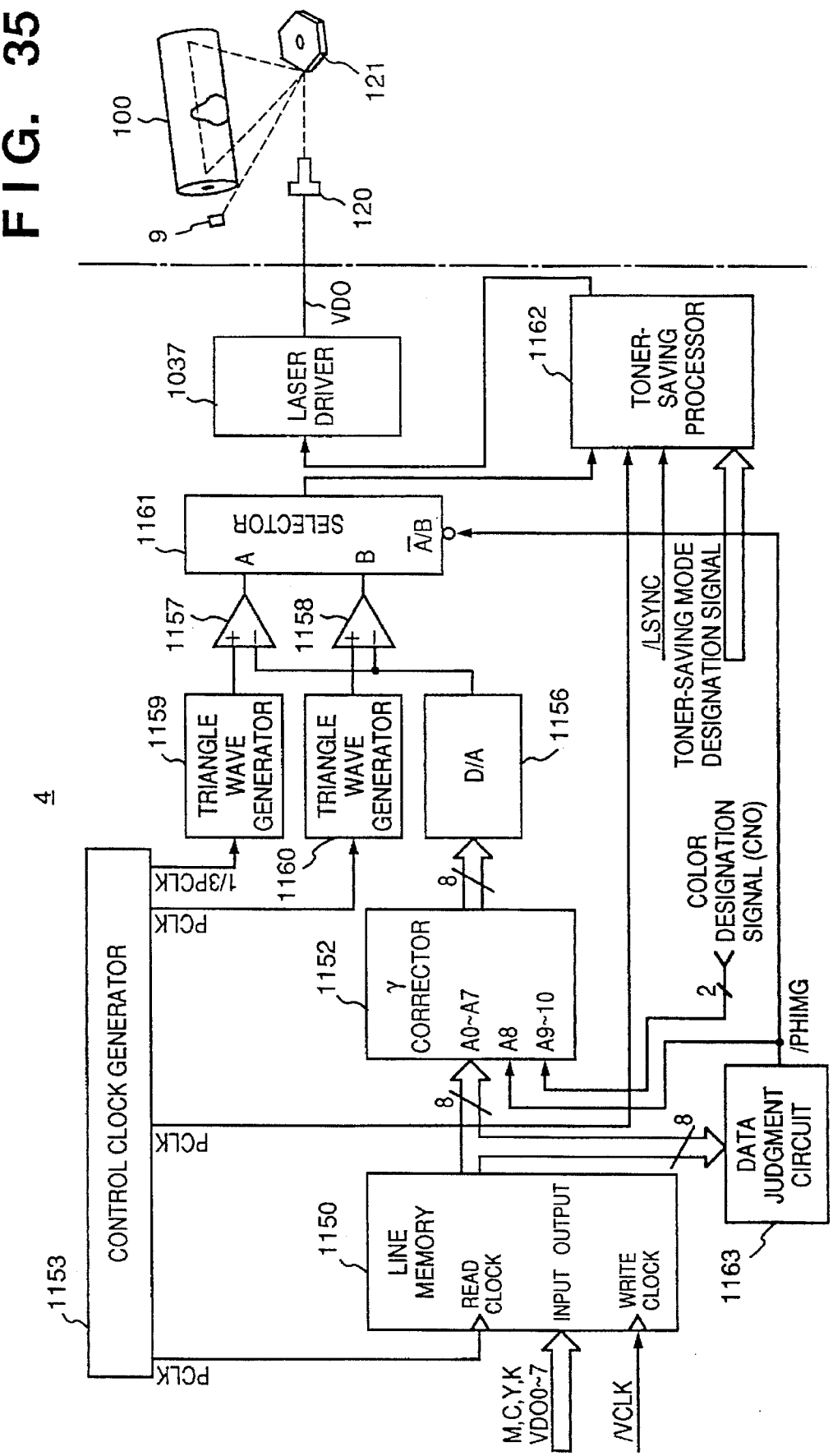
FIG. 35 is a block diagram showing the construction of a signal processor 31 further including a data judgment circuit 163.
Figure 36:
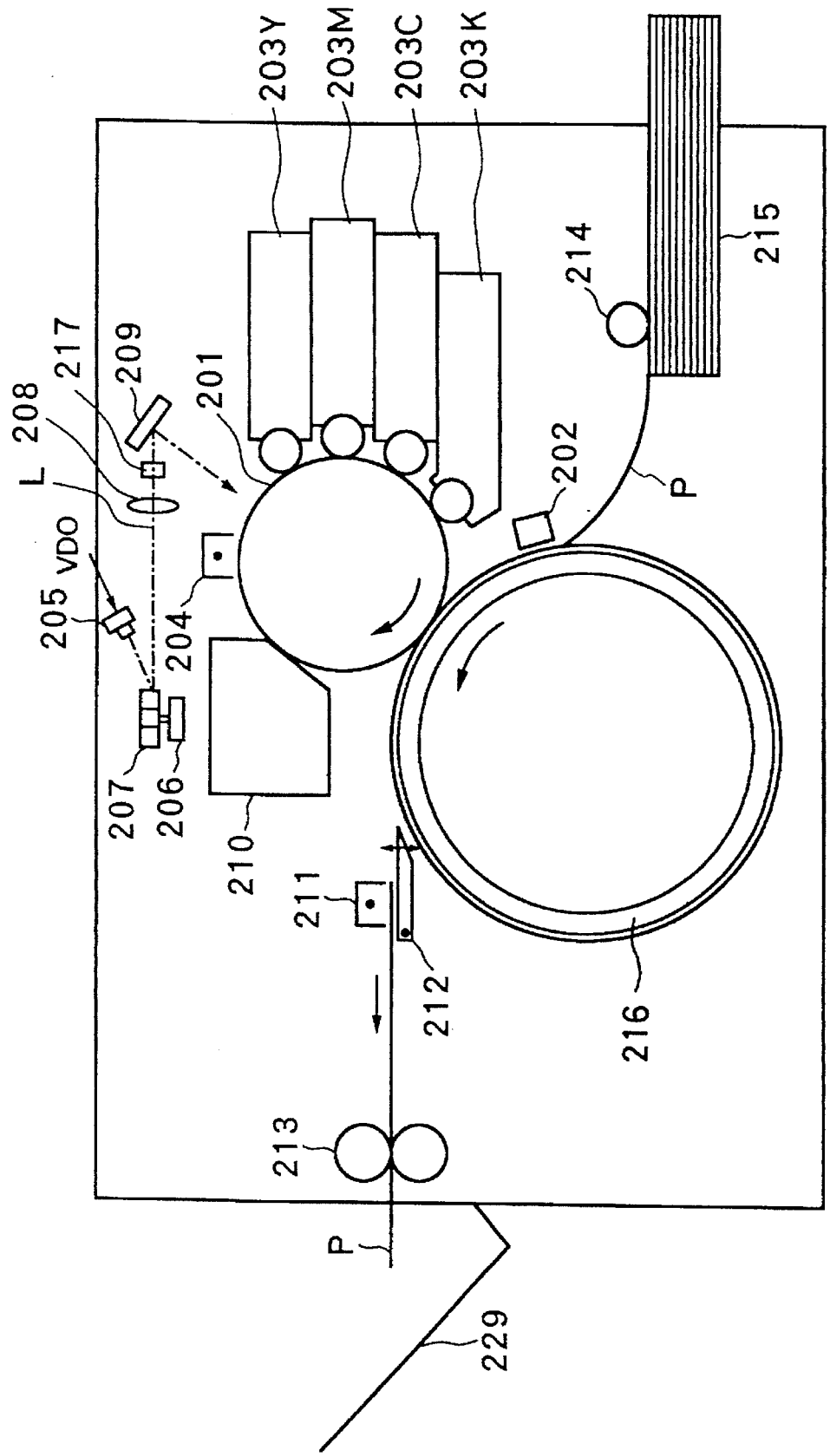
FIG. 36 is a cross-sectional view showing the construction of a conventional full-color printer.
Figure 37:
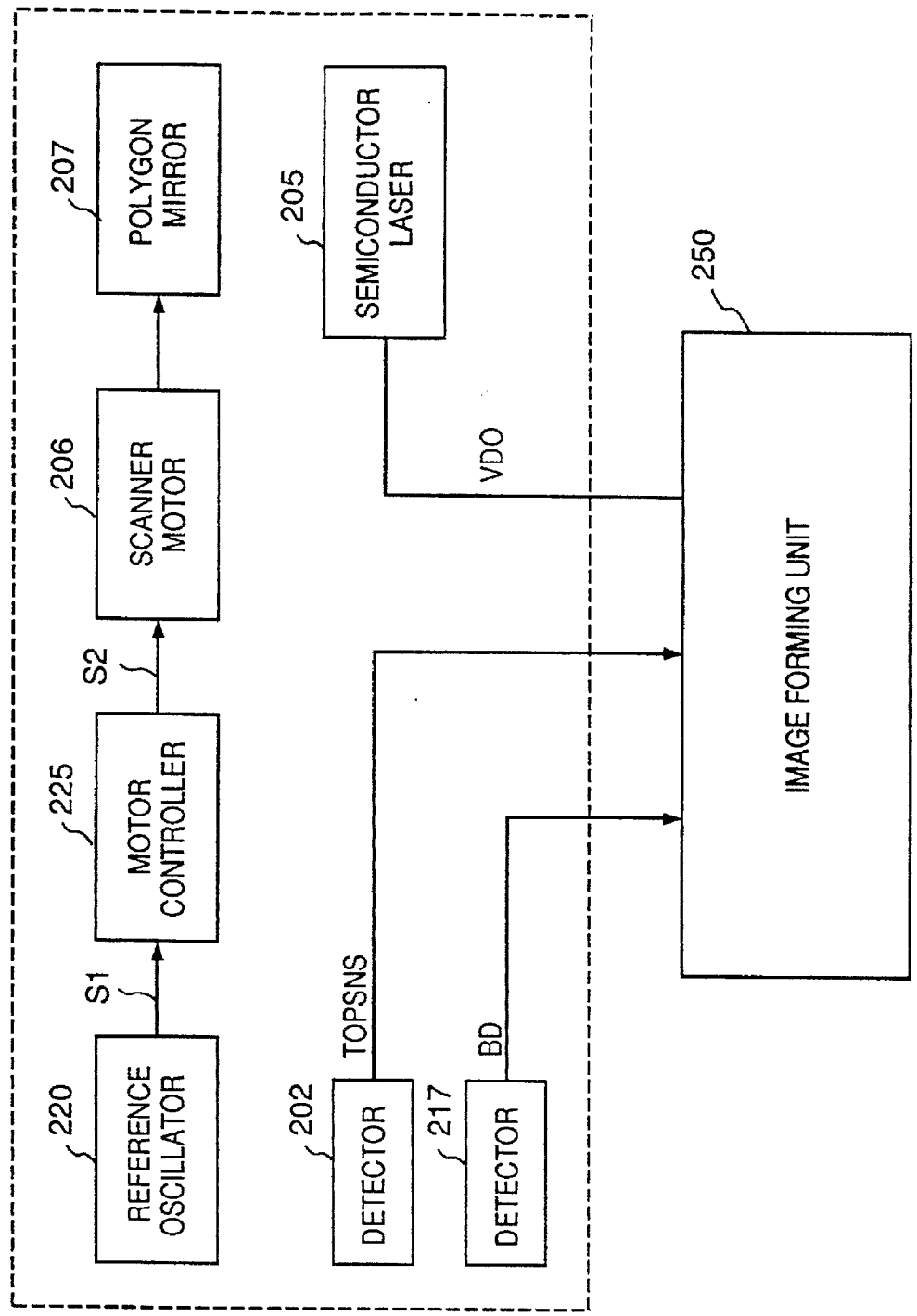
FIG. 37 is a block diagram showing flows of various signals used by the full-color printer in FIG. 36.
Figure 38:
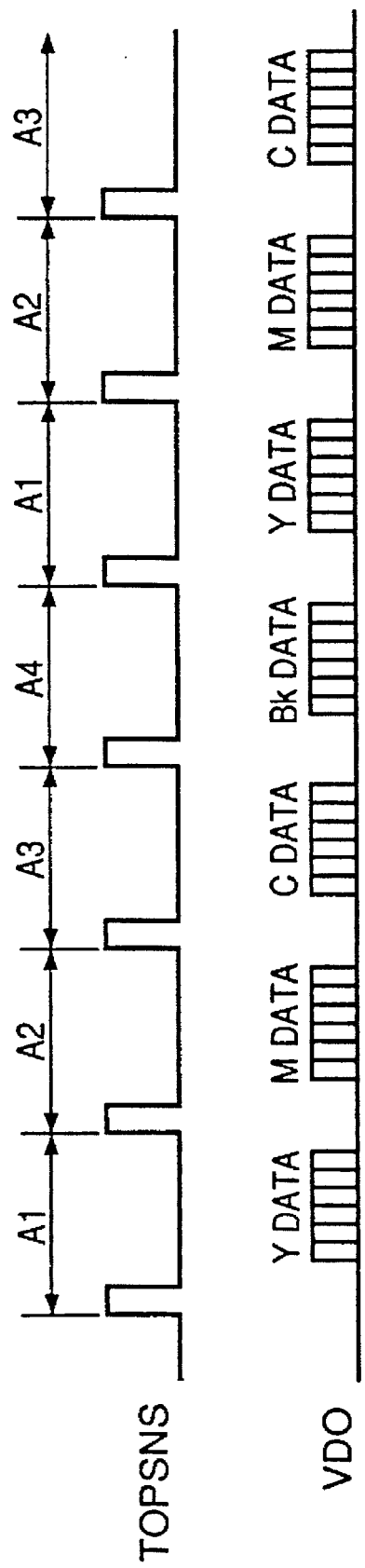
FIG. 38 is a timing chart showing the relation between a TOPSNS signal and a VDO signal.
Figure 39:
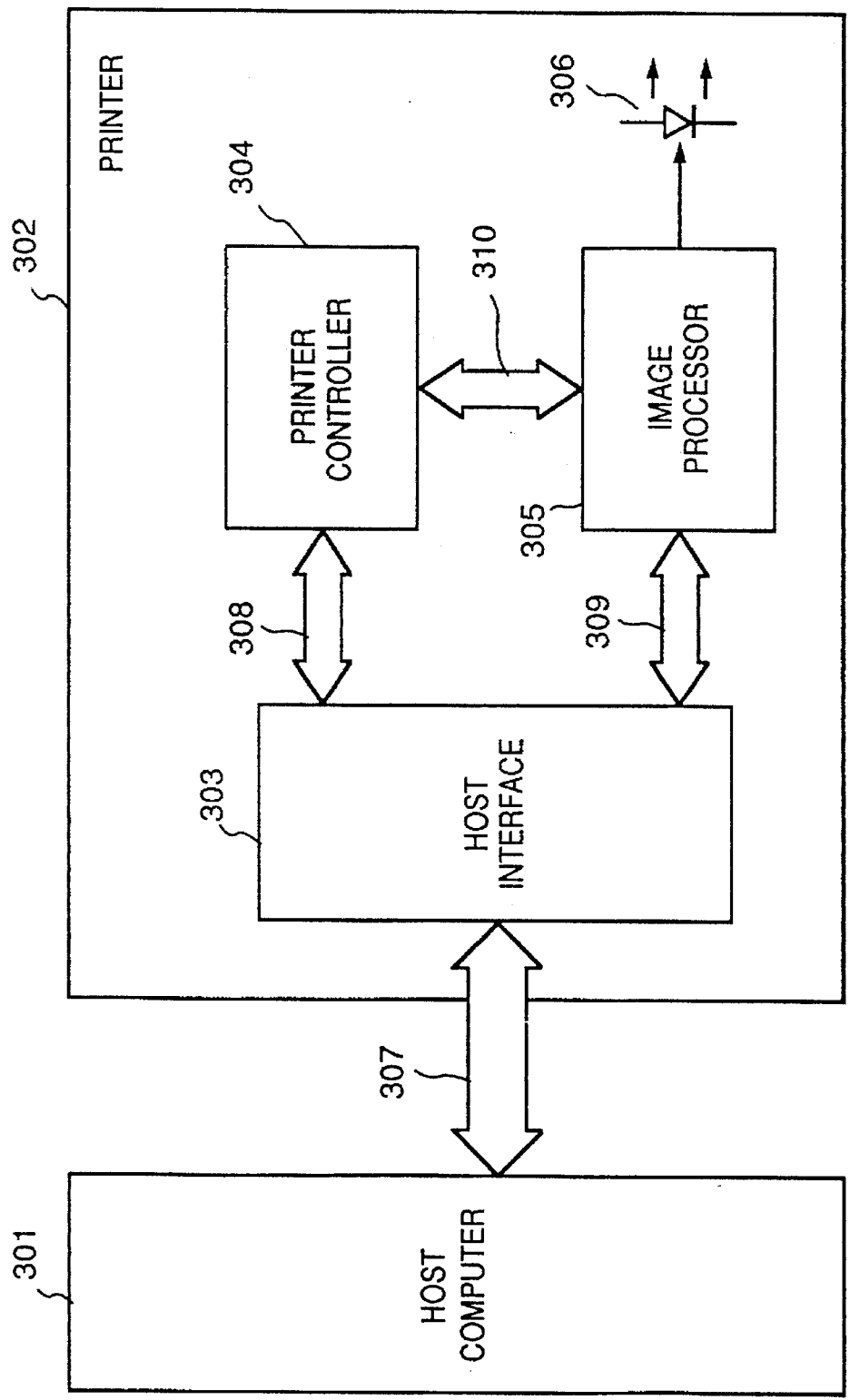
FIG. 39 is a black diagram showing the functional construction of a conventional full-color printer 302.
Figure 40:
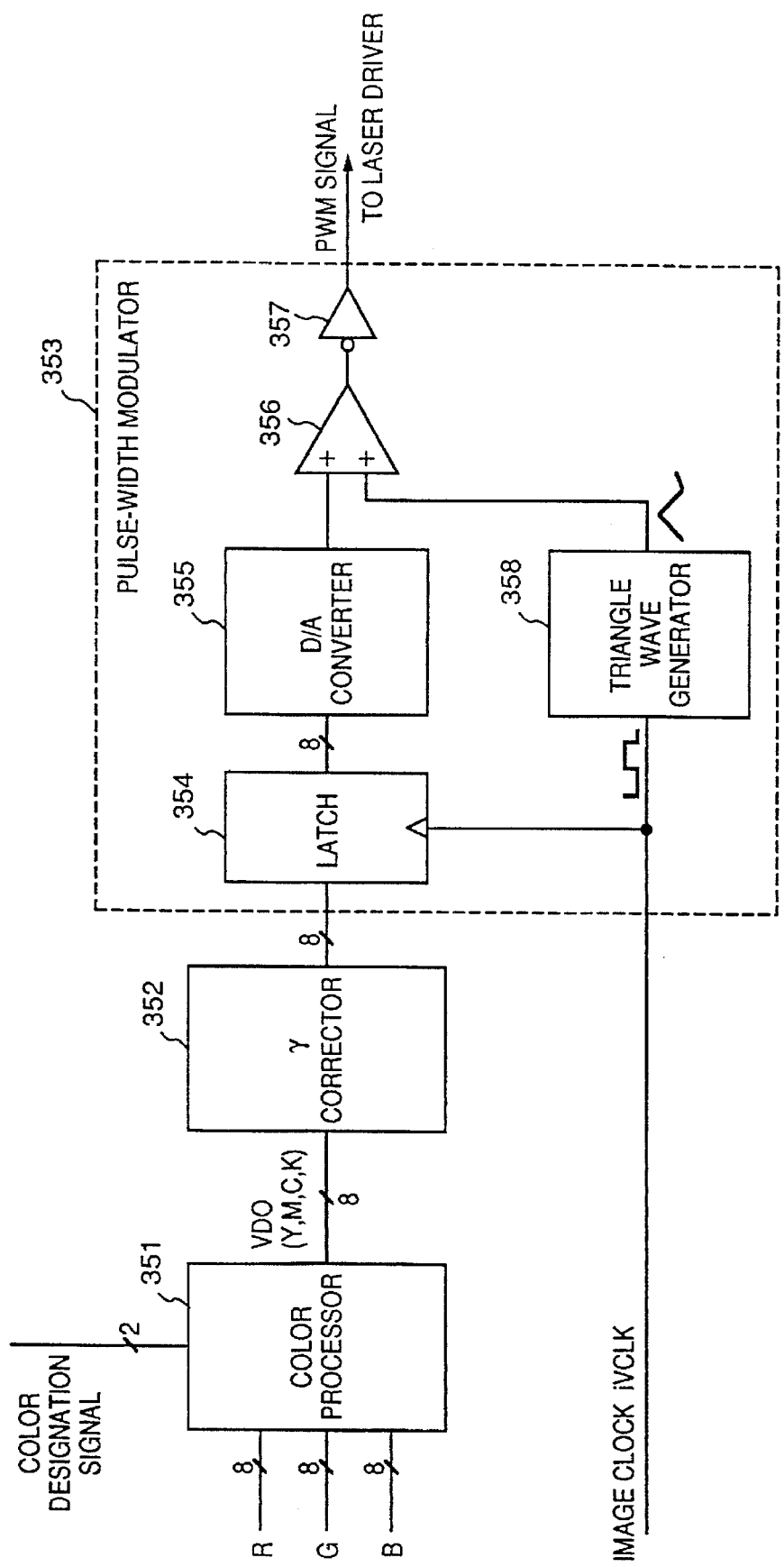
FIG. 40 is a block diagram showing the detailed construction of an image processor 305 shown in FIG. 39.

As shown in FIG. 35, the signal processor 4 of this embodiment may be arranged to further include a data judgment circuit 1163 which inputs 8-bit/pixel/color component image data from the line memory 1150, and determines whether the pixel data value is "00" or "FF".

That is, based on the idea that "character image printing generally requires high toner density and minimum-level toner density (e.g., black-and-white printing), and such images require very high resolution", if an input pixel value is "00" or "FF", the data judgment circuit 1163 outputs /PHIMG="H" (designation of 600 dpi image formation), while if the pixel value is neither "00" nor "FF", outputs /PHIMG="L" (designation of 200 dpi image formation).

In this construction where the data judgment circuit 1163 judges the image data (VDO0–VD07) and automatically generates the /PHIMG signal, the printer controller 200 does not generate the /PHIMG signal but simply treats the 8-bit image data. This simplifies data transfer using a commonly used data bus (having data width as an integral multiple of 8-bit).

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image forming apparatus comprising:
    conversion means for producing a density-converted color image signal by converting an input color image signal so as to lower a density of the input color image signal;
    mode selection means for selecting whether to perform conversion by said conversion means;
    image formation means for forming a color image based on the density-converted color image signal produced by said conversion means or based on the input color image signal, the image formation means forming the color image in accordance with a selection made by said mode selection means; and
    output means for outputting a toner image based on the color image formed by said image formation means;
    wherein said conversion means produces the density-converted color image signal by thinning out the input color image signal so that an overall tonality of a color image represented by the input color image signal is maintained and an amount of toner in the toner image output by said output means is reduced.

2. The apparatus according to claim 1, wherein said conversion means includes:
    masking means for masking a part of the input color image signal; and
    replacing means for replacing a signal value of the part of the input color image signal masked by said masking means with a value which is smaller than the signal value.

3. The apparatus according to claim 2, wherein said masking means zigzag masks pixels of the color image represented by the input color image signal so as to mask every other pixel in vertical and horizontal directions.

4. The apparatus according to claim 2, wherein said masking means zigzag masks pixels of the color image represented by the input color image signal so that only every other pixel in the color image is present in vertical and horizontal directions.

5. The apparatus according to claim 2, further comprising masking control means for controlling said masking means so that said masking means performs masking if a density value of the input color image signal is equal to or greater than a predetermined threshold value.

6. The apparatus according to claim 1, further comprising:
    outline detection means for detecting an outline portion of a color image formed based on the input color image signal; and
    suppression means for suppressing conversion by said conversion means of the outline portion detected by said outline detection means.

7. The apparatus according to claim 1, wherein said image formation means forms the color image in accordance with an electrophotographic method.

8. A color image formation method comprising:
    an input step of inputting a color image signal;

a conversion step of producing a density-converted color image signal by converting an input color image signal so as to lower a density of the input color image signal;

a mode selection step of selecting whether to perform conversion in said conversion step;

an image formation step of forming a color image based on the density-converted color image signal produced in said conversion step or based on the input color image signal, the image formation step forming the color image in accordance with a selection made by said mode selection step; and an output step of outputting a toner image based on the color image formed in said image formation step;

wherein said conversion step produces the density-converted color image signal by thinning out the input color image signal so that an overall tonality of a color image represented by the input color image signal is maintained and an amount of toner in the toner image output in said output step is reduced.

9. A color image forming apparatus comprising:

instruction means for inputting an instruction to reduce consumption of recording material;

input means for inputting color image data representing pixels of a color image;

attribute signal generation means for examining an attribute of each pixel represented by the color image data and for outputting the attribute as an attribute signal;

control means for controlling image formation so that an image is formed at a first resolution based on resolution-oriented image data in the color image data, and an image is formed at a second resolution based on tonality-oriented image data in the color image data, the control means controlling image formation based on the attribute signal;

first image formation means for forming a first image at the first resolution from the resolution-oriented image data using the recording material;

second image formation means for forming a second image at the second resolution from the tonality-oriented image data using the recording material; and recording material consumption control means for controlling said first and second image formation means based on the instruction input by said instruction means, said recording material consumption control means comprising output means for masking a part of the first image and a part of the second image so as to reduce consumption of the recording material during image formation, and for outputting masked first and second images, said output means shifting pixel positions during masking of the parts of the first and second images so that overall tonality of the first and second images does not change in the masked first and second images, respectively, as a result of masking.

10. The apparatus according to claim 9, wherein the recording material comprises toner.

11. The apparatus according to claim 9, wherein said recording material control means controls image formation so that an amount of recording material consumed for n pixels of the color image data is approximately equal to an amount of recording material consumed for one pixel in a case where said recording material consumption control means controls said first and second image formation means to reduce recording material consumption.

12. The apparatus according to claim 9, further comprising a data bus over which the color image data is transferred from said input means to said first and second image formation means, the data bus having a bus width which is a multiple of a data length of the color image data, wherein said attribute signal generation means generates the attribute signal from said color image data transferred over said data bus.

13. The apparatus according to claim 9, wherein said second resolution is ⅓ of the first resolution.

14. The apparatus according to claim 9, wherein said first and second image formation means form the first and second images in accordance with an electrophotographic method.

15. A color image formation method comprising:

an instruction step for inputting an instruction to reduce consumption of recording material;

an input step of inputting color image data representing pixels of a color image;

an attribute signal generation step of examining an attribute of each pixel represented by the color image data and of outputting the attribute as an attribute signal;

a control step of controlling image formation so that an image is formed at a first resolution based on resolution-oriented image data in the color image data and an image is formed at a second resolution based on tonality-oriented image data in the color image data, the control step controlling image formation based on the attribute signal;

a first image formation step of forming a first image at the first resolution from the resolution-oriented image data using the recording material;

a second image formation step of forming a second image at the second resolution from the tonality-oriented image data using the recording material; and a recording material consumption controlling step for controlling said first and second image formation steps based on the instruction input in said instruction step, said recording material consumption controlling step comprising an outputting step for masking a part of the first image and a part of the second image so as to reduce consumption of the recording material during image formation, and for outputting masked first and second images, said outputting step shifting pixel positions during masking of the parts of the first and second images so that overall tonality of the first and second images does not change in the masked first and second images, respectively, as a result of masking.

* * * * *

UNITED STATES PATENT AND TRADEMARK OFFICE
CERTIFICATE OF CORRECTION

PATENT NO. : 5,646,670

DATED : July 8, 1997

INVENTORS : Kaoru Seto, et al.

It is certified that error appears in the above-identified patent and that said Letters Patent is hereby corrected as shown below:

COLUMN 7

Line 16, "14Aillustrates" should read --14A illustrates--; and
Line 28, "17Aillustrates" should read --17A illustrates--;

COLUMN 19

Line 16, "AS" should read --A8--.

Signed and Sealed this

Seventeenth Day of February, 1998

BRUCE LEHMAN

*Attest:*

*Attesting Officer*         Commissioner of Patents and Trademarks